United States Patent

(12) United States Patent
Uehira et al.

(10) Patent No.: US 8,658,757 B2
(45) Date of Patent: Feb. 25, 2014

(54) POLYAMIDE POLYMER, METHOD FOR PRODUCING SAME, RESIN COMPOSITION, MOLDED PRODUCT, FIBER, FILM, AND POROUS FILM

(71) Applicant: FUJIFILM Corporation, Tokyo (JP)

(72) Inventors: Shigeki Uehira, Kanagawa (JP); Toshihide Yoshitani, Kanagawa (JP); Toshimitsu Sakuma, Kanagawa (JP); Kozo Sato, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/922,273

(22) Filed: Jun. 20, 2013

(65) Prior Publication Data

US 2013/0281563 A1   Oct. 24, 2013

Related U.S. Application Data

(63) Continuation of application No. PCT/JP2011/079553, filed on Dec. 20, 2011.

(30) Foreign Application Priority Data

Dec. 24, 2010 (JP) .................................. 2010-288948
May 23, 2011 (JP) .................................. 2011-115143
Jul. 28, 2011 (JP) .................................. 2011-166019

(51) Int. Cl.
C08G 69/02 (2006.01)
C08G 69/26 (2006.01)
C08G 69/32 (2006.01)
C08G 63/44 (2006.01)

(52) U.S. Cl.
USPC ........... 528/348; 528/344; 528/349; 521/184; 521/185

(58) Field of Classification Search
USPC .................... 528/344, 348, 349; 521/184, 185
See application file for complete search history.

(56) References Cited

U.S. PATENT DOCUMENTS

| 3,215,656 | A | * | 11/1965 | Raichle et al. ............ 525/8 |
| 4,968,575 | A | * | 11/1990 | Matsumura et al. ....... 430/109.4 |
| 5,152,832 | A | * | 10/1992 | Hutter et al. ............. 524/100 |
| 2011/0014486 | A1 | * | 1/2011 | Sakamoto et al. ......... 428/474.4 |

FOREIGN PATENT DOCUMENTS

| EP | 505316 A2 * | 9/1992 | ........... C07C 265/12 |
| JP | 06-087946 | 3/1994 | |
| JP | 08059982 A * | 3/1996 | ............. C08L 77/00 |
| JP | 2008-274150 | 11/2008 | |

OTHER PUBLICATIONS

International Search Report PCT/JP2011/079553 dated Mar. 13, 2012, with English translation.
Written Opinion of the International Searching Authority PCT/ISA/237 dated Mar. 13, 2012 issued in PCT/JP2011/079553.

* cited by examiner

Primary Examiner — Randy Gulakowski
Assistant Examiner — Kara Boyle
(74) Attorney, Agent, or Firm — Young & Thompson

(57) ABSTRACT

Provided is a polyamide polymer in which a partial structure represented by the following formula (C) constitutes a portion of the main chain:

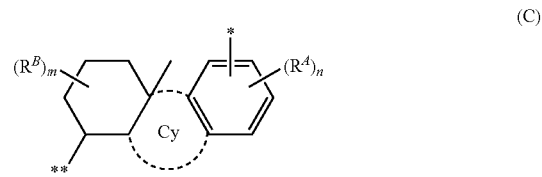

(C)

wherein in Formula (C), $R^A$ and $R^B$ each independently represent a hydrogen atom or an alkyl group having 1 to 6 carbon atoms; n and m each independently represent an integer from 0 to 2; Cy represents an unsaturated 6-membered or 7-membered ring which may contain a heteroatom; and * and ** each represent a bonding hand, while * may be a bonding hand extending from $R^A$.

14 Claims, 6 Drawing Sheets

POLYAMIDE POLYMER, METHOD FOR PRODUCING SAME, RESIN COMPOSITION, MOLDED PRODUCT, FIBER, FILM, AND POROUS FILM

CROSS-REFERENCE TO RELATED APPLICATIONS

This application is a continuation application of International Application No. PCT/JP/2011/079553, filed Dec. 20, 2011, the disclosure of which is incorporated herein by reference in its entirety. Further, this application claims priority from Japanese Patent Application Nos. 2010-288948, 2011-115143, and 2011-166019, the disclosures of which are incorporated herein by reference in their entirety.

TECHNICAL FIELD

The present invention relates to a polyamide polymer, a method for producing the same, a resin composition, a molded product, a fiber, a film, and a porous film.

BACKGROUND ART

From the viewpoint of global environment protection, reduction of dependence on petroleum in relation to resources has been examined, and attention has been paid to various natural resources. Among polyamides, known as a product obtained from a raw material originating from natural products is polyamide 11. Polyamide 11 is produced by using, as a raw material, aminoundecylenic acid that is synthesized from ricinoleic acid, which is a main component of "castor oil" obtained from castor beans, through a number of processes.

Furthermore, as a component originating from natural products, rosin that can be collected from pine resin is available. This rosin is composed of a mixture of various terpene-based carboxylic acids; however, among those carboxylic acids, it is known that abietic acid is used for polymer materials (see, for example, JP-A No. 2008-274150 and JP-A No. 6-87946). JP-A No. 2008-274150 and JP-A No. 6-87946 disclose that abietic acid is used to modify the chain ends of a phenolic resin or an epoxy resin, thereby obtaining a rosin-modified phenolic resin and a rosin-modified epoxy acid resin, which are used as binders for coating materials and the like.

SUMMARY OF INVENTION

Technical Problem

However, polyamide 11 has room for an improvement in heat resistance. Furthermore, a polyamide polymer containing a rosin derivative is not disclosed in JP-A No. 2008-274150 and JP-A No. 6-87946, and since the rosin-modified epoxy resin employs a phenolic resin or an epoxy resin as the main skeletal structure, the rosin-modified epoxy resin uses a substantially petroleum-dependent raw material, which is still unsatisfactory from the viewpoint of global environment protection. Therefore, there is a demand for a polymer having excellent heat resistance and produced from a raw material originating from natural products.

The present invention was made in view of the circumstances described above, and the problem to be solved by the invention is to achieve the following objects. That is, an object of the present invention is to provide a polyamide polymer which has excellent heat resistance and which is a naturally derived novel material, and a method for producing the same. Another object of the invention is to provide a resin composition, a molded product, a fiber, a film, and a porous film, each of which contains the polyamide polymer and has excellent heat resistance.

Means for Solving the Problem

Specific means for solving the problem described above include those described below.

<1> A polyamide polymer, comprising a partial structure represented by the following formula (C), the partial structure constituting a portion of a main chain:

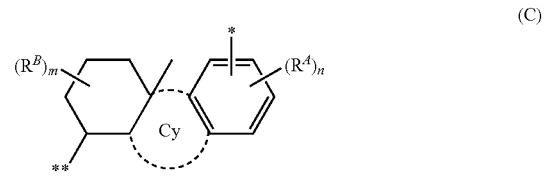

wherein in Formula (C). $R^A$ and $R^B$ each independently represent a hydrogen atom or an alkyl group having 1 to 6 carbon atoms; n and m each independently represent an integer from 0 to 2; Cy represents an unsaturated 6-membered or 7-membered ring which may contain a heteroatom; and * and ** each represent a bonding hand, and * may be a bonding hand extending from $R^A$.

<2> The polyamide polymer described in <1>, including a repeating unit derived from a dicarboxylic acid compound containing the partial structure represented by the Formula (C).

<3> The polyamide polymer described in <1> or <2>, further including a repeating unit derived from a diamine compound.

<4> A polyamide polymer including a repeating unit derived from a dicarboxylic acid compound containing a partial structure represented by General Formula (C) and a repeating unit derived from a diamine compound, in which the partial structure represented by Formula (C) constitutes a portion of the main chain.

<5> The polyamide polymer described in any one of <2> to <4>, wherein the repeating unit derived from a dicarboxylic acid compound is at least one selected from the group consisting of a repeating unit represented by the following General Formula (A10), a repeating unit represented by the following General Formula (A20), and a repeating unit represented by the following General Formula (A30).

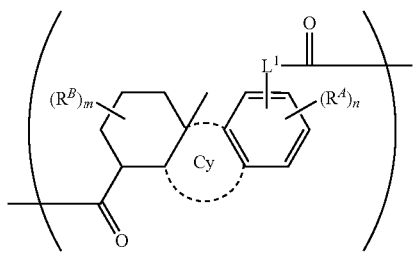

(A10)

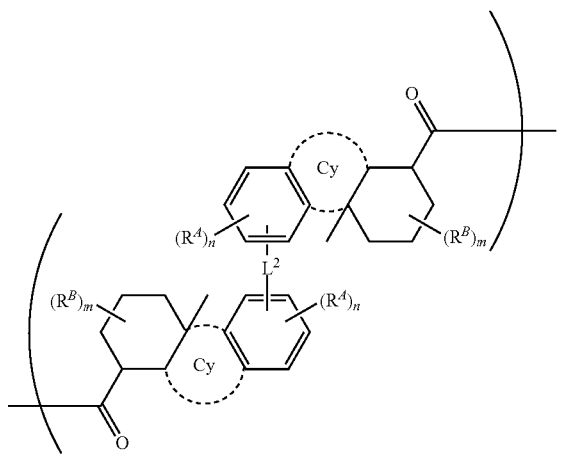

(A20)

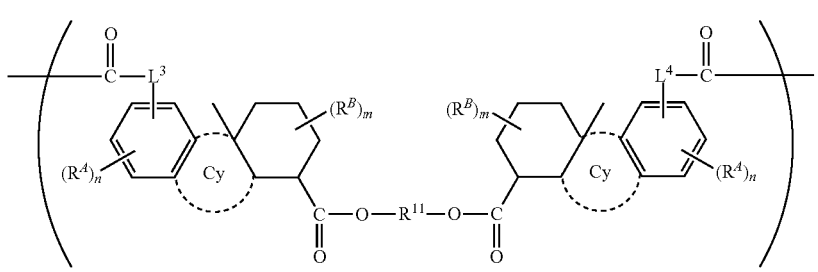

(A30)

wherein in formulae (A10), (A20) and (A30), $L^1$ represents a single bond or a divalent linking group composed of at least one selected from the group consisting of an alkylene group, an alkenylene group, an arylene group, an oxygen atom and a carbonyl group; $L^2$ represents a single bond or a divalent linking group composed of at least one selected from the group consisting of an oxygen atom, a sulfur atom, a carbonyl group, a sulfonyl group, an alkylene group, an alkenylene group and an arylene group; $L^3$ and $L^4$ each independently represent a single bond or a divalent linking group composed of at least one selected from the group consisting of an alkylene group, an alkenylene group, an arylene group, an oxygen atom and a carbonyl group; $R^{11}$ represents a divalent linking group containing at least one selected from the group consisting of an alkylene group and an arylene group; $R^A$ and $R^B$ each independently represent a hydrogen atom or an alkyl group having 1 to 6 carbon atoms; n and m each independently represent an integer from 0 to 2; Cy represents an unsaturated 6-membered or 7-membered ring which may contain a heteroatom; and * and ** each represent a bonding hand, and * may be a bonding hand extending from $R^A$.

<6> The polyamide polymer described in any one of <2> to <5>, wherein the repeating unit derived from a dicarboxylic acid compound is derived from at least one selected from the group consisting of a dicarboxylic acid compound represented by the following General Formula (A11), a dicarboxylic acid compound represented by the following General Formula (A21), and a dicarboxylic acid compound represented by the following General Formula (A31):

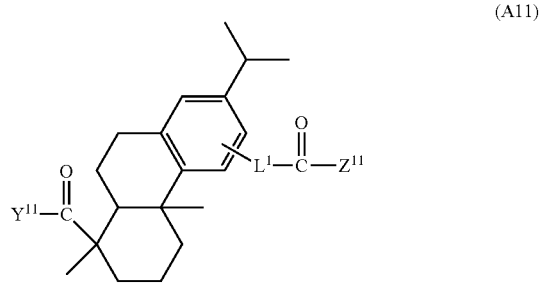

(A11)

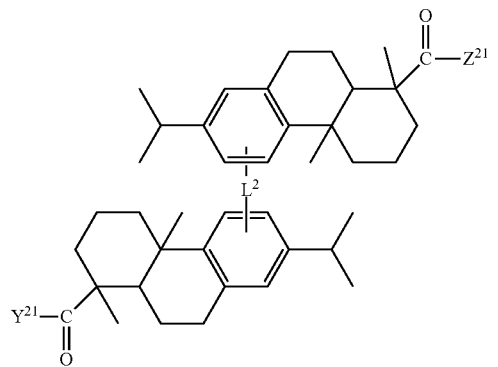

(A21)

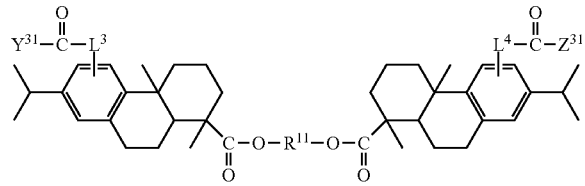
(A31)

wherein in Formulae (A11), (A21) and (A31), $L^1$ represents a single bond or a divalent linking group composed of at least one selected from the group consisting of an alkylene group, an alkenylene group, an arylene group, an oxygen atom and a carbonyl group; $L^2$ represents a single bond or a divalent linking group composed of at least one selected from the group consisting of an oxygen atom, a sulfur atom, a carbonyl group, a sulfonyl group, an alkylene group, an alkenylene group and an arylene group; $L^3$ and $L^4$ each independently represent a single bond or a divalent linking group composed of at least one selected from the group consisting of an alkylene group, an alkenylene group, an arylene group, an oxygen atom and a carbonyl group; $R^{11}$ represents a divalent linking group containing at least one selected from the group consisting of an alkylene group and an arylene group; and $Y^{11}, Y^{21}, Y^{31}, Z^{11}, Z^{21}$ and $Z^{31}$ each independently represent a leaving group.

<7> The polyamide polymer described in any one of items <2> to <6>, wherein the repeating unit derived from a dicarboxylic acid compound is derived from at least one selected from the group consisting of dicarboxylic acid compounds represented by the following formulae (A11-ex-1) to (A11-ex-25), dicarboxylic acid compounds represented by the following General formulae (A21-ex-1) to (A21-ex-12), and dicarboxylic acid compounds represented by the following General formulae (A31-ex-1) to (A31-ex-26):

(A11-ex-1)
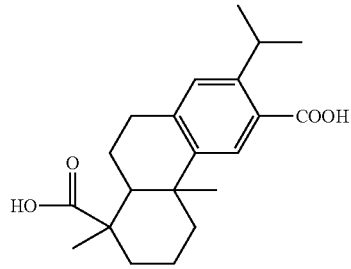

(A11-ex-2)
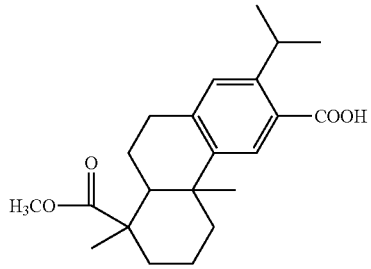

(A11-ex-3)
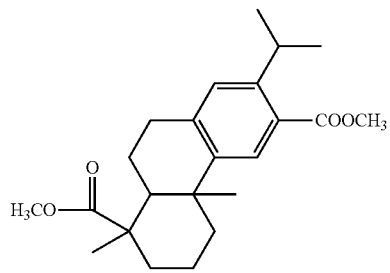

(A11-ex-4)
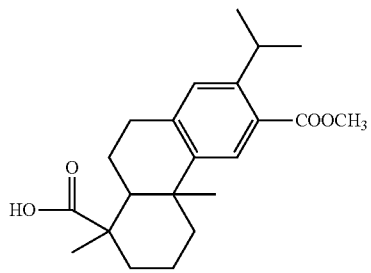

(A11-ex-5)
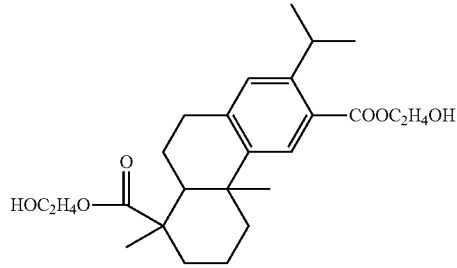

(A11-ex-6)
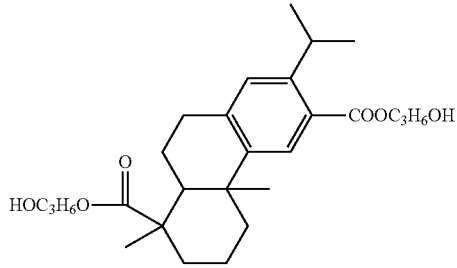

(A11-ex-7)
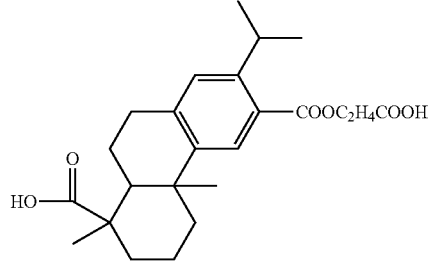

(A11-ex-8)
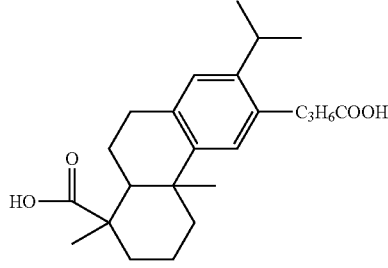

-continued
(A11-ex-9)
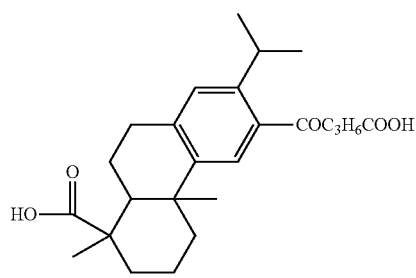
(A11-ex-10)
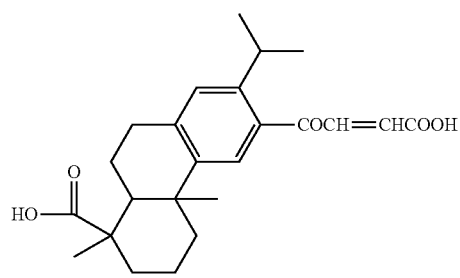
(A11-ex-11)
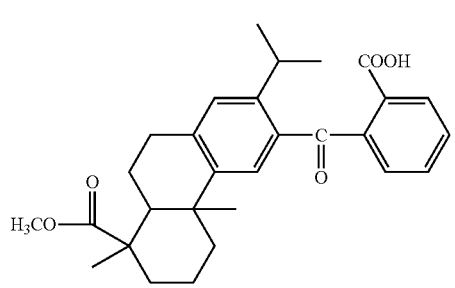
(A11-ex-12)
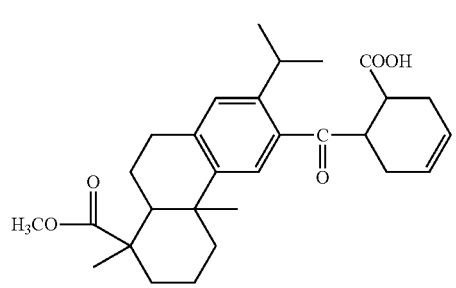
(A11-ex-13)
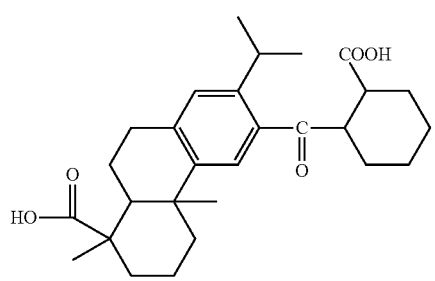
(A11-ex-14)
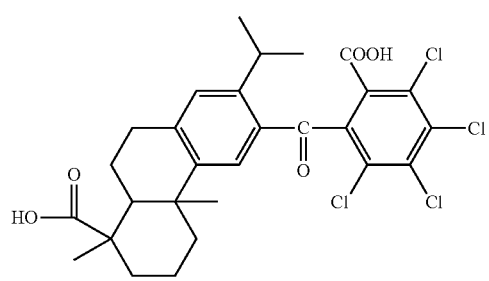
(A11-ex-15)
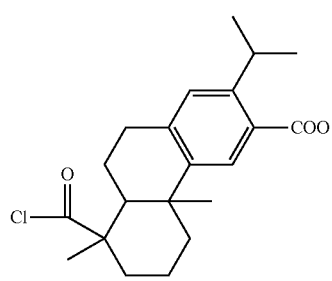
(A11-ex-16)
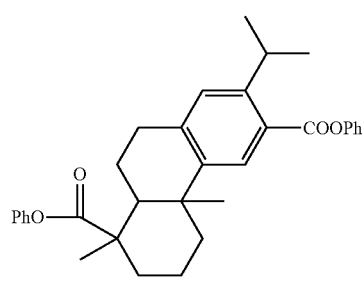
(A11-ex-17)
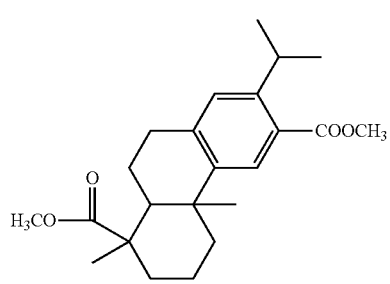
(A11-ex-18)
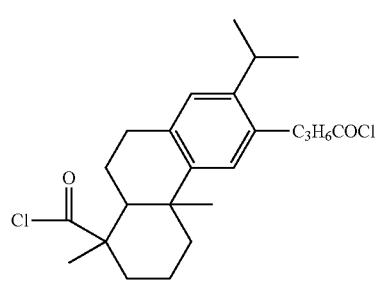

-continued
(A11-ex-19)
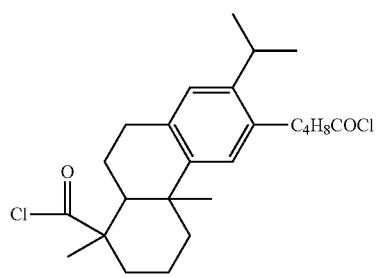
(A11-ex-20)
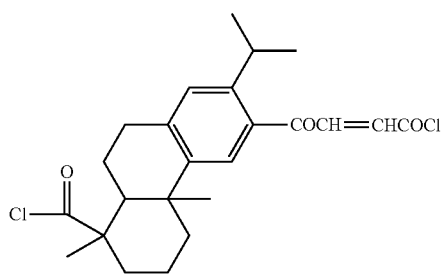
(A11-ex-21)
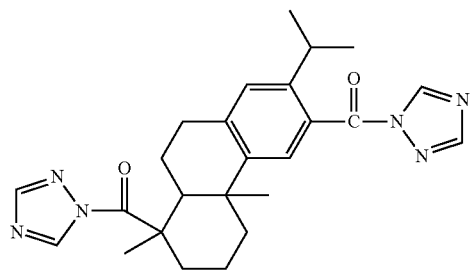
(A11-ex-22)
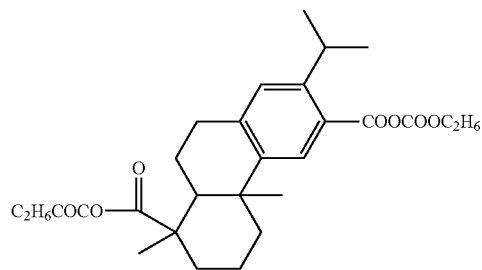
(A11-ex-23)
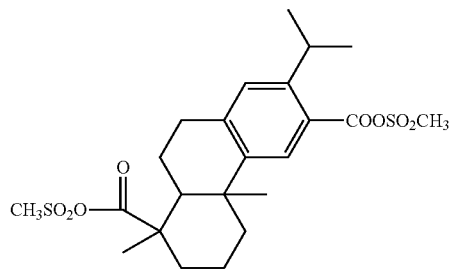
(A11-ex-24)
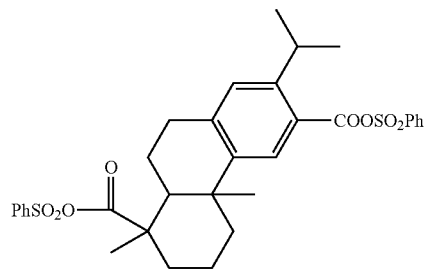
(A11-ex-25)
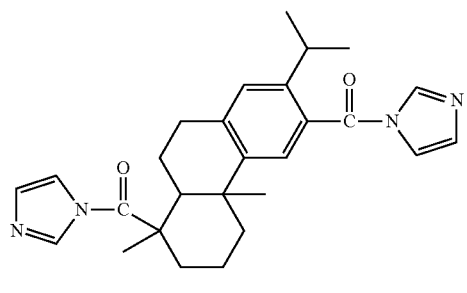
(A21-ex-1)
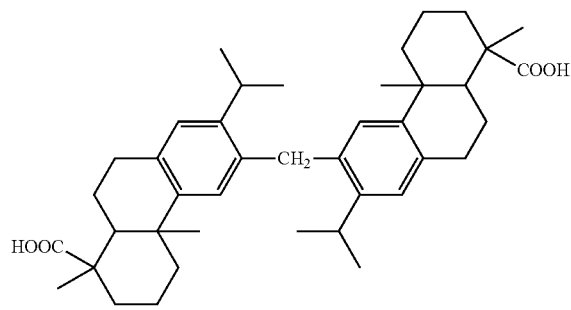
(A21-ex-2)
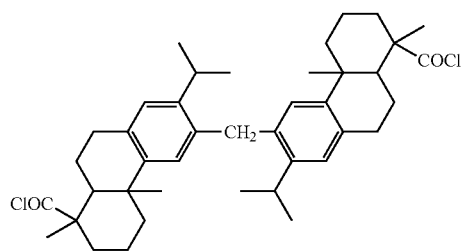
(A21-ex-3)
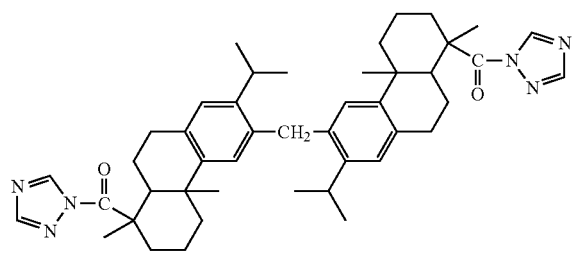

-continued
(A21-ex-4)
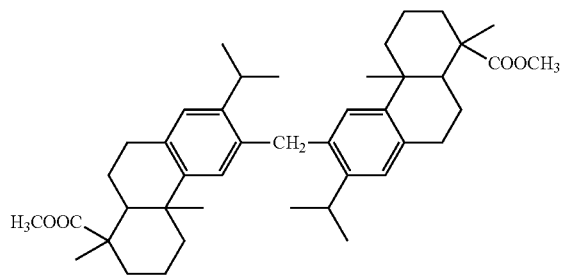
(A21-ex-5)
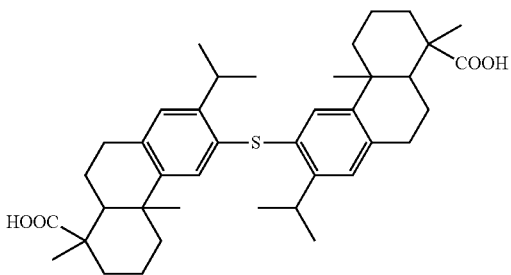
(A21-ex-6)
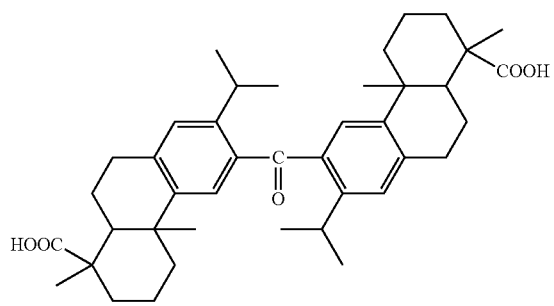
(A21-ex-7)
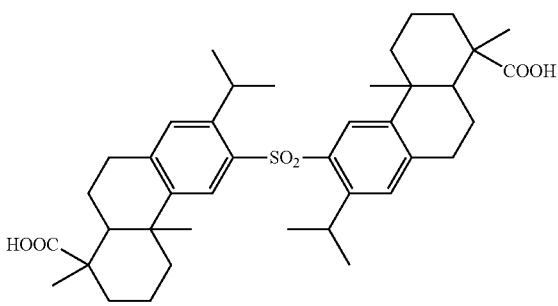
(A21-ex-8)
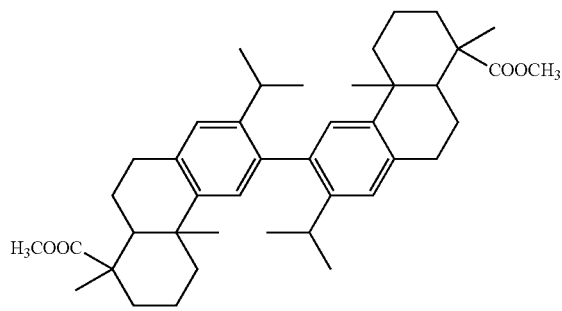
(A21-ex-9)
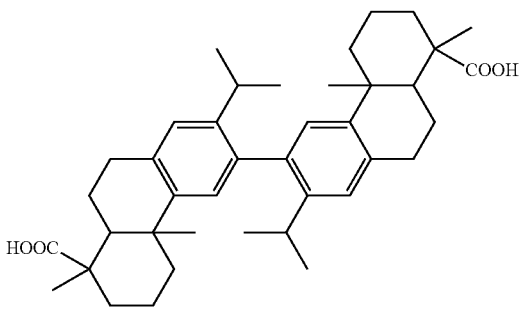
(A21-ex-10)
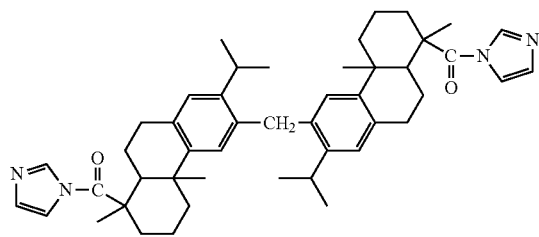
(A21-ex-11)
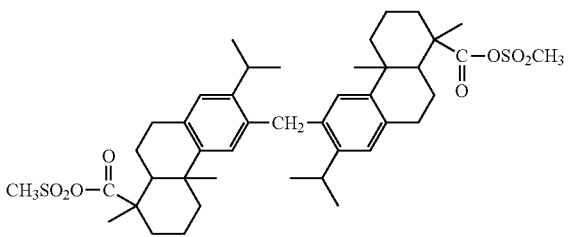
(A21-ex-12)
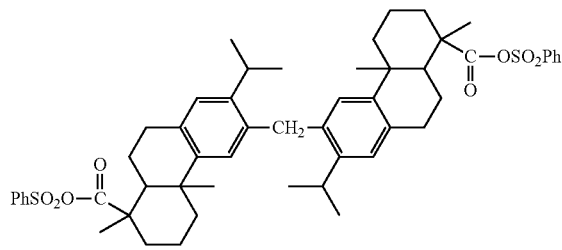
(A31-ex-1)
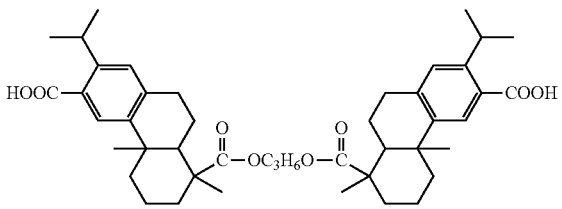

-continued
(A31-ex-2)
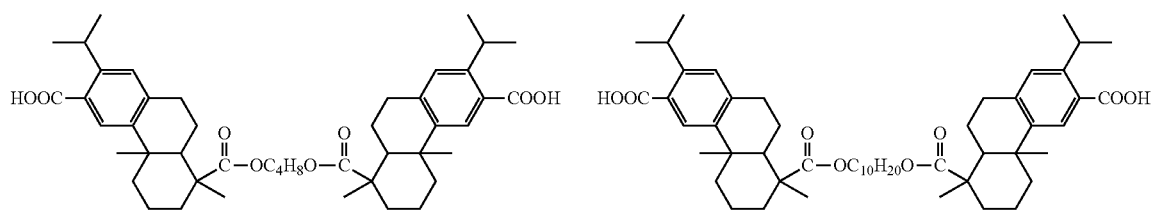
(A31-ex-3)
(A31-ex-4)
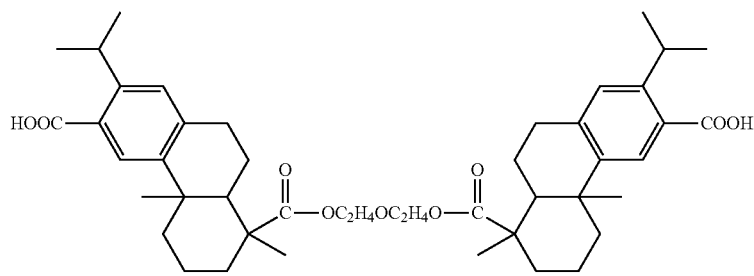
(A31-ex-5)
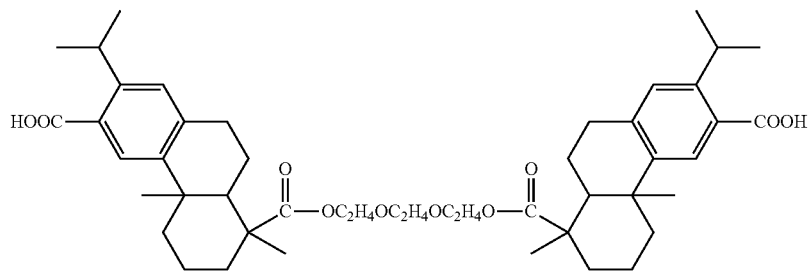
(A31-ex-6)
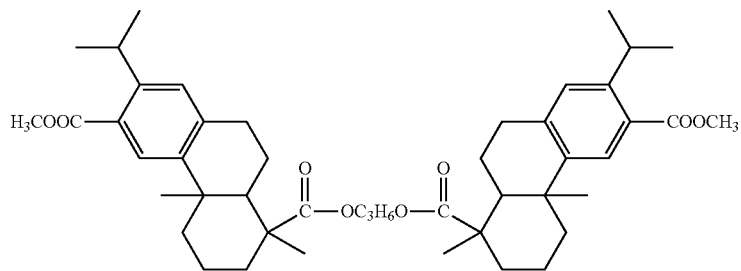
(A31-ex-7)
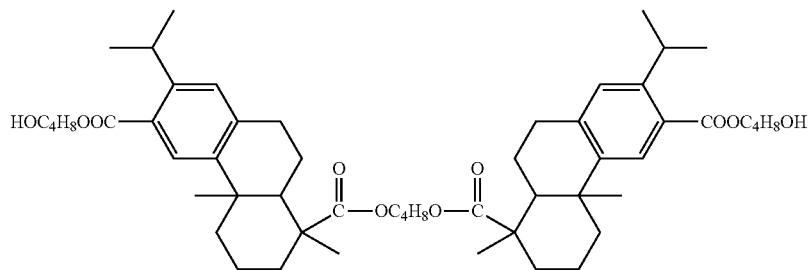
(A31-ex-8)
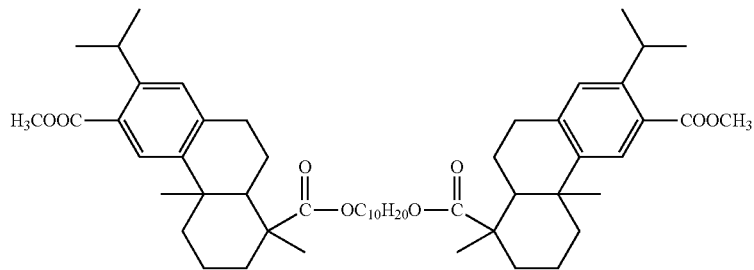

-continued
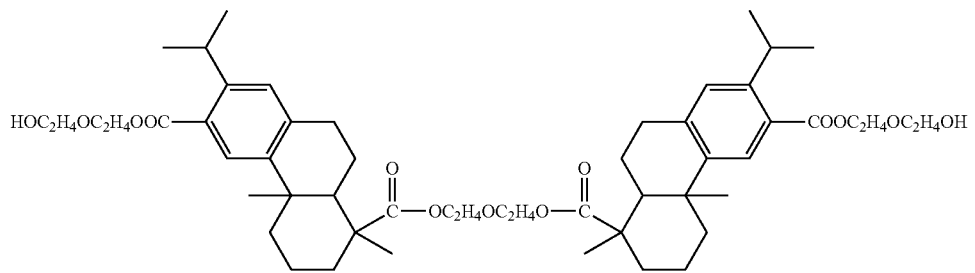
(A31-ex-9)
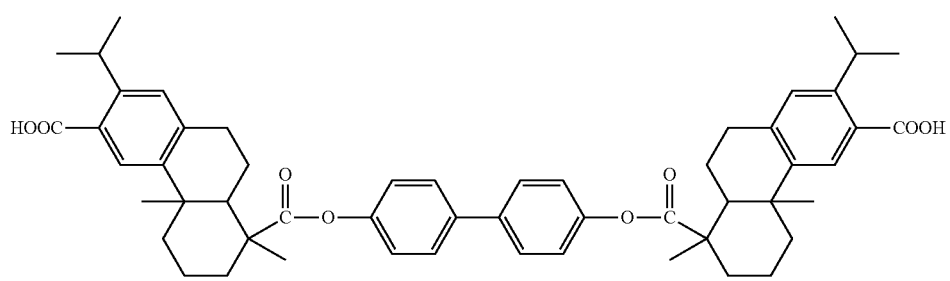
(A31-ex-10)
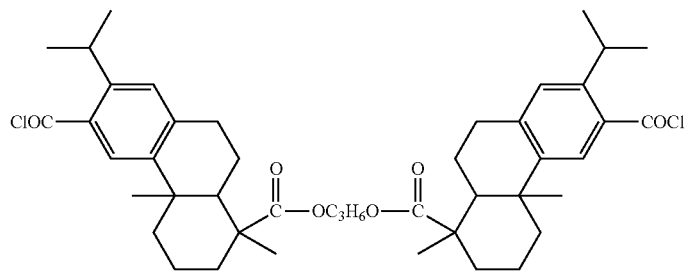
(A31-ex-11)
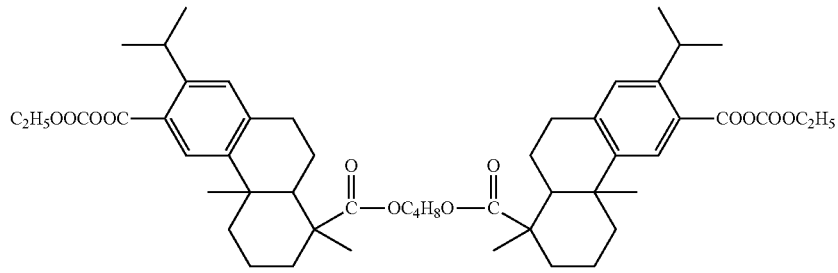
(A31-ex-12)
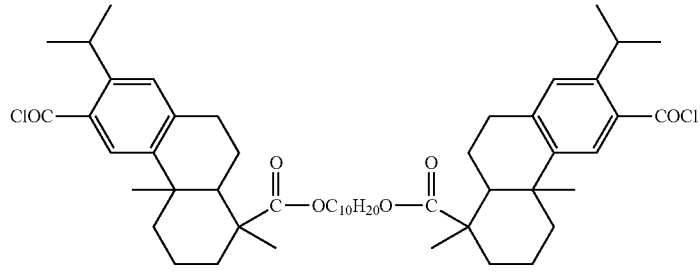
(A31-ex-13)

-continued
(A31-ex-14)
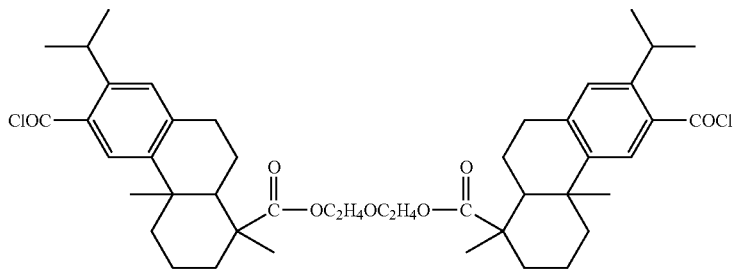
(A31-ex-15)
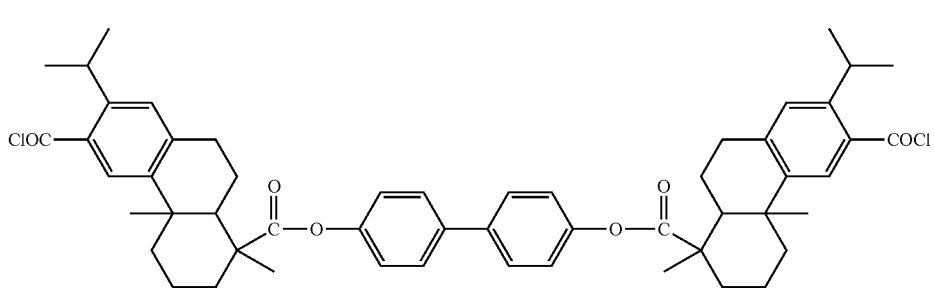
(A31-ex-16)
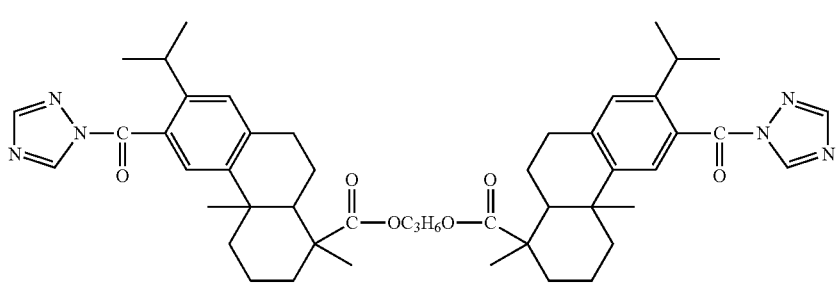
(A31-ex-17)
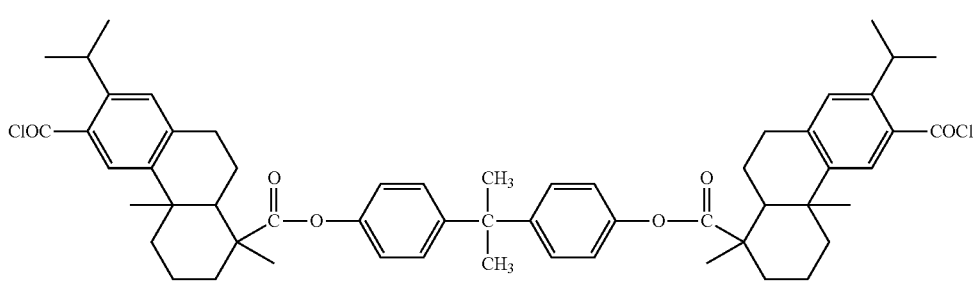
(A31-ex-18)
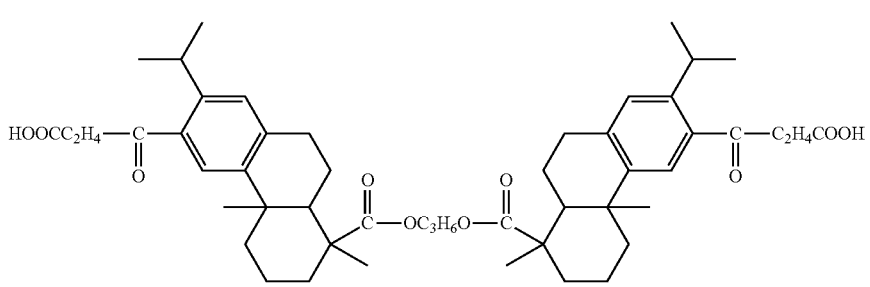

-continued
(A31-ex-19)
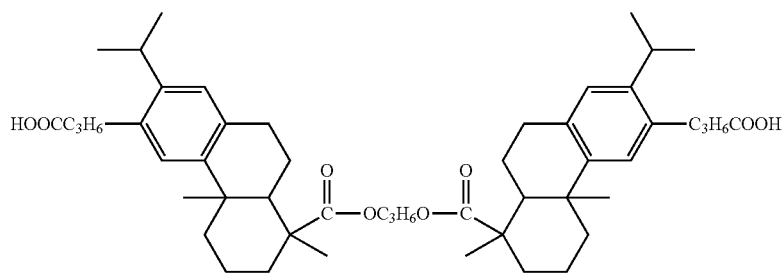
(A31-ex-20)
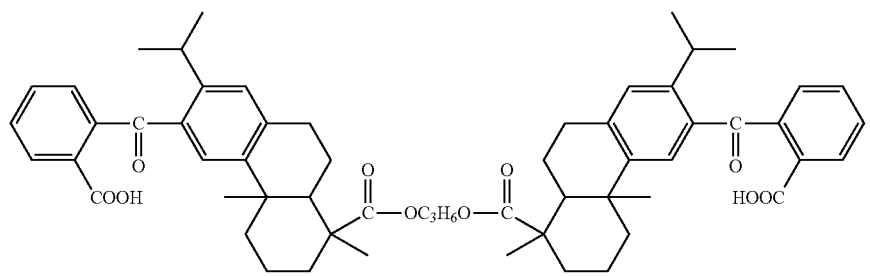
(A31-ex-21)
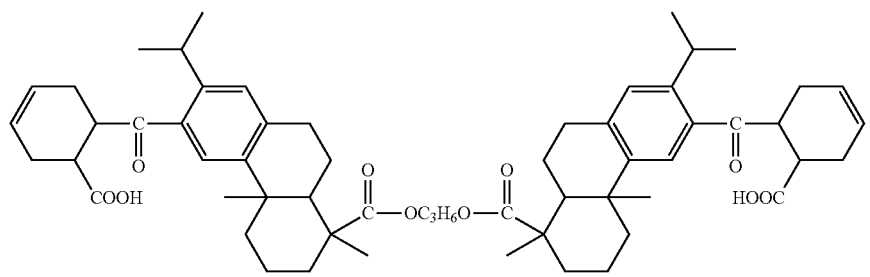
(A31-ex-22)
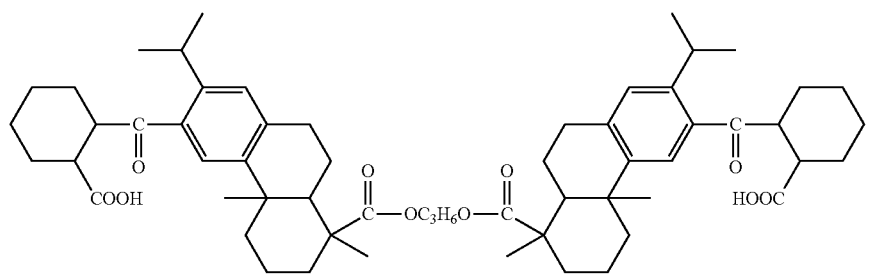
(A31-ex-23)
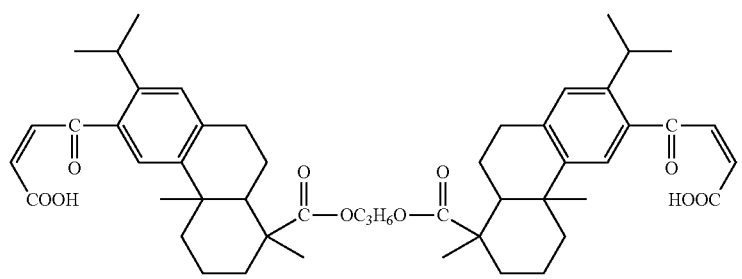

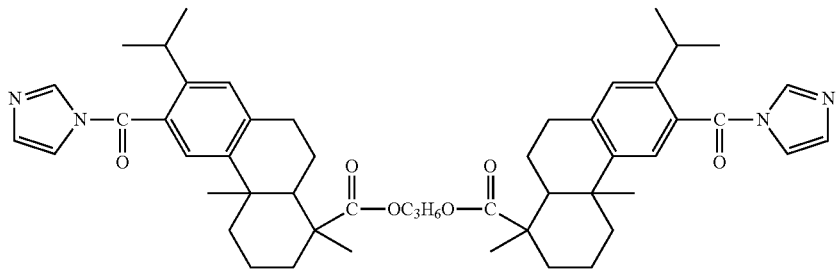
(A31-ex-24)

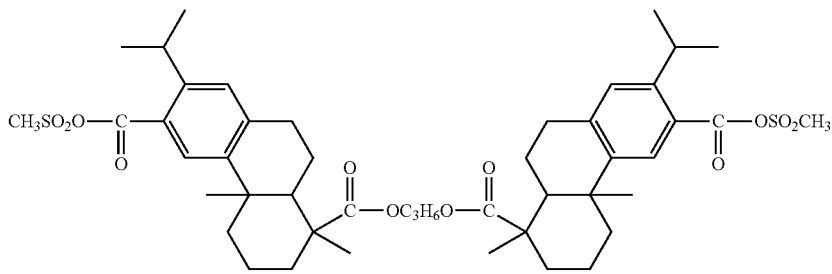
(A31-ex-25)

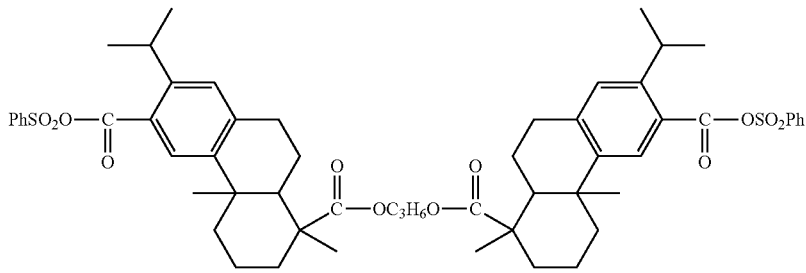
(A31-ex-26)

<8> The polyamide polymer described in any one of <3> to <7>, wherein the repeating unit derived from a diamine compound is derived from at least one selected from the group consisting of diamine compounds represented by the following Formulae (DA-1) to (DA-22):

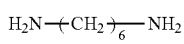 (DA-1)

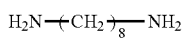 (DA-2)

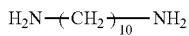 (DA-3)

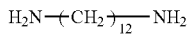 (DA-4)

H$_2$NC$_2$H$_4$OC$_2$H$_4$NH$_2$ (DA-5)

H$_2$NC$_2$H$_4$OC$_2$H$_4$OC$_2$H$_4$NH$_2$ (DA-6)

H$_2$NC$_3$H$_6$OC$_3$H$_6$NH$_2$ (DA-7)

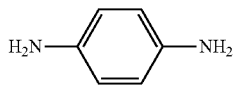 (DA-8)

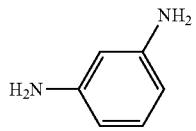 (DA-9)

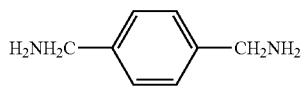 (DA-10)

 (DA-11)

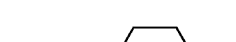 (DA-12)

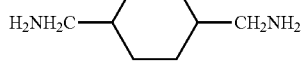 (DA-13)

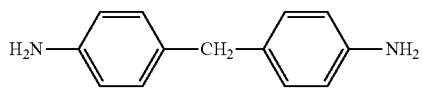 (DA-14)

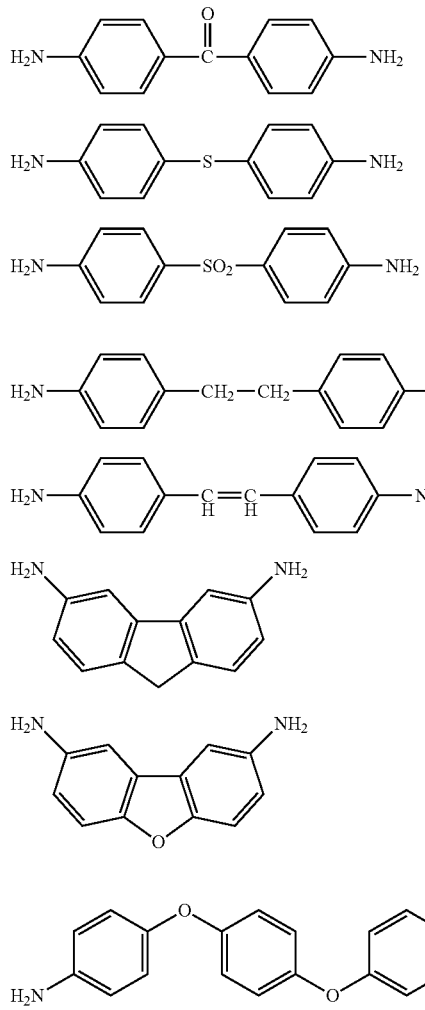

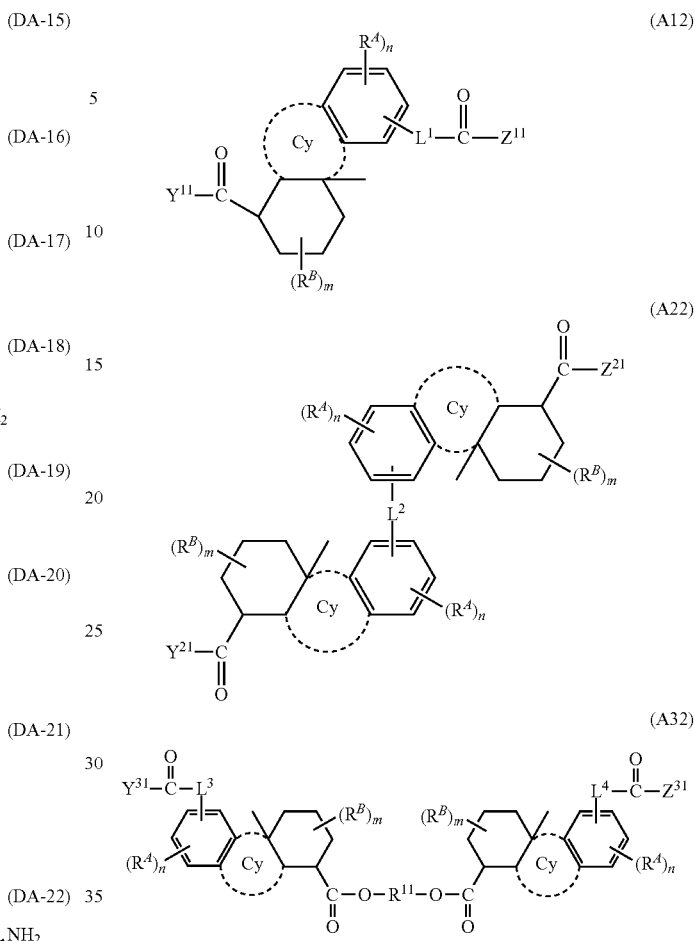

<9> A resin composition, comprising the polyamide polymer described in any one of <1> to <8>, and at least one additive selected from the group consisting of a flame retardant, a moisture absorption inhibitor and a light stabilizer.

<10> A molded product, comprising the polyamide polymer described in any one of <1> to <8>.

<11> A fiber, comprising the polyamide polymer described in any one of <1> to <8>.

<12> A film, comprising the polyamide polymer described in any one of <L> to <8>.

<13> A porous film, comprising the polyamide polymer described in any one of <1> to <8> and having pores in the interior thereof.

<14> The porous film described in <12>, wherein the pores are closed pores having an average pore diameter of from 0.5 μm to 50 μm.

<15> The porous film described in <13> or <14>, which is produced by a solution casting method.

<16> A method for producing a polyamide polymer, the method including a process of polycondensing at least one selected from the group consisting of a compound represented by the following General Formula (A12), a compound represented by the following General Formula (A22) and a compound represented by the following General Formula (A32), with a diamine compound:

wherein $L^1$ represents a single bond or a divalent linking group composed of at least one selected from the group consisting of an alkylene group, an alkenylene group, an arylene group, an oxygen atom and a carbonyl group; $L^2$ represents a single bond or a divalent linking group composed of at least one selected from the group consisting of an oxygen atom, a sulfur atom, a carbonyl group, a sulfonyl group, an alkylene group, an alkenylene group and an arylene group; $L^3$ and $L^4$ each independently represent a single bond or a divalent linking group composed of at least one selected from the group consisting of an alkylene group, an alkenylene group, an arylene group, an oxygen atom and a carbonyl group; $R^{11}$ represents a divalent linking group containing at least one selected from the group consisting of an alkylene group and an arylene group; $Y^{11}$, $Z^{11}$, $Y^{21}$, $Z^{21}$, $Y^{31}$ and $Z^{31}$ each independently represent a leaving group; $R^A$ and $R^B$ each independently represent a hydrogen atom or an alkyl group having 1 to 6 carbon atoms; n and m each independently represent an integer from 0 to 2; and Cy represents an unsaturated 6-membered or 7-membered ring which may contain a heteroatom.

<16> The molded product described in <10>, further containing at least one additive selected from the group consisting of a flame retardant, a moisture absorption inhibitor, and a light stabilizer.

<17> The fiber described in <11>, further containing at least one additive selected from the group consisting of a flame retardant, a moisture absorption inhibitor, and a light stabilizer.

<18> The film described in <12>, further containing at least one additive selected from the group consisting of a flame retardant, a moisture absorption inhibitor, and a light stabilizer.

<19> The porous film described in any one of <13> to <15>, further containing at least one additive selected from the group consisting of a flame retardant, a moisture absorption inhibitor, and a light stabilizer.

Advantageous Effects of Invention

According to the present invention, a polyamide polymer which has excellent heat resistance and which is a naturally derived novel material, and a method for producing the same, can be provided. Furthermore, a resin composition, a molded product, a fiber, a film, and a porous film, each of which contains the polyamide polymer and has excellent heat resistance, can be provided.

DESCRIPTION OF EMBODIMENTS

Figure 1:
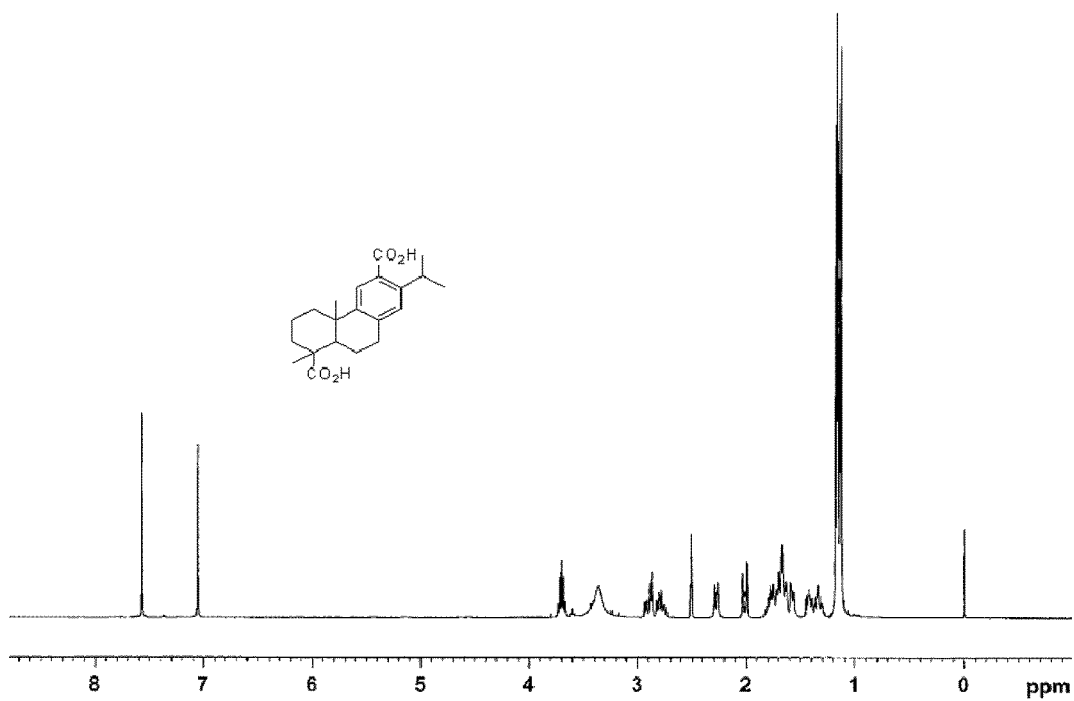
FIG. 1 is a diagram illustrating an example of the $^1$H-NMR spectrum of a dicarboxylic acid compound (1 e) synthesized in Synthesis Example 1.

In the present specification, the expression "(from) . . . to . . . " is intended to indicate a range including the numerical values described before and after the "to" as the lower limit value and the upper limit value.

<Polyamide Polymer>

The polyamide polymer of the present invention (hereinafter, also referred to as "dehydroabietic acid-based polymer") has a configuration in which a partial structure represented by the following Formula (C) constitutes a portion of the main chain.

Furthermore, the polyamide polymer preferably a configuration which includes at least one repeating unit derived from a dicarboxylic acid compound containing a partial structure represented by the following Formula (C), and in which a partial structure represented by the following Formula (C) constitutes a portion of the main chain. The polyamide polymer preferably includes at least one repeating unit derived from a diamine compound. Furthermore, the polyamide polymer may further include, if necessary, a repeating unit derived from a dicarboxylic acid compound which does not contain a partial structure represented by the following Formula (C).

A polyamide polymer having excellent heat resistance can be obtained by including a partial structure represented by the following Formula (C) as a portion of the main chain. The polyamide polymer can be configured to have a lower density than those of ordinary polyamide polymers. This is presumably because, for example, the density of the polyamide polymer is decreased due to relative bulkiness of the partial structure represented by the following Formula (C). The polyamide polymer is highly transparent. This is presumably because, for example, inclusion of a partial structure represented by the following Formula (C) in a portion of the main chain increases amorphousness of the polyamide polymer, and enhances transparency.

The polyamide polymer exhibits high heat resistance. Furthermore, the partial structure represented by Formula (C) carried by the polyamide polymer can be derived from dehydroabietic acid (the following Formula (A)), which can be obtained from rosin and the like originating from pine resin available as a biomass resource.

Therefore, the polyamide polymer can be provided as a novel biomass polymer which is superior to conventional biomass polymers, such as polyamide 11, in terms of heat resistance. Furthermore, the dehydroabietic acid-based polymer can be utilized in applications which utilize the characteristics of high heat resistance, and can be utilized in various applications in a variety of forms such as sheets, films, fibers, molding materials, and the like.

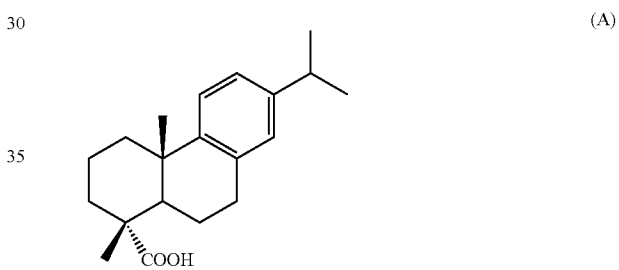

(A)

Hereinafter, the polyamide polymer of the present invention will be described in detail. The polyamide polymer described above is a copolymer obtained by using a dicarboxylic acid compound having a partial structure represented by the following Formula (C) and a diamine compound as raw material monomers, and polymerizing these monomers. The polyamide polymer includes a repeating unit containing a partial structure represented by the following Formula (C) (hereinafter, referred to as "dehydroabietic acid-based skeletal structure") in the molecular structure such that the dehydroabietic acid-based skeletal structure constitutes a portion of the main chain.

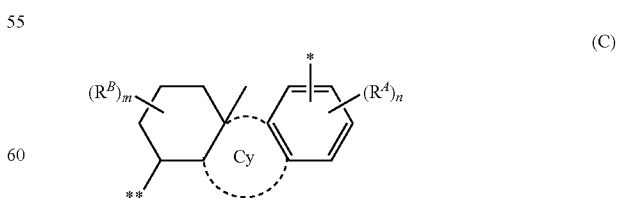

(C)

wherein in the Formula, $R^A$ and $R^B$ each independently represent a hydrogen atom or an alkyl group having 1 to 6 carbon atoms; n and m each independently represent an integer from 0 to 2; Cy represents an unsaturated 6-membered or 7-membered ring which may contain a heteroatom; and * and ** each represent a bonding hand, while * may be a bonding hand extending from $R^A$.

Examples of the alkyl group having 1 to 6 carbon atoms represented by $R^A$ and $R^B$ include a methyl group, an ethyl group, an (iso)propyl group, and a hexyl group, and an alkyl group having 1 to 3 carbon atoms is preferable. A methyl group and an (iso)propyl group are particularly preferable alkyl groups.

Examples of the unsaturated 6-membered ring represented by Cy, which may contain a heteroatom, include cyclohexene and cyclohexenone, and examples of the unsaturated 7-membered ring include cycloheptene, cycloheptenone and the like.

Furthermore, the heteroatom that is contained in the ring of Cy is preferably a nitrogen atom, a sulfur atom, or a phosphorus atom. Among these, a more preferable heteroatom is a nitrogen atom.

Furthermore, regarding the skeletal structure represented by Formula (C), a skeletal structure represented by the following Formula (D) is a preferable embodiment.

In Formula (D), * and ** each represent a bonding hand.

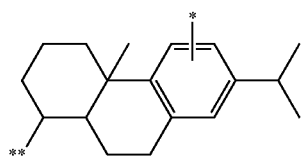

(D)

Examples of preferable structures of the dehydroabietic acid-based skeletal structure include the following structures.

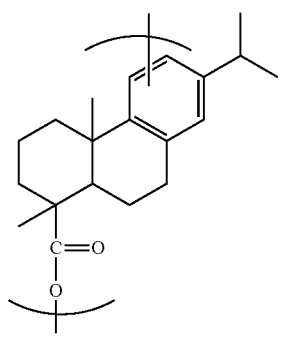

(D-1)

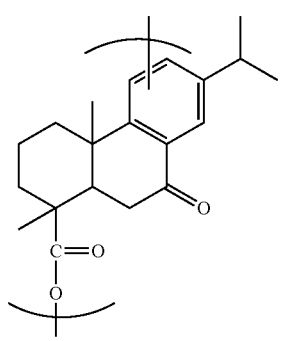

(D-2)

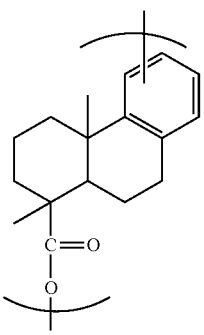

(D-3)

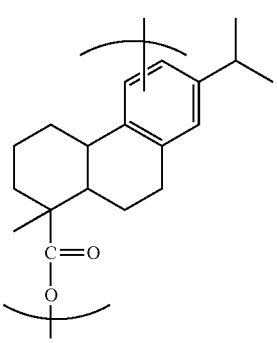

(D-4)

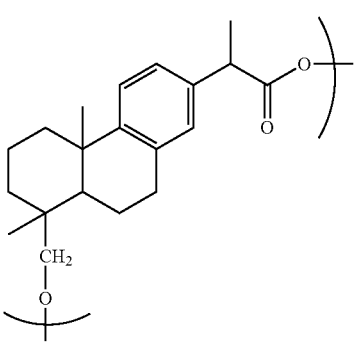

(D-5)

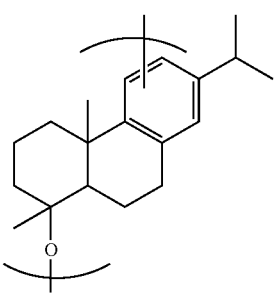

(D-6)

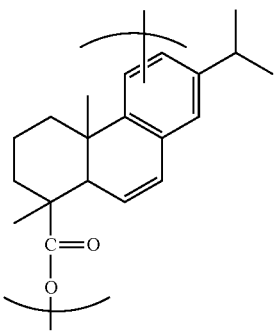

(D-7)

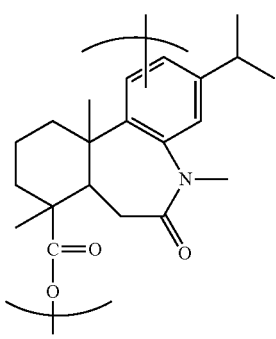

(D-8)

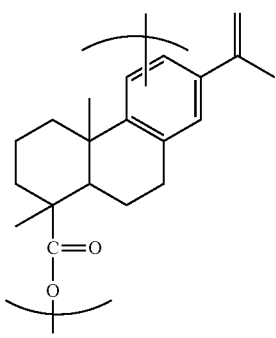

(D-9)

Among the skeletal structures described above, preferable structures are (D-1) and (D-3), and the most preferable structure is (D-1).

The "dehydroabietic acid-based skeletal structure" may further have a substituent. Examples of the substituent that may be carried include an alkyl group having 1 to 6 carbon atoms, an alkoxy group having 1 to 6 carbon atoms, a halogen atom, a hydroxyl group, a nitro group, and an amino group.

Preferable examples among these include a methyl group, an ethyl group, an (iso)propyl group, a chlorine atom, and an iodine atom.

In regard to the polyamide polymer, there are no particular limitations on the configuration and bonding form of the repeating unit derived from a dicarboxylic acid compound containing the dehydroabietic acid-based skeletal structure, as long as the polyamide polymer contains the partial structure represented by the Formula (C), which is the dehydroabietic acid-based skeletal structure, so as to constitute a portion of the main chain.

In regard to the polyamide polymer, there are no particular limitations on the configuration and bonding form of the repeating unit derived from a dicarboxylic acid compound containing the dehydroabietic acid-based skeletal structure, as long as the polyamide polymer contains the partial structure represented by the Formula (C), which is a dehydroabietic acid-based skeletal structure, so as to constitute a portion of the main chain.

The weight average molecular weight of the polyamide polymer is not particularly limited, and is preferably 5,000 to 700,000, and more preferably 10,000 to 500,000. When the weight average molecular weight is in this range, the polyamide polymer has excellent heat resistance, moldability and the like, and is excellent in view of industrial utilization.

Meanwhile, the weight average molecular weight according to the present invention is a value that can be obtained by a (polystyrene-equivalent) molecular weight analysis by gel permeation chromatography (GPC).

The glass transition temperature (Tg) of the polyamide polymer is not particularly limited, and is preferably 100° C. or higher, more preferably 150° C. to 400° C., and even more preferably 15° C. to 350° C. When the glass transition temperature is in this range, the polyamide polymer has excellent heat resistance, moldability and the like, and is excellent in view of industrial utilization.

Meanwhile, the glass transition temperature is measured as an endothermic peak that is observed by using a differential scanning calorimeter over a temperature range of 30° C. to 400° C. under a nitrogen gas stream and under the conditions of a rate of temperature increase of 10° C./min.

The density of the polyamide polymer is not limited, and is preferably 1.30 $g/cm^3$; or less, more preferably 0.90 $g/cm^3$ to 1.25 $g/cm^3$, and even more preferably 1.00 $g/cm^3$ to 1.20 $g/cm^3$. When the density is in this range, the polyamide polymer has excellent heat resistance, moldability and the like, and is excellent in view of industrial utilization.

Meanwhile, the density of the polyamide polymer is measured by using a precision density meter under ordinary conditions.

The polyamide polymer of the present invention has excellent heat resistance. This is speculated to be because the chemostructurally stable tricyclic moiety (tricyclic moiety in Formula (C)) that is carried by the dehydroabietic acid-based skeletal structure is two-dimensionally linked to one another as the main skeletal structure, and because an isopropyl group and a methyl group are substituted at the tricyclic moiety.

As described above, conventional biomass polymers that can be obtained by using biomass resources usually have a problem of exhibiting inferior heat resistance; however, the polyamide polymer of the present invention exhibits excellent heat resistance as described above, even though raw materials originating from biomass resources can be used.

The polyamide polymer also includes derivatives of polyamide polymers obtained by subjecting polyamide polymers having a repeating unit containing a dehydroabietic acid-based skeletal structure to a further chemical treatment.

Examples of the substituent include halogen atoms (F, Cl, Br, and the like), alkyl groups (a methyl group, an isopropyl group, and the like), alkoxy groups (a methoxy group, an ethoxy group, and the like).

[Repeating Unit Derived from Dicarboxylic Acid Compound]

With regard to the repeating unit derived from a dicarboxylic acid compound in the polyamide polymer of the present invention, the structure of the repeating unit derived from a dicarboxylic acid compound is not particularly limited as long as the repeating unit contains the dehydroabietic acid-based skeletal structure such that the skeletal structure constitutes a portion of the main chain of the polyamide polymer. Among these, the repeating unit derived from a dicarboxylic acid compound is preferably at least one selected from a repeating unit represented by the following General Formula (A10), a repeating unit represented by the following General Formula (A20), or a repeating unit represented by the following General Formula (A30), from the viewpoint of heat resistance.

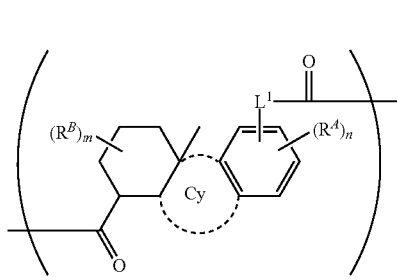

(A10)

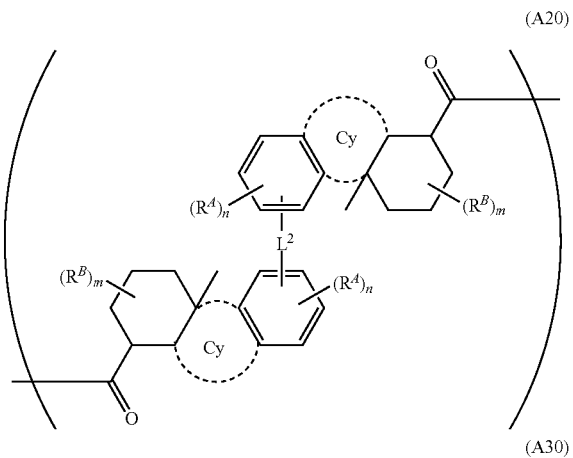

(A20)

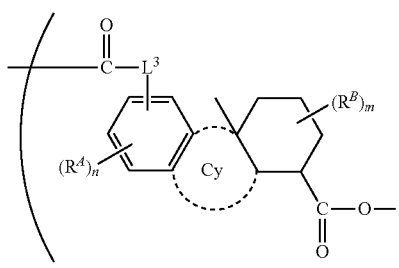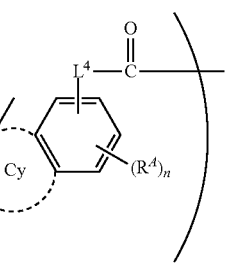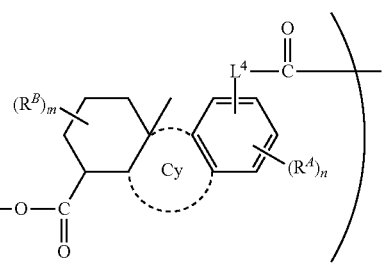

(A30)

In General Formula (A10), L¹ represents a divalent linking group composed of at least one selected from the group consisting of an alkylene group, an alkenylene group, an arylene group, an oxygen atom and a carbonyl group, or a single bond. In General Formula (A20), L² represents a divalent linking group composed of at least one selected from the group consisting of an oxygen atom, a sulfur atom, a carbonyl group, a sulfonyl group, an alkylene group, an alkenylene group and an arylene group, or a single bond. In General Formula (A30), L³ and L⁴ each independently represent a divalent linking group composed of at least one selected from the group consisting of an alkylene group, an alkenylene group, an arylene group, an oxygen atom and a carbonyl group, or a single bond. R¹¹ represents a divalent linking group containing at least one selected from the group consisting of an alkylene group and an arylene group. In General Formulae (A10), (A20) and (A30), $R^A$, $R^B$, n, m and Cy have the same definitions as $R^A$, $R^B$, n, m and Cy in Formula (C), respectively, and the specifics of $R^A$, $R^B$, n, m and Cy, such as preferable definitions thereof, are also the same as those of $R^A$, $R^B$, n, m and Cy in Formula (C), respectively.

In General Formula (A10), L¹ represents a divalent linking group composed of at least one selected from the group consisting of an alkylene group, an alkenylene group, an arylene group, an oxygen atom and a carbonyl group, or a single bond. The alkylene group and alkenylene group may be in the form of a linear or branched chain, or may be cyclic.

From the viewpoint of heat resistance, L¹ is preferably a divalent linking group composed of at least one selected from the group consisting of an alkylene group having 2 to 10 carbon atoms, an alkenylene group having 2 to 10 carbon atoms, an arylene group having 6 to 18 carbon atoms, an oxygen atom and a carbonyl group, or a single bond; and more preferably a divalent linking group composed of at least one selected from the group consisting of a chain alkylene group having 2 to 4 carbon atoms, a cyclic alkylene group having 5 to 6 carbon atoms, a chain alkenylene group having 2 to 4 carbon atoms, a cyclic alkenylene group having 5 to 6 carbon atoms, an arylene group having 6 to 10 carbon atoms, an oxygen atom and a carbonyl group, or a single bond.

The alkylene group, alkenylene group or arylene group that constitutes the linking group L¹ or a portion of the linking group may have a substituent, if possible. Examples of the substituent for the alkylene group, alkenylene group or arylene group include an alkyl group, an aryl group, a hydroxyl group, an alkoxy group, a halogen atom and the like.

Specific examples of the linking group represented by L¹ include the following linking groups, but the present invention is not limited to these. In the following specific examples, * represents the position of bonding to the dehydroabietic acid-based skeletal structure, and ** represents the position of bonding to the carbonyl group.

$$*\text{—}CH_2\text{—}** \tag{L1-ex-1}$$

$$*\text{—}\underset{\underset{O}{\|}}{C}\text{—}CH_2\text{—}** \tag{L1-ex-2}$$

$$*\text{—}C_2H_4\text{—}** \tag{L1-ex-3}$$

$$*\text{—}\underset{\underset{O}{\|}}{C}\text{—}C_2H_4\text{—}** \tag{L1-ex-4}$$

$$*\text{—}C_3H_6\text{—}** \tag{L1-ex-5}$$

$$*\text{—}\underset{\underset{O}{\|}}{C}\text{—}C_3H_6\text{—}** \tag{L1-ex-6}$$

$$*\text{—}C_4H_8\text{—}** \tag{L1-ex-7}$$

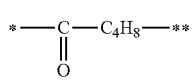 (L1-ex-8)

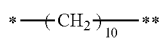 (L1-ex-9)

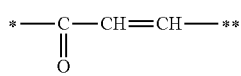 (L1-ex-10)

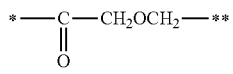 (L1-ex-11)

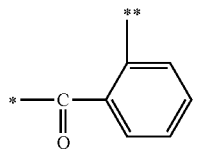 (L1-ex-12)

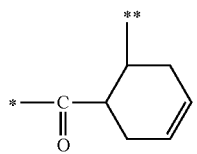 (L1-ex-13)

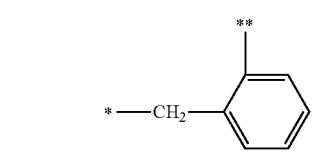 (L1-ex-14)

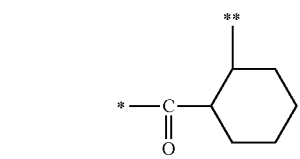 (L1-ex-15)

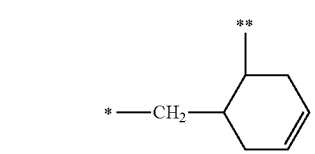 (L1-ex-16)

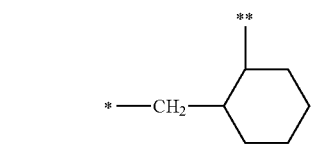 (L1-ex-17)

$L^1$ in General Formula (A10) is preferably a single bond, (L1-ex-4), (L1-ex-10) or (L1-ex-12), and more preferably a single bond, from the viewpoint of heat resistance.

The position of bonding of L1 to the dehydroabietic acid-based skeletal structure may be any of the 11-position, 12-position and 14-position in the case where the isopropyl group of the dehydroabietic acid is assigned the 13-position, but the position of bonding is preferably the 12-position or the 14-position, and more preferably the 12-position.

According to a favorable embodiment of the polyamide polymer, the polyamide polymer contains, in a repeating unit, a dimer structure which is formed by two dehydroabietic acid-based skeletal structures that are bonded together directly or through a linking group, as a portion of the main chain. The repeating unit containing this dimer structure is represented by, for example, the General Formula (A20).

In General Formula (A20), $L^2$ represents a divalent linking group composed of at least one selected from the group consisting of an oxygen atom, a sulfur atom, a carbonyl group, a sulfonyl group, an alkylene group, an alkenylene group and an arylene group, or a single bond. The alkylene group and the alkenylene group may be in the form of a linear or branched chain, or may be cyclic.

The linking group represented by $L^2$ is preferably composed of at least one selected from the group consisting of an oxygen atom, a sulfur atom, a carbonyl group, a sulfonyl group, an alkylene group having 2 to 10 carbon atoms, an alkenylene group having 2 to 10 carbon atoms, and an arylene group having 6 to 18 carbon atoms, from the viewpoint of heat resistance. $L^2$ is more preferably a divalent linking group composed of at least one selected from the group consisting of an oxygen atom, a sulfur atom, a carbonyl group, a sulfonyl group, a chain alkylene group having 2 to 4 carbon atoms, a cyclic alkylene group having 5 to 6 carbon atoms, a chain alkenylene group having 2 to 4 carbon atoms, a cyclic alkenylene group having 5 to 6 carbon atoms, and an arylene group having 6 to 8 carbon atoms, or a single bond.

The alkylene group, alkenylene group or arylene group that constitutes the linking group represented by $L^2$ or a portion thereof may have a substituent, if possible. Examples of the substituent for the alkylene group, alkenylene group or arylene group include the same substituents as those for $L^1$.

Specific examples of the linking group represented by $L^2$ include the following linking groups, but the present invention is not limited to these.

 (L2-ex-1)

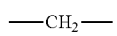 (L2-ex-2)

 (L2-ex-3)

 (L2-ex-4)

 (L2-ex-5)

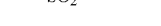 (L2-ex-6)

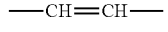 (L2-ex-7)

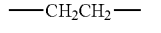 (L2-ex-8)

 (L2-ex-9)

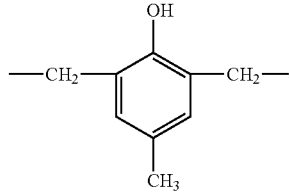

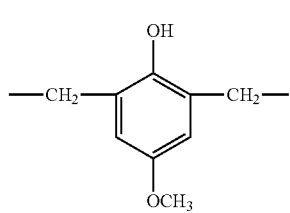 (L2-ex-10)

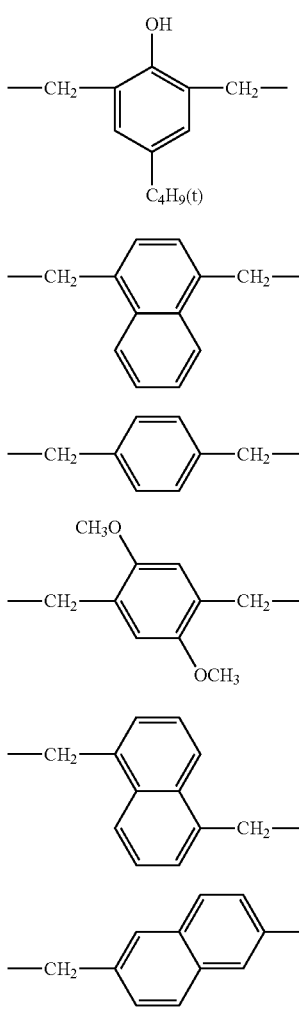

From the viewpoint of heat resistance. $L^2$ is preferably (L2-ex-2), (L2-ex-5), (L2-ex-9) or (L2-ex-11), and more preferably (L2-ex-2).

The positions of bonding of $L^2$ to the two dehydroabietic skeletal structures may be each independently any of the 11-position, 12-position or 14-position in the case where the isopropyl group of dehydroabietic acid is assigned the 13-position, and the positions of bonding are each preferably the 12-position or the 14-position, and more preferably the 12-position.

In General Formula (A30), $L^3$ and $L^4$ each independently represent a divalent linking group composed of at least one selected from the group consisting of an alkylene group, an alkenylene group, an arylene group, an oxygen atom and a carbonyl group, or a single bond.

$L^3$ and $L^4$ each have the same definitions as $L^1$ in General Formula (A10), and preferable definitions of $L^3$ and $L^4$ are also the same as those of $L^1$ in General Formula (A10).

The positions of bonding of $L^3$ and $L^4$ to the dehydroabietic acid-based skeletal structure may be each independently any of the 11-position, 12-position or 14-position in the case where the isopropyl group of the dehydroabietic acid is assigned the 13-position, but the positions of bonding are each preferably the 12-position or the 14-position, and more preferably the 12-position.

$R^{11}$ represents a divalent linking group containing at least one selected from the group consisting of an alkylene group and an arylene group.

$R^{11}$ may contain a group other than alkylene groups and arylene groups, and examples of groups other than alkylene groups and arylene groups include an oxygen atom, a carbonyl group, an ester group, an ether group and the like.

Furthermore, $R^{11}$ may contain at least one selected from the group consisting of an alkylene group and an arylene group. $R^{11}$ may contain two kinds selected from the group consisting of an alkylene group and an arylene group. $R^{11}$ may contain one or more kinds of alkylene group and one or more kinds of arylene group. In addition, $R^{11}$ may further contain at least one selected from the group consisting of an oxygen atom, a carbonyl group, an ester group and an ether group.

The alkylene group for $R^{11}$ may be in the form of a linear or branched chain, may be cyclic, or may be a combination of a chain alkylene group and a cyclic alkylene group. Furthermore, the number of carbon atoms of the alkylene group is not particularly limited. From the viewpoints of heat resistance and moldability, the alkylene group preferably has 1 to 30 carbon atoms, and more preferably has 2 to 18 carbon atoms.

Furthermore, the alkylene group for $R^{11}$ may have a substituent. The substituent for the alkylene group of $R^{11}$ has the same definition as the substituent for $L^1$ in General Formula (A10). Also, when the alkylene group for $R^{11}$ has two or more substituents, those substituents may be linked to each other and form a ring.

Specific examples of the alkylene group for $R^{11}$ include, for example, —$C_nH_{2n}$— (wherein n represents an integer from 1 to 30, and preferably from 2 to 18), and —$C_mH_{2m}$-(cyclo-$C_6H_{10}$)—$C_nH_{2n}$— (wherein m and n each independently represent an integer from 0 to 4, and preferably 1 to 2).

More specific examples thereof include —$CH_2$—, —$C_2H_4$—, —$C_3H_6$—, —$C_4H_8$—, —$C_8H_{16}$—, —$C_{10}H_{20}$—, —$CH_2$—$CH(CH_3)$—, —$CH_2$(cyclo-$C_6H_{10}$)$CH_2$—, a 1,4-trans-cyclohexylene group, —$C_{18}H_{36}$— and the like.

The number of carbon atoms of the arylene group for $R^{11}$ is not particularly limited. From the viewpoints of heat resistance and moldability, the arylene group preferably has 6 to 18 carbon atoms, and more preferably has 6 to 10 carbon atoms.

The arylene group for $R^{11}$ may have a substituent. The substituent for the arylene group of $R^{11}$ has the same definition as the substituent for $L^1$ in General Formula (A10), and preferable definitions thereof are also the same as those of $L^1$ in General Formula (A10). Furthermore, when the arylene group for $R^{11}$ has two or more substituents, those substituents may be linked to each other to form a ring.

Specific examples of the arylene group for $R^{11}$ include, for example, a phenylene group, a biphenylene group, and a naphthylene group. More specific examples include a 1,4-phenylene group, a 1,3-phenylene group, a 2,6-naphthylene group and the like.

When $R^{11}$ is a divalent linking group composed of two or more arylene groups, specific examples thereof include, for example, a 4,4'-biphenylene group and a terphenylene group.

Furthermore, when $R^{11}$ is a divalent linking group composed of at least one alkylene group and at least one arylene group, specific examples thereof include, for example, —$C_6H_4(C_iH_{2i})C_6H_4$— (wherein i represents an integer from 1 to 8, and preferably from 1 to 4), —$C_jH_{2j}CH_6H_4C_kH_{2k}$— (wherein j and k each independently represent an integer from 0 to 4, and preferably 1 or 2; however, j and k are not simultaneously 0).

More specific examples include —C$_6$H$_4$C(CH$_3$)$_2$C$_6$H$_4$—, —CH$_2$C$_6$H$_4$CH$_2$—, —CH$_2$CH$_2$C$_6$H$_4$CH$_2$CH$_2$— and the like.

Examples of R$^{11}$ in General Formula (A30) that are preferable from the viewpoints of heat resistance and moldability include the divalent linking groups shown below, but the present invention is not limited to these.

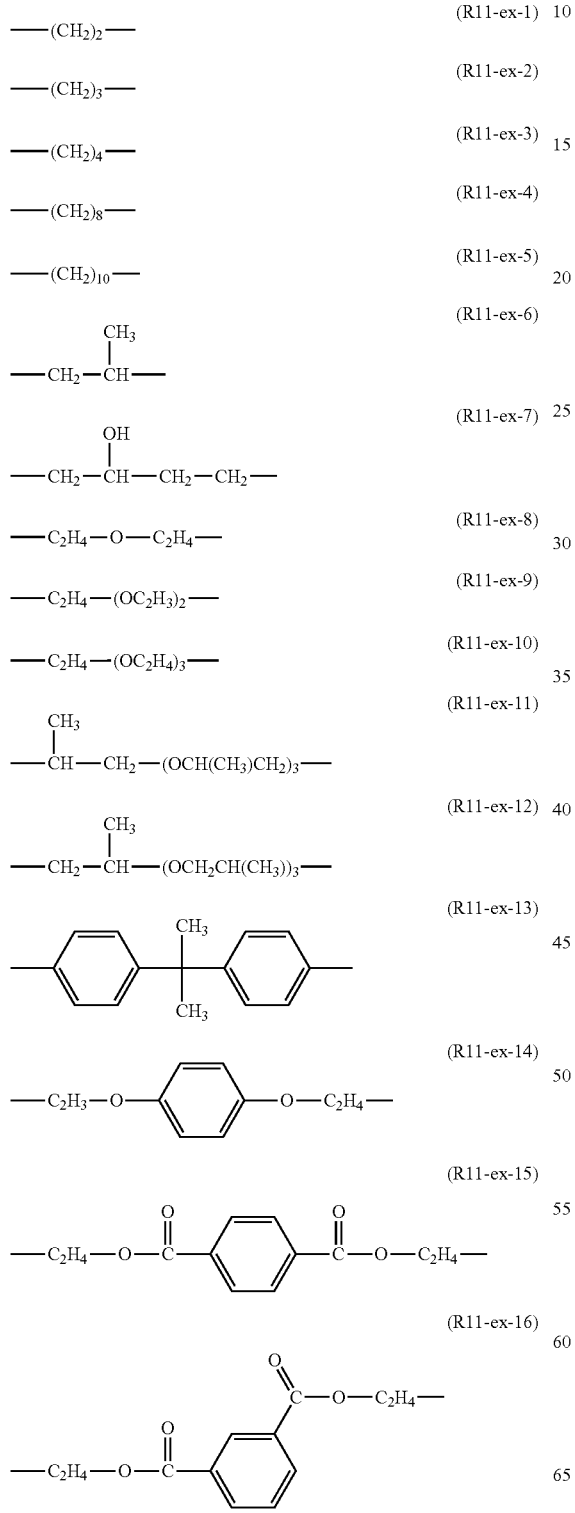

—(CH$_2$)$_2$— (R11-ex-1)

—(CH$_2$)$_3$— (R11-ex-2)

—(CH$_2$)$_4$— (R11-ex-3)

—(CH$_2$)$_8$— (R11-ex-4)

—(CH$_2$)$_{10}$— (R11-ex-5)

(R11-ex-6)

(R11-ex-7)

—C$_2$H$_4$—O—C$_2$H$_4$— (R11-ex-8)

—C$_2$H$_4$—(OC$_2$H$_3$)$_2$— (R11-ex-9)

—C$_2$H$_4$—(OC$_2$H$_4$)$_3$— (R11-ex-10)

(R11-ex-11)

(R11-ex-12)

(R11-ex-13)

(R11-ex-14)

(R11-ex-15)

(R11-ex-16)

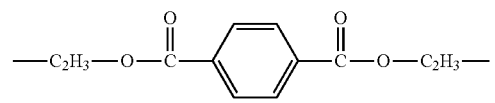 (R11-ex-17)

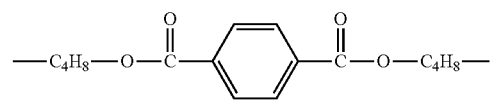 (R11-ex-18)

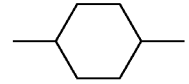 (R11-ex-19)

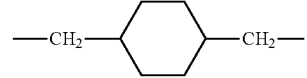 (R11-ex-20)

—C$_{18}$H$_{38}$— (R11-ex-21)

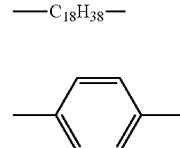 (R11-ex-22)

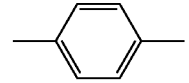 (R11-ex-23)

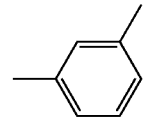 (R11-ex-24)

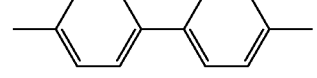 (R11-ex-25)

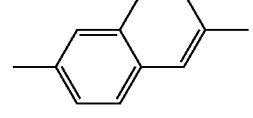 (R11-ex-26)

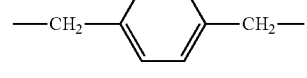 (R11-ex-27)

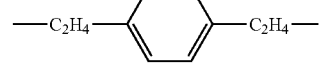

Among these, more preferable examples of the divalent linking group represented by R$^{11}$ include (R11-ex-2), (R11-ex-3), (R11-ex-5), (R11-ex-8), (R11-ex-9), (R11-ex-13), (R11-ex-22), and (R11-ex-24).

Specific examples of the repeating unit represented by General Formula (A30) are shown below, but the present invention is not limited to these.

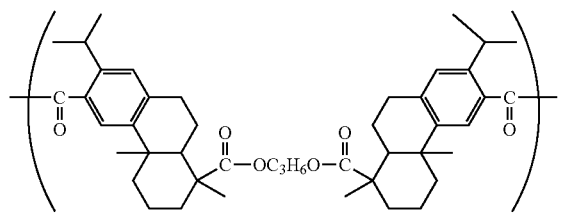
(A3-ex-1)
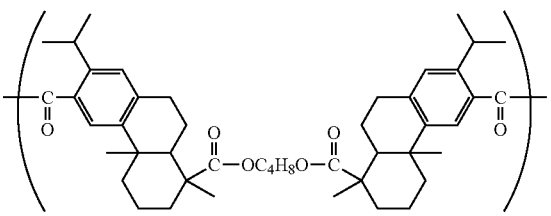
(A3-ex-2)
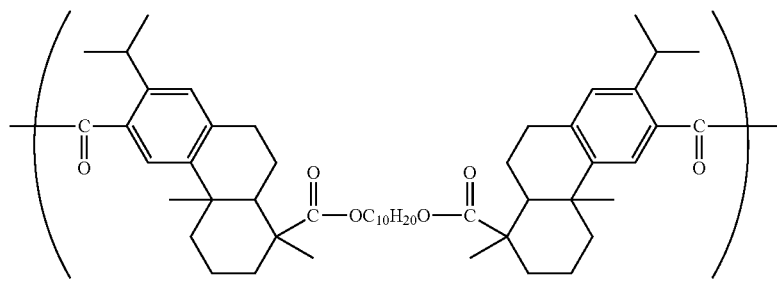
(A3-ex-3)
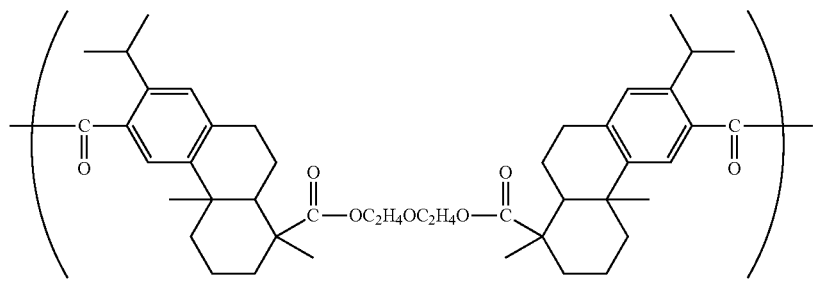
(A3-ex-4)
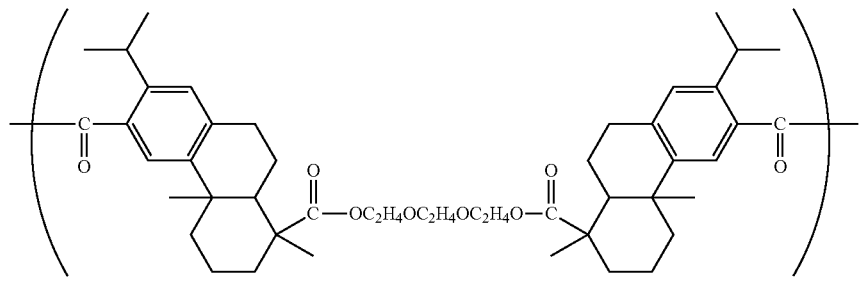
(A3-ex-5)
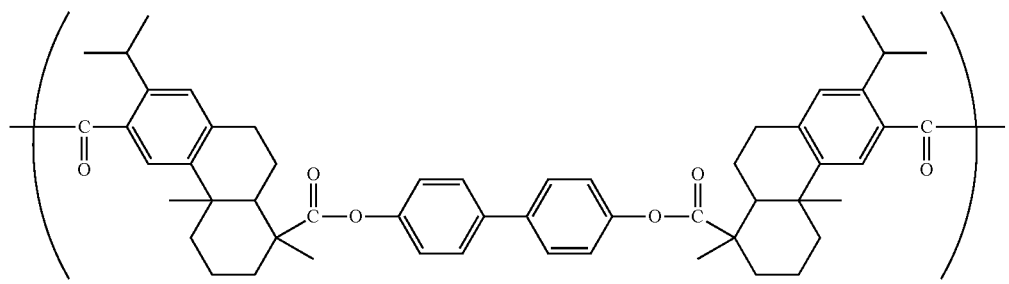
(A3-ex-6)

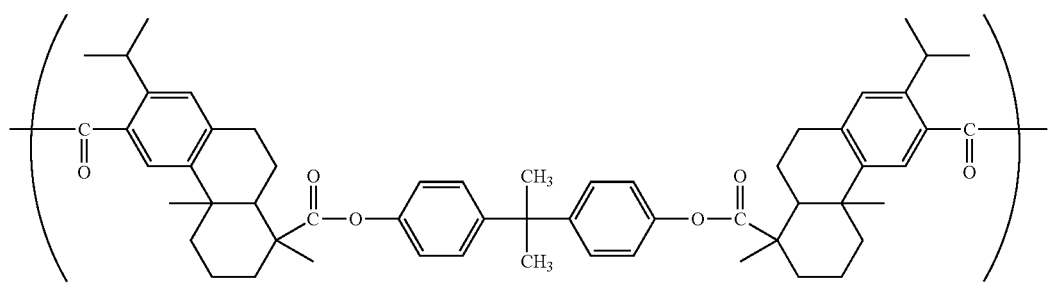
(A3-ex-7)
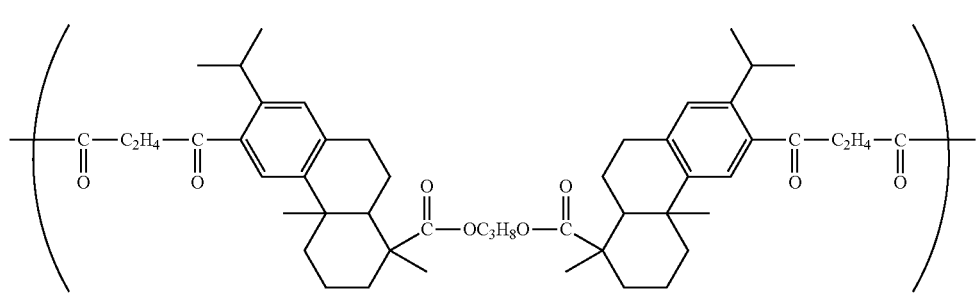
(A3-ex-8)
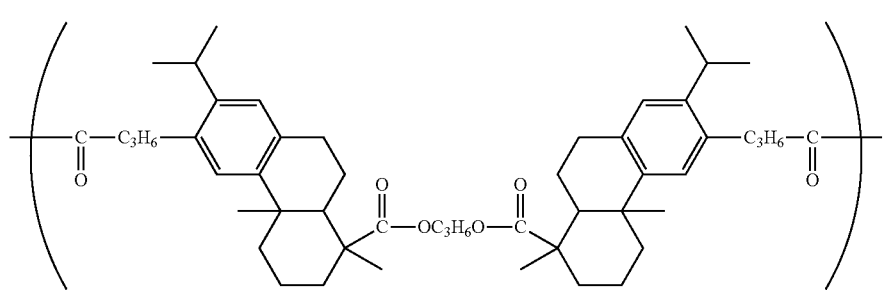
(A3-ex-9)
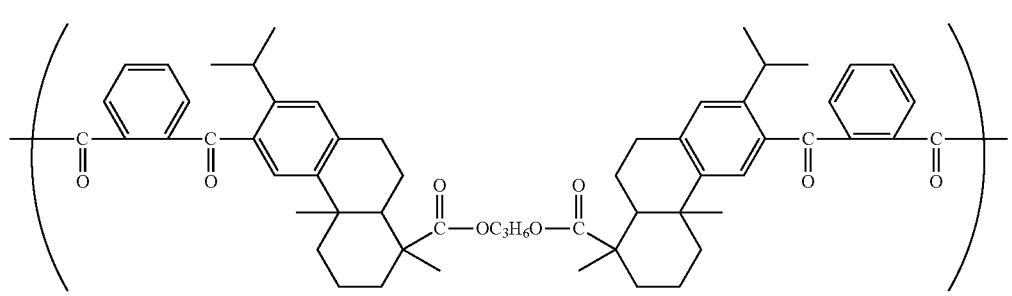
(A3-ex-10)
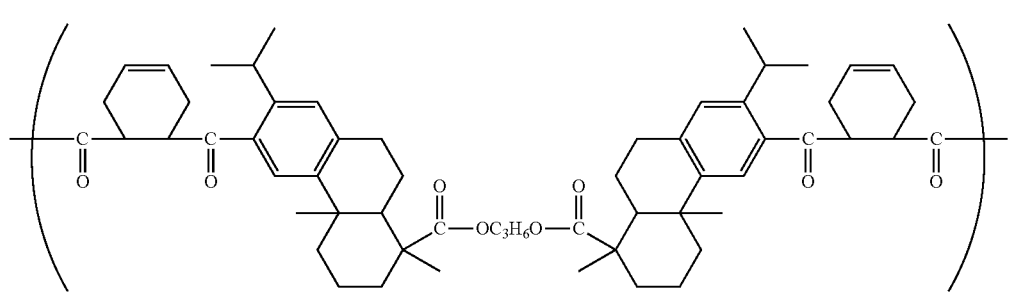
(A3-ex-11)

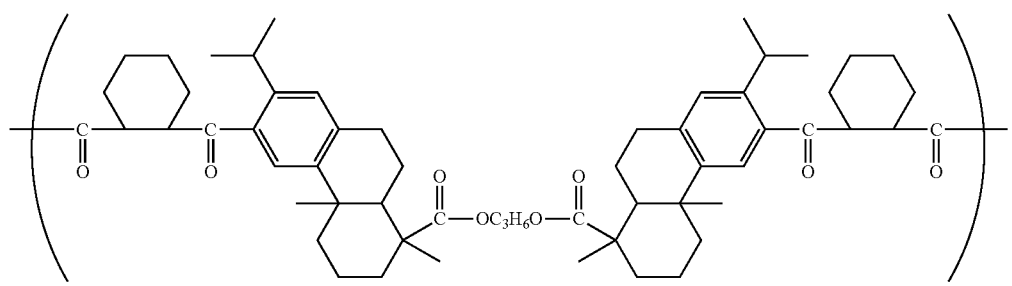

(A3-ex-12)

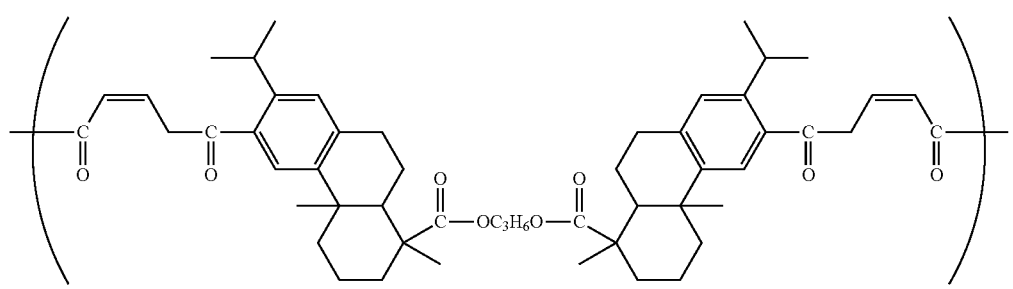

(A3-ex-13)

The repeating unit derived from a dicarboxylic acid compound described above is preferably at least one selected from a repeating unit represented by the following General Formula (A1), a repeating unit represented by the following General Formula (A2), or a repeating unit represented by the following General Formula (A3), from the viewpoint of further enhancing heat resistance.

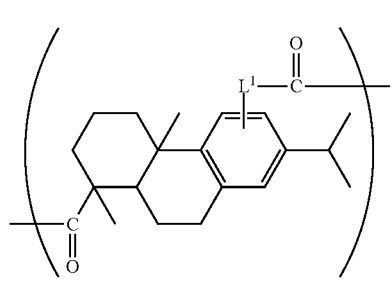

(A1)

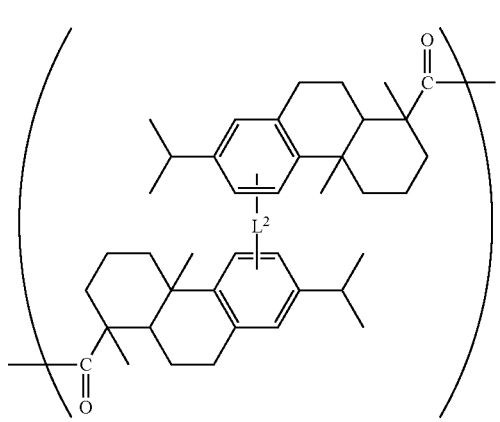

(A2)

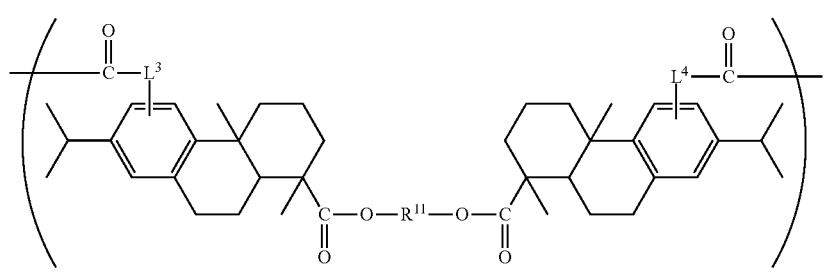

(A3)

wherein in General Formula (A1), General Formula (A2) and General Formula (A3), $L^1$, $L^2$, $L^3$, $L^4$, and $R^{11}$ have the same definitions as $L^1$, $L^2$, $L^3$, $L^4$, and $R^{11}$ in General Formula (A10), General Formula (A20) and General Formula (A30), respectively, and preferable definitions thereof are also the same as those of $L^1$, $L^2$, $L^3$, $L^4$, and $R^{11}$ in General Formula (A10), General Formula (A20) and General Formula (A30), respectively.

Among the repeating units derived from dicarboxylic acid compounds that constitute the polyamide polymer, the total content by percentage of the repeating unit represented by General Formula (A10), the repeating unit represented by General Formula (A20) and the repeating unit represented by General Formula (A30) is not particularly limited. However, when the total amount of the repeating units derived from dicarboxylic acid compounds is assumed to be 50% by mole, the total content by percentage of the repeating unit represented by General Formula (A10), the repeating unit represented by General Formula (A20) and the repeating unit represented by General Formula (A30) is preferably 10% by mole or more, more preferably 20% by mole or more, even more preferably 30% by mole or more, and still more preferably 40% by mole or more, from the viewpoints of heat resistance and density.

The polyamide polymer may include two or more kinds of repeating units which are derived from dicarboxylic acid compounds, and selected from the group consisting of a repeating unit represented by General Formula (A10), a repeating unit represented by General Formula (A20), and a repeating unit represented by General Formula (A30). When the polyamide polymer includes two or more kinds of repeating units derived from dicarboxylic acid compounds, the content ratio of the repeating units is appropriately selected according to the purpose.

Furthermore, when the polyamide polymer includes two or more kinds of repeating units derived from dicarboxylic acid compounds, those may be repeating units represented by the same general formula, or may be repeating units respectively represented by different general formulae.

The polyamide polymer includes at least one repeating unit derived from a dicarboxylic acid compound containing a dehydroabietic acid-based skeletal structure. If necessary, the polyamide polymer may also include at least one kind of other repeating unit derived from a dicarboxylic acid compound that does not contain a dehydroabietic acid-based skeleton.

Regarding the dicarboxylic acid compound that does not contain a dehydroabietic acid-based skeletal structure, any dicarboxylic acid compound that is usually used for forming a polyamide polymer may be used without any particular limitations, and for example, the dicarboxylic acid compounds described in Gosei Kobunshi (Synthetic Polymers) V (Asakura Publishing Co., Ltd.), p. 63-91, and the like may be used.

Examples of the dicarboxylic acid compound that does not contain a dehydroabietic acid-based skeletal structure include aromatic dicarboxylic acids such as phthalic acid, terephthalic acid, isophthalic acid and naphthalenedicarboxylic acid; and aliphatic dicarboxylic acids such as cyclohexanedicarboxylic acid, dicyclohexanedicarboxylic acid, succinic acid, adipic acid, sebacic acid, brassylic acid, maleic acid, and fumaric acid.

The content by percentage of repeating unit derived from dicarboxylic acid compound that does not contain a dehydroabietic acid-based skeletal structure in the polyamide polymer is not particularly limited as long as the effects of the present invention are not impaired. For example, the content by percentage of repeating unit derived from dicarboxylic acid compound that does not contain a dehydroabietic acid-based skeletal structure is preferably 40% by mole or less, and more preferably 30% by mole or less, relative to the repeating units derived from dicarboxylic acid compounds in the polyamide polymer.

[Repeating Unit Derived from Diamine Compound]

The polyamide polymer of the present invention includes at least one repeating unit derived from a diamine compound. Regarding the diamine compound that is applicable to the polyamide polymer, any diamine compound that is usually used for forming a polyamide polymer may be used without any particular limitations, and for example, the diamine compounds described in Kobunshi Data Handbook. Kisohen (Polymer Data Handbook, Fundamentals Edition) (edited by the Society of Polymer Science, Japan) (Baifukan Co., Ltd.), p. 241-257, may be used.

The diamine compound may be an aliphatic diamine compound, or may be an aromatic diamine compound. Furthermore, the aliphatic diamine compound may be in a chain form or may be cyclic.

The aliphatic diamine compound may be a chain diaminoalkylene derivative, or a cyclic diaminoalkylene derivative. The aliphatic diamine compound may contain an unsaturated bond. The number of carbon atoms of the diaminoalkylene derivative is not particularly limited, and, from the viewpoints of heat resistance and moldability, the diaminoalkylene derivative preferably has 2 to 20 carbon atoms, more preferably 2 to 14 carbon atoms, and even more preferably 2 to 10 carbon atoms.

Furthermore, examples of the aromatic diamine compound include a diaminoarylene derivative. Among these, from the viewpoints of heat resistance and moldability, the aromatic diamine compound is preferably a diaminoarylene derivative having 6 to 24 carbon atoms, and more preferably a diaminoarylene derivative having 6 to 18 carbon atoms.

Moreover, the diamine compound may be a diamine compound in which two kinds selected from a group derived from an aliphatic monoamino compound and a group derived from an aromatic monoamino compound are bonded to each other through a divalent linking group. Examples of the divalent linking group include a divalent linking group composed of at least one selected from the group consisting of an oxygen atom, a sulfur atom, a carbonyl group, a sulfonyl group, an alkylene group, an alkenylene group, and an arylene group.

The alkylene group for forming the divalent linking group and the alkenylene group for forming the divalent linking group may be in a chain form or may be cyclic. When the alkylene group and the alkenylene group have chain structures, the number of carbon atoms thereof is preferably 2 to 6. Furthermore, when the alkylene group and the alkenylene group are cyclic, the number of carbon atoms thereof is preferably 5 to 8.

When the diamine compound is formed by two kinds selected from a group derived from an aliphatic monoamino compound and a group derived from an aromatic monoamino compound that are bonded to each other through a divalent linking group, the two groups that constitute the diamine compound, each of which is derived from an aliphatic monoamino compound or derived from an aromatic monoamino compound, may be linked to each other and form a ring.

Furthermore, the diamine compound may have a substituent, and examples of the substituent include the substituents for General Formula (A1) described above.

Specific examples of diamine compounds that are preferably used in the present invention will be disclosed below, but the invention is not limited to these.

(DA-1)

(DA-2)

(DA-3)

(DA-4)

-continued

H₂NC₂H₄OC₂H₄NH₂ (DA-5)

H₂NC₂H₄OC₂H₄OC₂H₄NH₂ (DA-6)

H₂NC₃H₆OC₃H₆NH₂ (DA-7)

H₂N–⟨C₆H₄⟩–NH₂ (DA-8)

H₂N–⟨C₆H₄⟩–NH₂ (meta) (DA-9)

H₂NH₂C–⟨C₆H₄⟩–CH₂NH₂ (DA-10)

H₂N–⟨C₆H₁₀⟩–NH₂ (DA-11)

H₂NH₂C–⟨C₆H₁₀⟩–CH₂NH₂ (DA-12)

H₂N–⟨C₆H₄⟩–O–⟨C₆H₄⟩–NH₂ (DA-13)

H₂N–⟨C₆H₄⟩–CH₂–⟨C₆H₄⟩–NH₂ (DA-14)

H₂N–⟨C₆H₄⟩–C(=O)–⟨C₆H₄⟩–NH₂ (DA-15)

H₂N–⟨C₆H₄⟩–S–⟨C₆H₄⟩–NH₂ (DA-16)

H₂N–⟨C₆H₄⟩–SO₂–⟨C₆H₄⟩–NH₂ (DA-17)

H₂N–⟨C₆H₄⟩–CH₂–CH₂–⟨C₆H₄⟩–NH₂ (DA-18)

H₂N–⟨C₆H₄⟩–CH=CH–⟨C₆H₄⟩–NH₂ (DA-19)

H₂N–(fluorene)–NH₂ (DA-20)

H₂N–(dibenzofuran)–NH₂ (DA-21)

H₂N–⟨C₆H₄⟩–O–⟨C₆H₄⟩–O–⟨C₆H₄⟩–NH₂ (DA-22)

From the viewpoints of heat resistance and moldability, the diamine compound according to the present invention is preferably at least one selected from the group consisting of a diaminoalkylene derivative having 2 to 14 carbon atoms, a diaminoarylene derivative having 6 to 24 carbon atoms, and a diamine compound in which two kinds selected from a group derived from an aliphatic monoamino compound and a group derived from an aromatic monoamino compound are bonded to each other through a divalent linking group.

Furthermore, the divalent linking group is preferably composed of at least one selected from the group consisting of an oxygen atom, a sulfur atom, a carbonyl group, a sulfonyl group, an alkylene group, an alkenylene group and an arylene group.

The repeating unit derived from a diamine compound in the polyamide polymer may be used singly or in combination of two or more kinds. When the polyamide polymer includes two or more kinds of repeating units derived from a diamine compound, the content ratio of the repeating units is appropriately selected according to the purpose.

From the viewpoints of heat resistance and shapeability, the polyamide polymer of the present invention is preferably configured to include:

at least one repeating unit derived from a dicarboxylic acid compound and selected from the group consisting of:

a repeating unit derived from a dicarboxylic acid compound represented by General Formula (A1) in which $L^1$ represents a single bond or Chemical Formula (L1-ex-4), (L1-ex-10) or (L1-ex-12);

a repeating unit derived from a dicarboxylic acid compound represented by General Formula (A2) in which $L^2$ represents Chemical Formula (L2-ex-2), (L2-ex-5), (L2-ex-9) or (L2-ex-11); and a repeating unit derived from a dicarboxylic acid compound represented by General Formula (A3) in which $L^3$ and $L^4$ each independently represent a single bond or Chemical Formula (L1-ex-4), (L1-ex-10) or (L1-ex-11), and $R^{11}$ represents Chemical Formula (R11-ex-2), (R11-ex-3), (R11-ex-5), (R11-ex-8), (R11-ex-9), (R11-ex-13), (R11-ex-22) or (R11-ex-24); and at least one repeating unit derived from a diamine compound selected from the group consisting of:

a diaminoalkylene derivative having 2 to 20 carbon atoms;

a diaminoarylene derivative having 6 to 24 carbon atoms; and a diamine compound in which two kinds selected from a group derived from an aliphatic monoamino compound and a group derived from an aromatic monoamino compound are bonded to each other through a divalent linking group.

More preferably, the polyamide polymer is configured to include:

at least one repeating unit derived from a dicarboxylic acid compound and selected from the group consisting of:

a repeating unit derived from a dicarboxylic acid compound represented by General Formula (A1) in which $L^1$ represents a single bond:

a repeating unit derived from a dicarboxylic acid compound represented by General Formula (A2) in which $L^2$ represents (L2-ex-2); and a repeating unit derived from a dicarboxylic acid compound represented by General Formula (A3) in which $L^3$ and $L^4$ represent single bonds, and $R^{11}$ represents (R11-ex-2), (R11-ex-3), (R11-ex-5), (R11-ex-8), (R11-ex-9), (R11-ex-13), (R11-ex-22) or (R11-ex-24); and at least one repeating unit derived from a diamine compound selected from the group consisting of Chemical Formulae (DA-1), (DA-8), (DA-9), (DA-13) and (DA-22).

The content ratio between repeating unit derived from dicarboxylic acid compound and repeating unit derived from diamine compound (repeating unit derived from dicarboxylic acid compound: repeating unit derived from diamine compound) that constitute the polyamide polymer of the present invention is not particularly limited, but the content ratio is usually 1:1.

<Method for Producing Polyamide Polymer>

The polyamide polymer of the present invention can be produced by polycondensing a dicarboxylic acid compound containing a partial structure represented by Formula (C) or a derivative thereof and a diamine compound by a known method. For example, the methods described in Gosei Kobunshi (Synthetic Polymers) V (Asakura Publishing Co., Ltd.), p. 63-175 and the like can also be applied to the present invention.

Specific examples include a method of heating a dicarboxylic acid compound containing a dehydroabietic acid-based skeletal structure or an ester derivative thereof and a diamine compound for several hours at 250° C. to 280° C. under reduced pressure; a method of further adding an acid catalyst thereto and heating the system for several hours at 200° C. to 230° C. under reduced pressure, and a method of subjecting an acid halide derivative of a dicarboxylic acid compound containing a dehydroabietic acid-based skeletal structure and a diamine compound to dehydrohalogenation at 0° C. to 80° C. in the presence of a base. In the present invention, any of these methods is preferably used.

The dicarboxylic acid compound containing a dehydroabietic acid-based skeletal structure can be produced from rosin.

Rosin is a resin component collected from pine resin, and there are three kinds, as representative kinds, namely, "gum rosin", "tall rosin" and "wood rosin", which are classified based on the method of collection. The constituent components contained in rosin may vary with the method for collecting these rosins or the producing district of pine, and rosin is generally a mixture of diterpene-based resin acids such as abietic acid (1), neoabietic acid (2), palustric acid (3), levopimaric acid (4), dehydroabietic acid (5), pimaric acid (6), and isopimaric acid (7), whose structures are presented below.

(1)

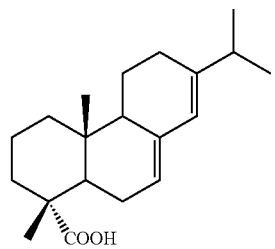

(2)

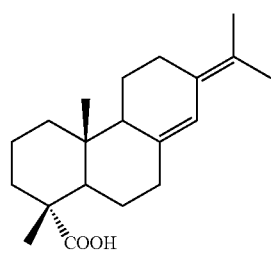

(3)

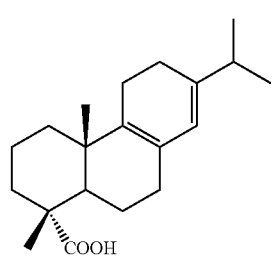

(4)

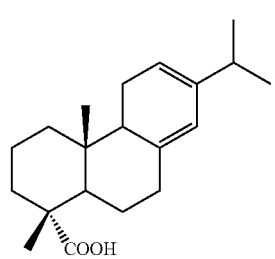

(5)

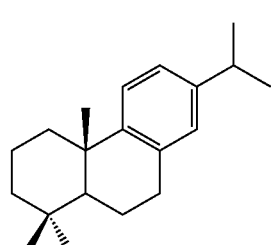

(6)

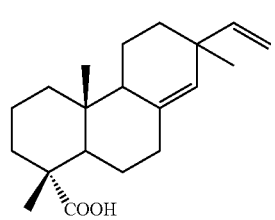

(7)

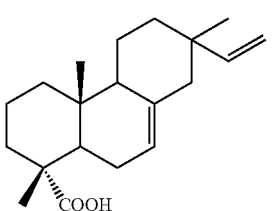

Among these diterpene-based resin acids, the various compounds represented by (1) to (4) undergo disproportionation when subjected to heating in the presence of a catalyst such as an apatite-based catalyst or the like, and can be modified to dehydroabietic acid (5) and dihydroabietic acid (8) having the structure illustrated below. Modification can be carried out by referring to, for example, JP-A No. 2002-284732.

(8)

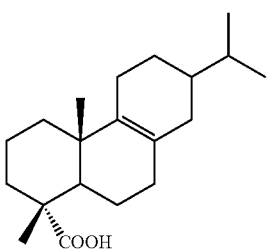

Furthermore, the 12-position of dehydroabietic acid has a high electron density and is highly susceptible to various aromatic electrophilic substitution reactions. That is, since acylation, halogenations and the like easily occur, a functional group having a carboxyl group can be introduced to the 12-position by performing the conversion of a functional group by means of a known reaction. Furthermore, the 14-position of dehydroabietic acid has a high electron density as is the case with the 12-position; however, due to the steric hindrance caused by the isopropyl group at the 13-position and the substituent at the 15-position, it is difficult for an aromatic electrophilic substitution reaction to occur as compared with the 12-position. Accordingly, a dehydroabietic acid derivative in which a functional group has been introduced by an electrophilic substitution reaction includes regioisomers at the 12-position and the 14-position. These are not discriminated in the present invention, but preferably, a dehydroabietic acid derivative having a substituent introduced to the 12-position is used.

That is, a dicarboxylic acid compound containing a dehydroabietic acid-based skeleton can be easily produced in an industrial scale at low cost by subjecting rosin, which is a mixture of various resin acids, to appropriate chemical treatment.

The method for producing a polyamide polymer of the present invention includes a process of polycondensing at least one dicarboxylic acid compound selected from the group consisting of a compound represented by the following General Formula (A2), a compound represented by the following General Formula (A22) and a compound represented by the following General Formula (A32), or a derivative thereof, and at least one diamine compound. The method optionally includes other processes.

When two or more dicarboxylic acid compounds or derivatives thereof are used in the method for producing a polyamide polymer of the present invention, the respective dicarboxylic acid compounds or derivatives thereof may be represented by the same general formula described above, or may be represented by different general formulae described above.

(A12)

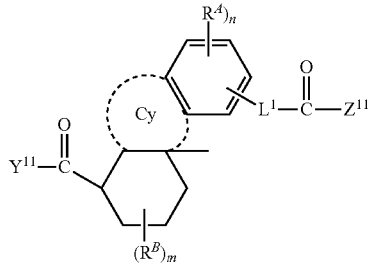

(A22)

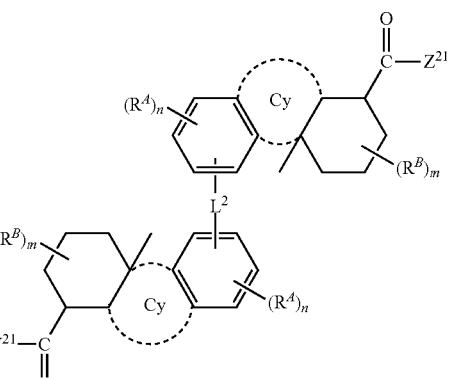

(A32)

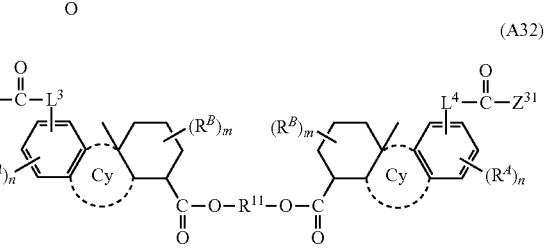

wherein $L^1$ represents a divalent linking group composed of at least one selected from the group consisting of an alkylene group, an alkenylene group, an arylene group, an oxygen atom and a carbonyl group, or a single bond; $L^2$ represents a divalent linking group composed of at least one selected from the group consisting of an oxygen atom, a sulfur atom, a carbonyl group, a sulfonyl group, an alkylene group, an alkenylene group and an arylene group, or a single bond; $L^3$ and $L^4$ each independently represent a divalent linking group composed of at least one selected from the group consisting an alkylene group, an alkenylene group, an arylene group, an oxygen atom and a carbonyl group, or a single bond; $R^{11}$ represents a divalent linking group containing at least one selected from the group consisting of an alkylene group and an arylene group; $Y^{11}, Z^{11}, Y^{21}, Z^{21}, Y^{31}$ and $Z^{31}$ each independently represent a leaving group; $R^A$ and $R^B$ each independently represent a hydrogen atom or an alkyl group having 1 to 6 carbon atoms; n and m each independently represent an integer from 0 to 2; and Cy represents an unsaturated 6-membered or 7-membered ring which may contain a heteroatom.

The compounds represented by General Formula (A12), General Formula (A22) and General Formula (A32) described above are preferably compounds represented by the following General Formula (A11), General Formula (A21) and General Formula (A31).

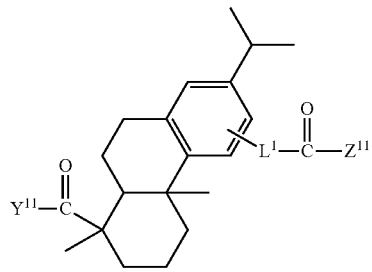

(A11)

wherein in General Formula (A11), $L^1$ represents a divalent linking group composed of at least one selected from the group consisting of an alkylene group, an alkenylene group, an arylene group, an oxygen atom and a carbonyl group, or a single bond; and $Y^{11}$ and $Z^{11}$ each independently represent a leaving group.

$L^1$ in General Formula (A11) has the same definition as $L^1$ in General Formula (A1), and also has the same preferable definition as $L^1$ in Formula (A1).

$Y^{11}$ and $Z^{11}$ each represent a leaving group. The leaving group is not particularly limited as long as an amide bond can be produced in a polycondensation reaction between a compound represented by General Formula (A11) and a diamine compound, and may be appropriately selected from leaving groups that are usually used, according to the purpose.

Furthermore, $Y^{11}$ and $Z^{11}$ may be the same leaving groups, or may be leaving groups that are different from each other.

Specific examples of the leaving group include a hydroxyl group, an alkoxy group, an aryloxy group, a hydroxyalkoxy group, an alkyl- or arylsulfonyloxy group, an imidazolyl group, a triazolyl group, a halogen atom and the like.

The number of carbon atoms of the alkyl group in the alkoxy group, hydroxyalkoxy group, and alkylsulfonyloxy group is not particularly limited, and the number of carbon atoms is preferably 1 to 4. Furthermore, examples of the aryl group in the aryloxy group include a phenyl group, a tolyl group and the like.

Among these, from the viewpoints of productivity and reactivity, the leaving group is preferably at least one selected from a halogen atom or an alkoxy group.

Specific examples of the compound represented by the General Formula (A11) include the following, but the present invention is not limited to these.

(A11-ex-1)

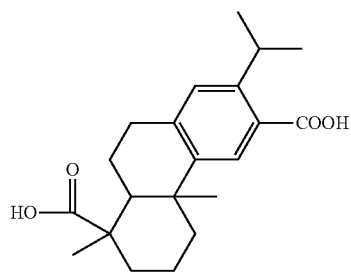

(A11-ex-2)

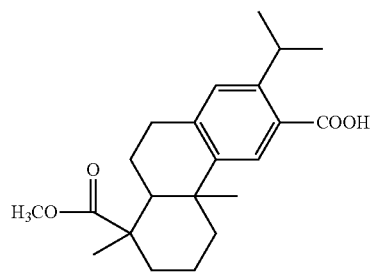

(A11-ex-3)

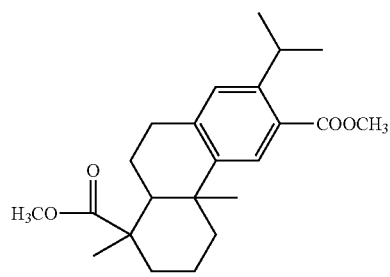

(A11-ex-4)

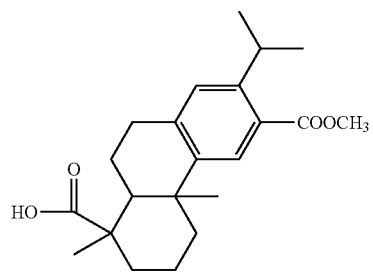

(A11-ex-5)

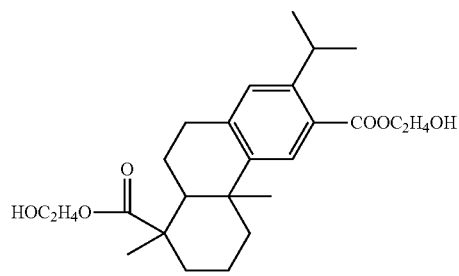

(A11-ex-6)

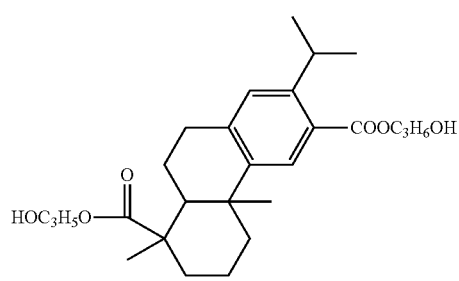

(A11-ex-7)
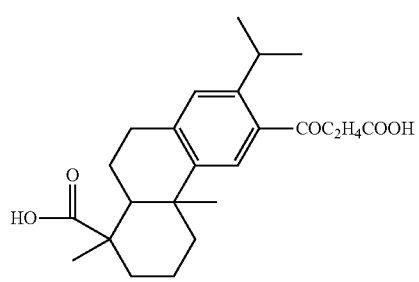
(A11-ex-8)
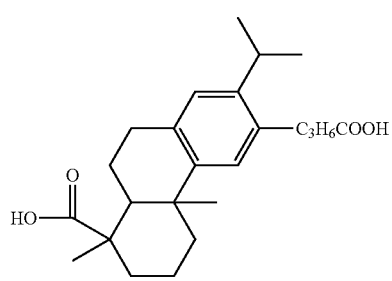
(A11-ex-9)
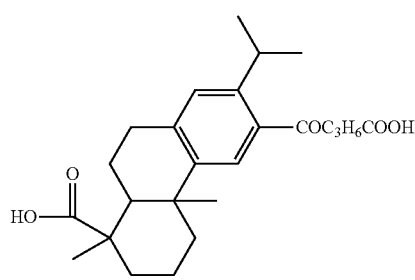
(A11-ex-10)
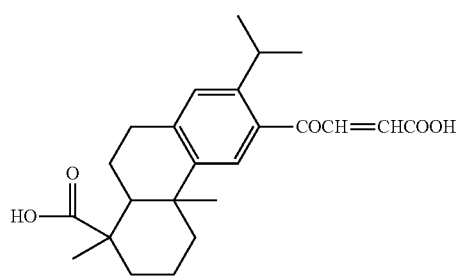
(A11-ex-11)
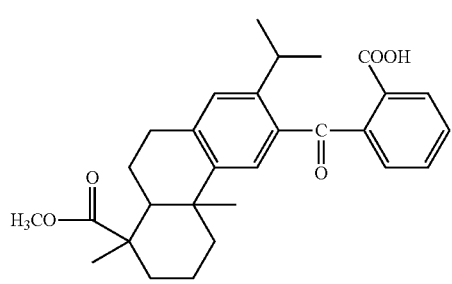
(A11-ex-12)
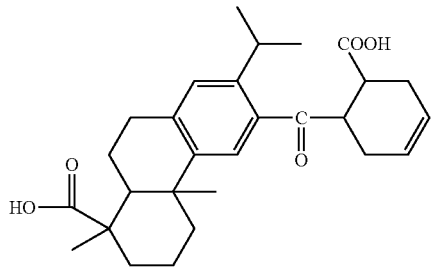
(A11-ex-13)
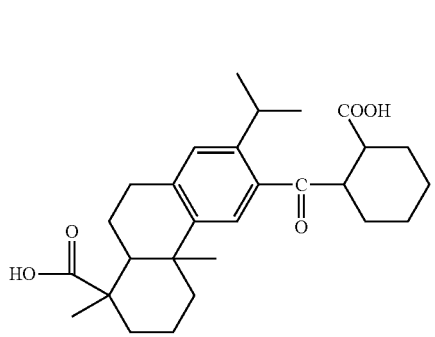
(A11-ex-14)
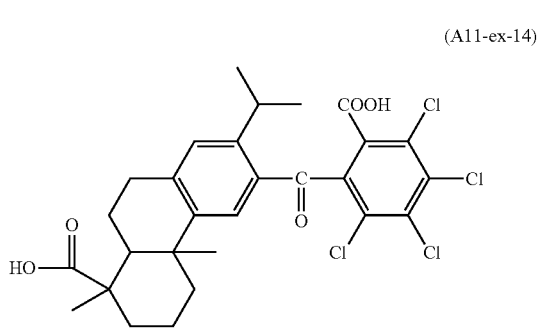
(A11-ex-15)
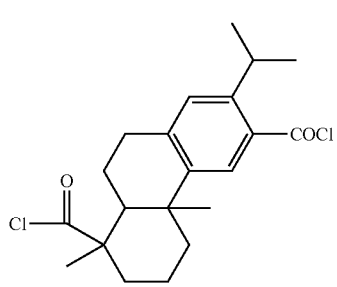
(A11-ex-16)
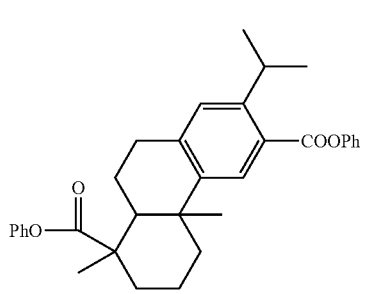

(A11-ex-17)
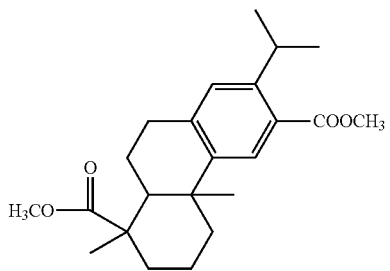
(A11-ex-18)
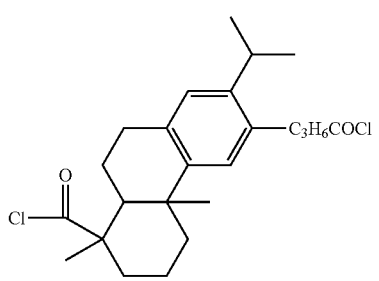
(A11-ex-19)
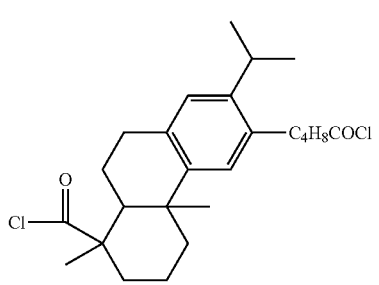
(A11-ex-20)
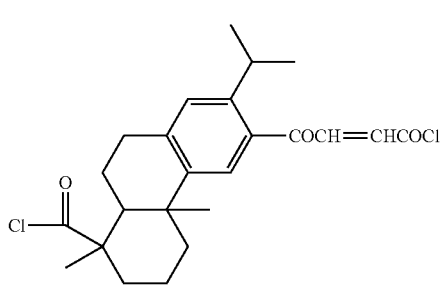
(A11-ex-21)
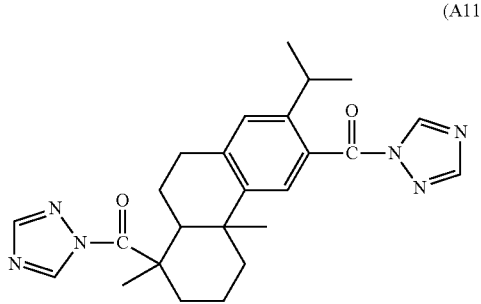
(A11-ex-22)
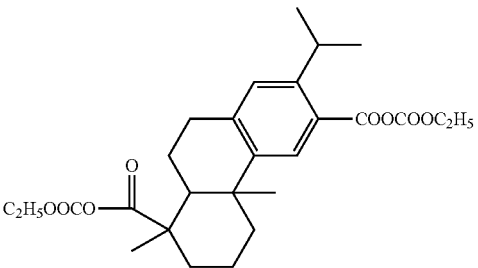
(A11-ex-23)
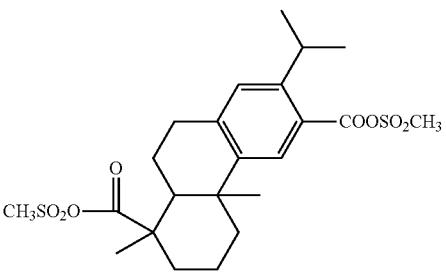
(A11-ex-24)
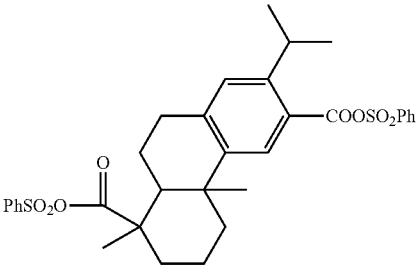
(A11-ex-25)
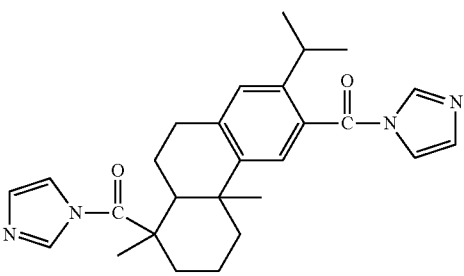
The compound represented by the General Formula (A11) can be produced by an ordinary method using carboxydehydroabietic acid that can be obtained as described above.
(A21)
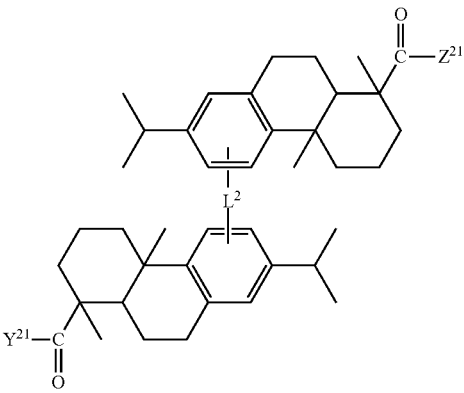

wherein in General Formula (A21), $L^2$ represents a divalent linking group composed of at least one selected from the group consisting of an oxygen atom, a sulfur atom, a carbonyl group, a sulfonyl group, an alkylene group, an alkenylene group and an arylene group; $Y^{21}$ and $Z^{21}$ each represent a leaving group.

$L^2$ in General Formula (A21) has the same definition as $L^2$ in Formula (A2), and preferable definitions thereof are also the same as those of $L^2$ in General Formula (A2). Furthermore, $Y^{21}$ and $Z^{21}$ have the same definitions as $Y^{11}$ and $Z^{11}$ in General Formula (A11), respectively, and preferable definitions thereof are also the same as those $Y^{11}$ and $Z^{11}$ in General Formula (A11), respectively.

The compound represented by General Formula (A21) can be produced from rosin as is the case with General Formula (A11). Furthermore, the compound represented by General Formula (A21) can be easily produced in an industrial scale at low cost by subjecting rosin, which is a mixture of various resin acids, to appropriate chemical treatments.

Specific examples of the compound represented by General Formula (A21) include the following, but the present invention is not limited to these.

(A21-ex-1)
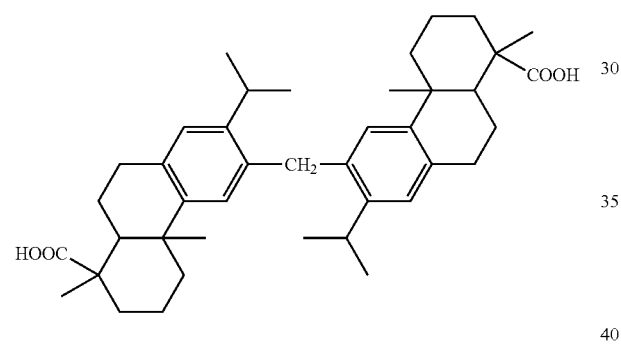

(A21-ex-2)
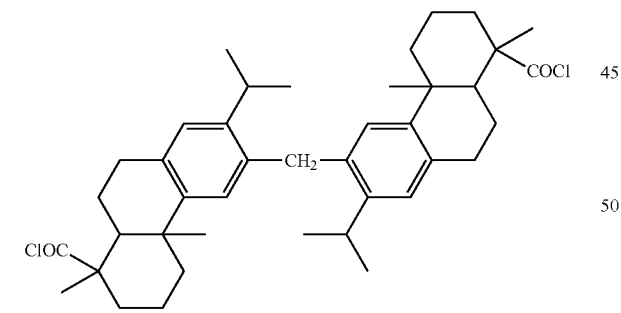

(A21-ex-3)
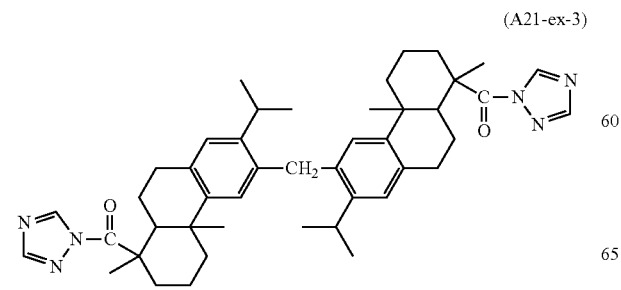

(A21-ex-4)
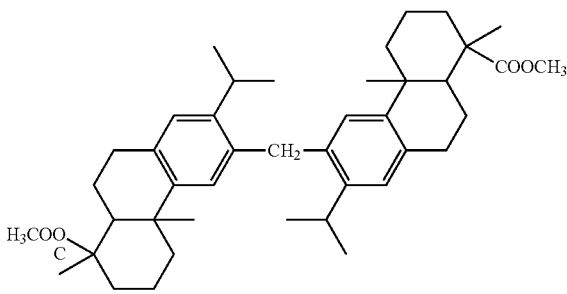

(A21-ex-5)
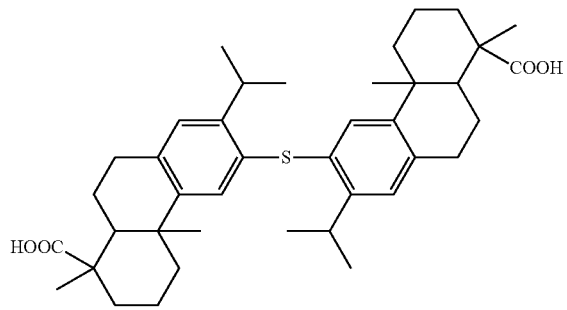

(A21-ex-6)
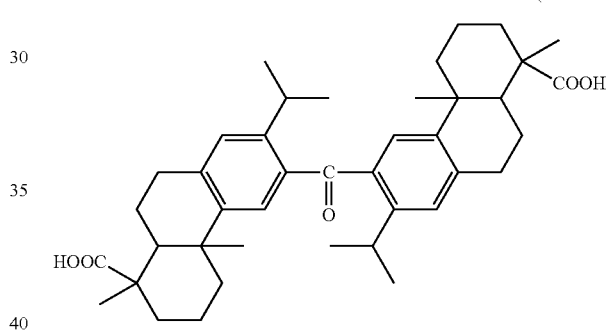

(A21-ex-7)
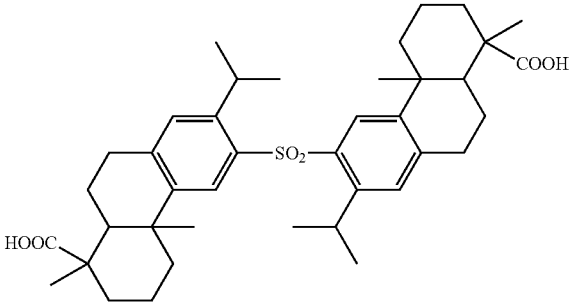

(A21-ex-8)
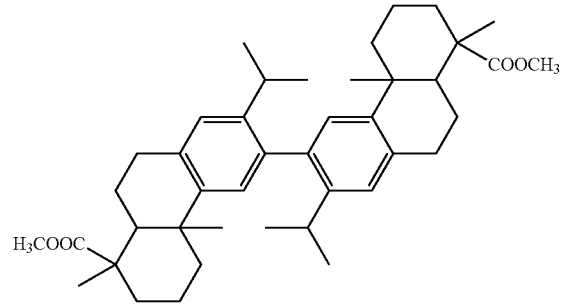

-continued (A21-ex-9)

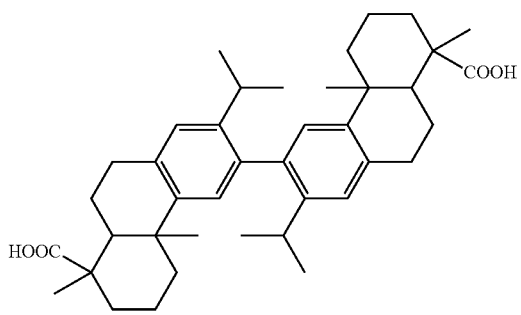

(A21-ex-10)

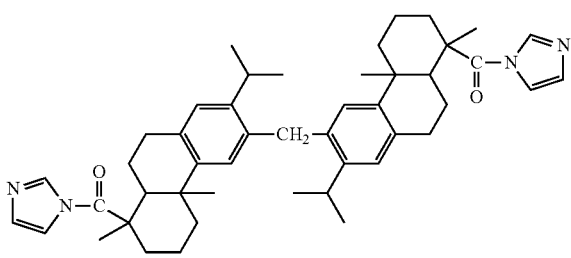

(A21-ex-11)

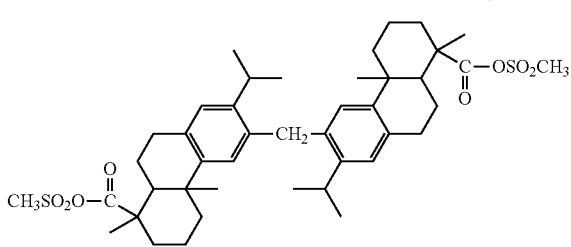

-continued (A21-ex-12)

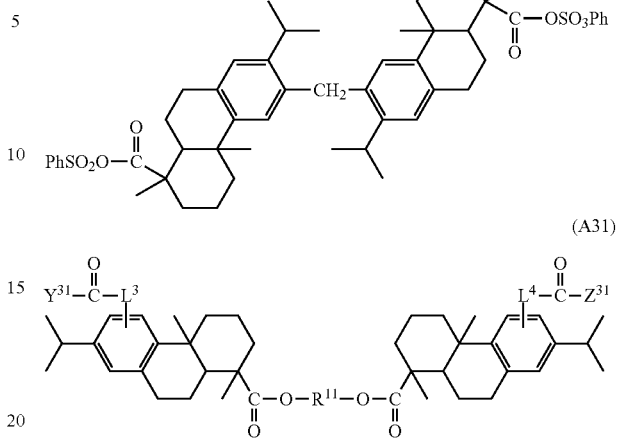

(A31)

wherein in General Formula (A31), $L^3$ and $L^4$ each independently represents a divalent linking group composed of at least one selected from the group consisting of an oxygen atom, a carbonyl group, an alkylene group, an alkenylene group and an arylene group or a single bond; $R^{11}$ represents a divalent linking group containing at least one selected from the group consisting of an alkylene group and an arylene group; and $Y^{31}$ and $Z^{31}$ each independently represent a leaving group.

$L^3$ and $L^4$ in General Formula (A31) have the same definitions as $L^3$ and $L^4$ in General Formula (A3), respectively, and preferable definitions thereof are also the same as those of $L^3$ and $L^4$ in Formula (A3), respectively. $R^{11}$ has the same definition as $R^{11}$ in General Formula (A3) and preferable definitions thereof are also the same as those of $R^{11}$ in General Formula (A3). Furthermore. $Y^{31}$ and $Z^{31}$ have the same definitions as $Y^{11}$ and $Z^{11}$ in General Formula (A11), respectively, and preferable definitions thereof are also the same as those of $Y^{11}$ and $Z^{11}$ in General Formula (A11), respectively.

The compound represented by General Formula (A31) is obtained by mixing the dehydroabietic acid (5) or an ester derivative thereof and a diol compound represented by HO—$R^{11}$—OH in the presence of a catalyst such as an acid, heating the mixture, causing dehydration condensation, and then introducing a desired functional group to the 12-position of dehydroabietic acid by a method described above.

Specific examples of the compound represented by General Formula (A31) include the following, but the present invention is not limited to these.

(A31-ex-1)

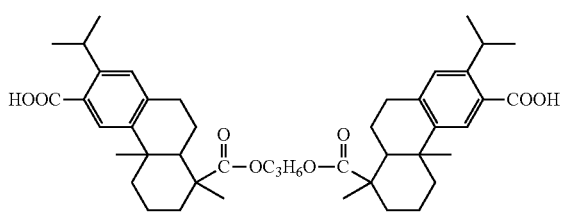

(A31-ex-2)

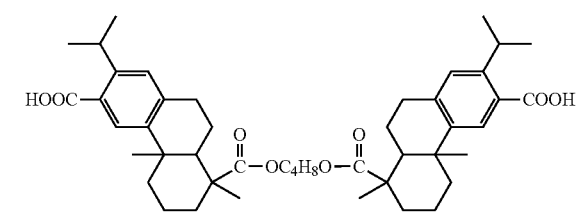

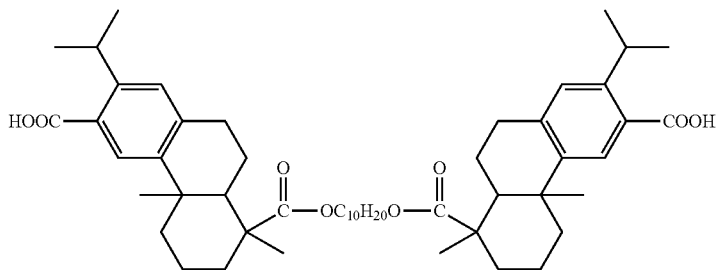
(A31-ex-3)
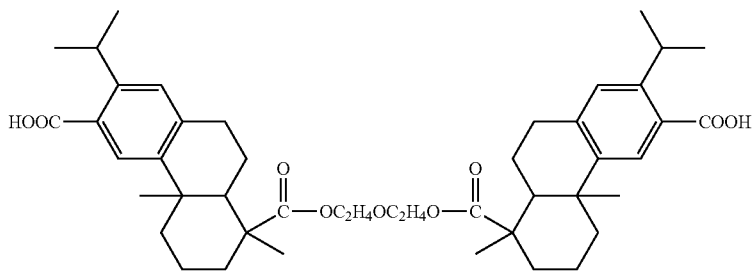
(A31-ex-4)
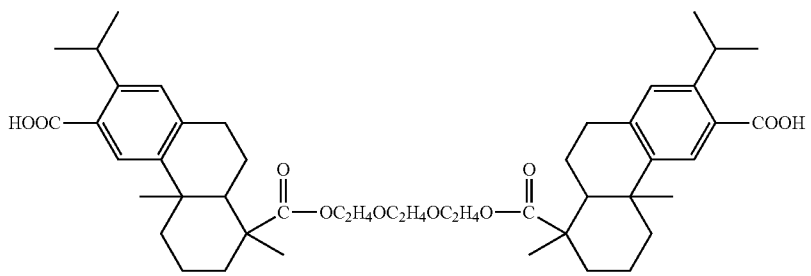
(A31-ex-5)
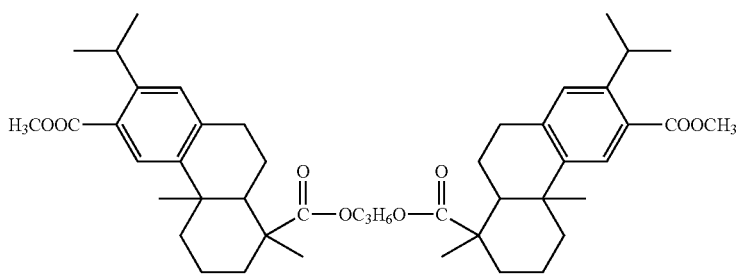
(A31-ex-6)
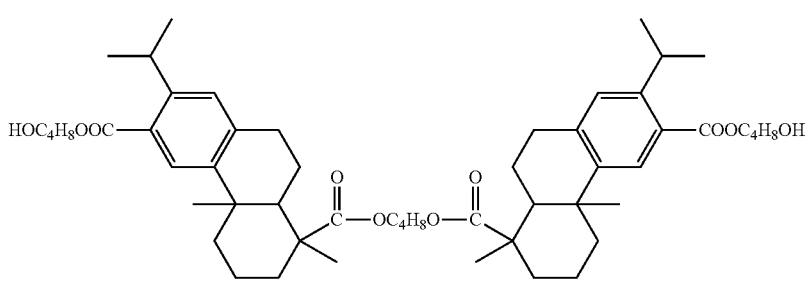
(A31-ex-7)

-continued
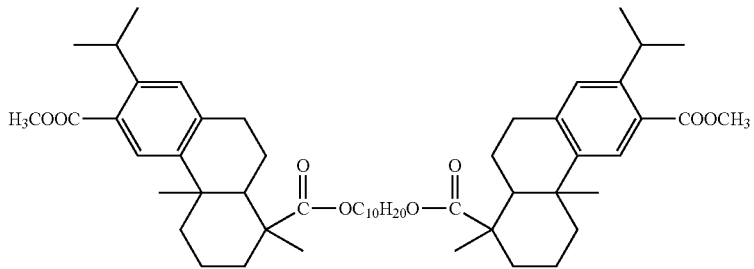
(A31-ex-8)
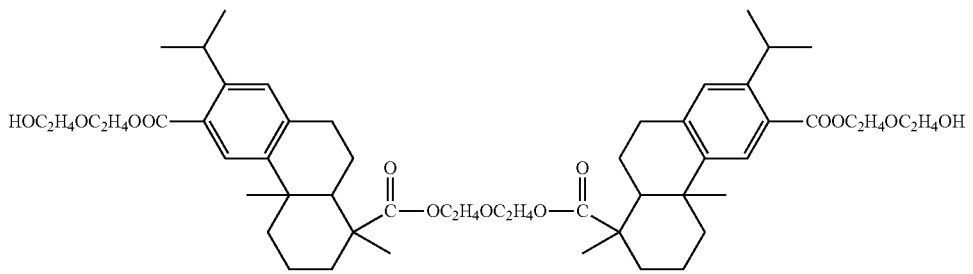
(A31-ex-9)
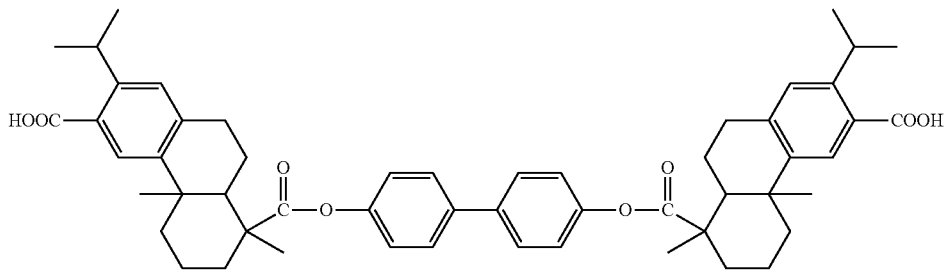
(A31-ex-10)
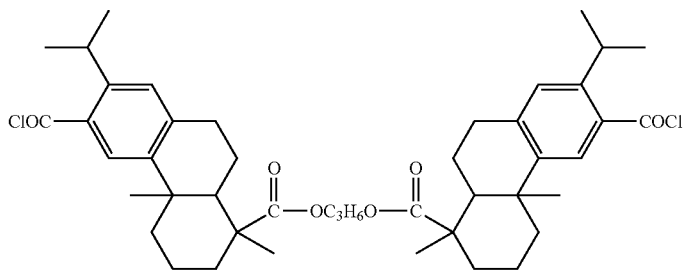
(A31-ex-11)
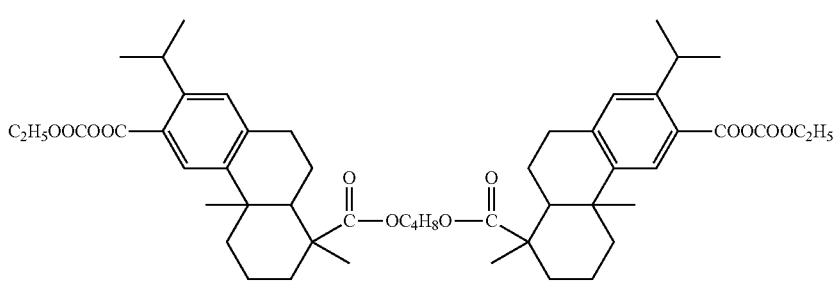
(A31-ex-12)

-continued
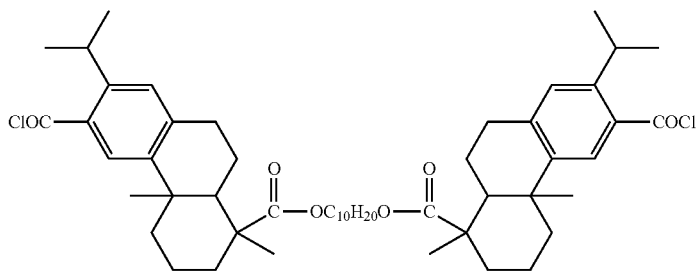
(A31-ex-13)
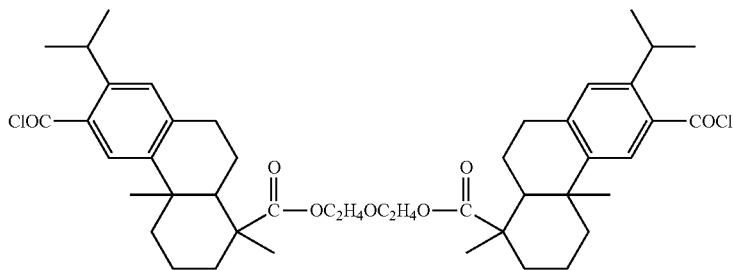
(A31-ex-14)
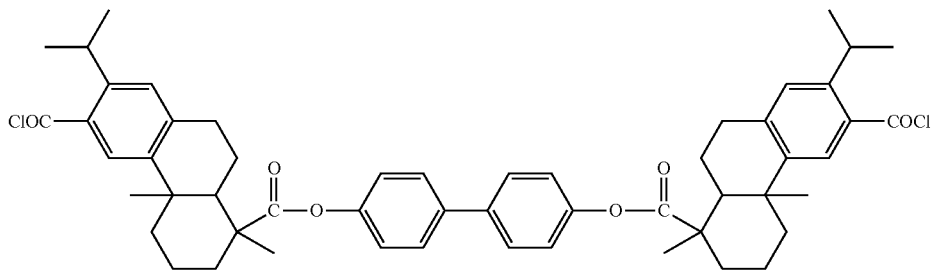
(A31-ex-15)
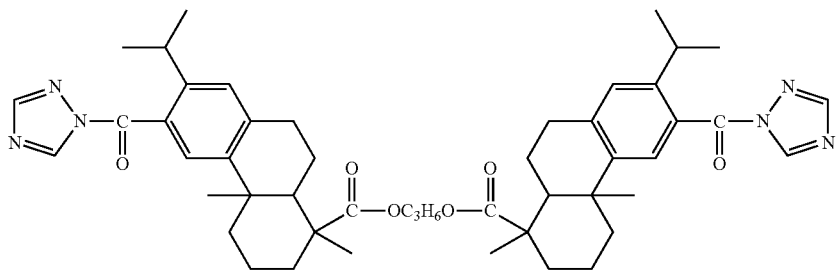
(A31-ex-16)
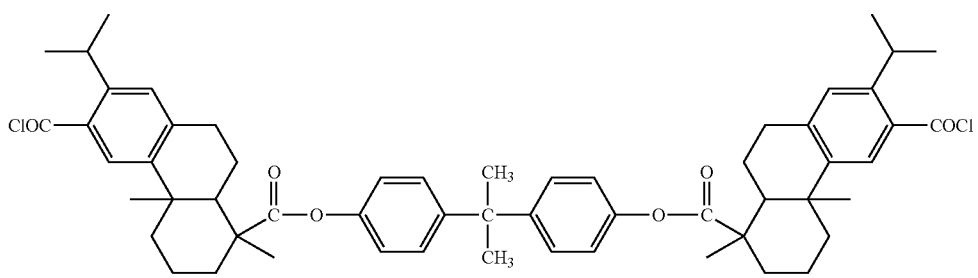
(A31-ex-17)

(A31-ex-18)
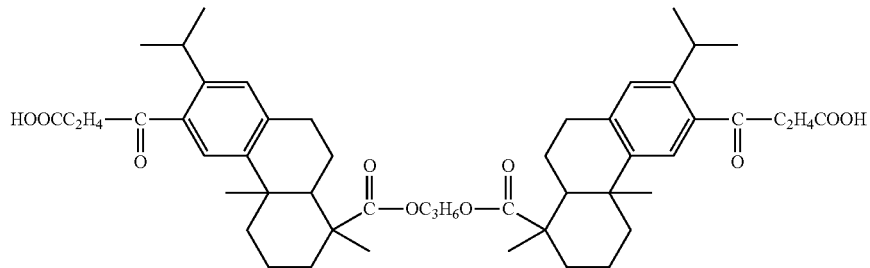
(A31-ex-19)
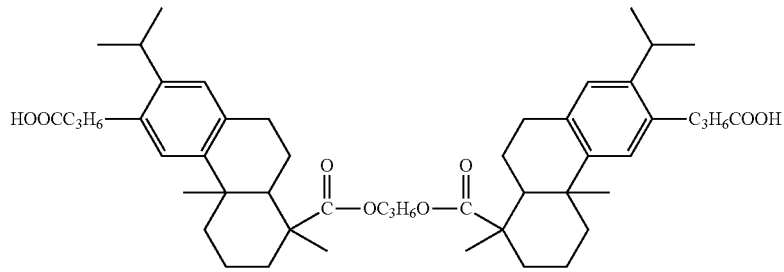
(A31-ex-20)
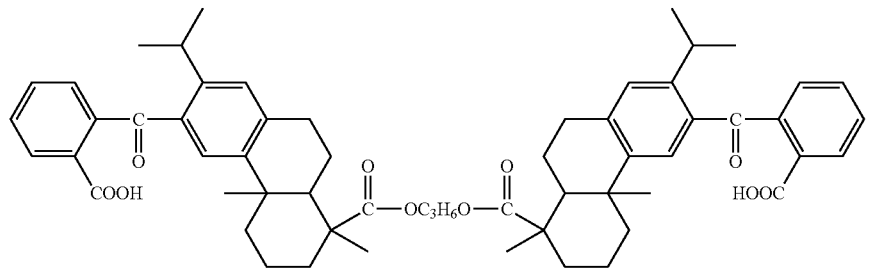
(A31-ex-21)
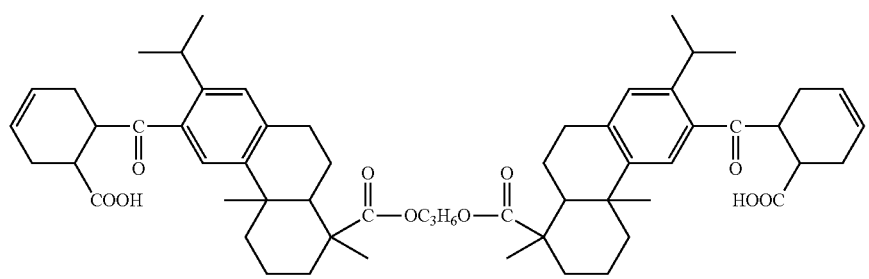
(A31-ex-22)
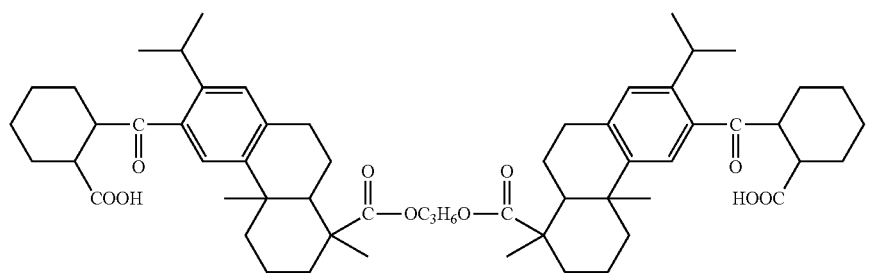

-continued

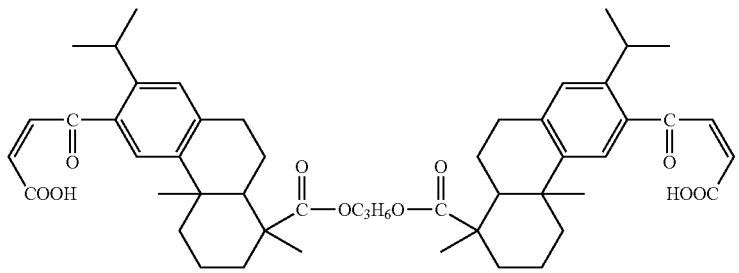
(A31-ex-23)

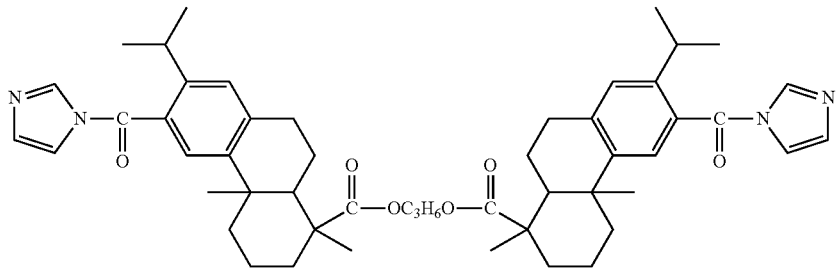
(A31-ex-24)

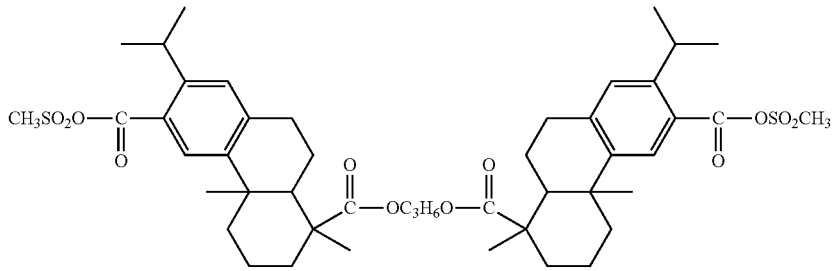
(A31-ex-25)

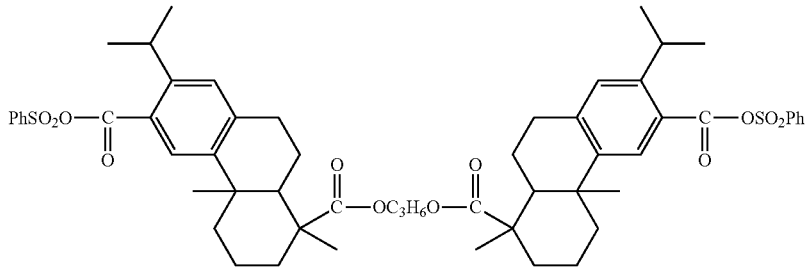
(A31-ex-26)

<Use of Polyamide Polymer>

There are no particular limitations on the use of the polyamide polymer of the present invention, and the polyamide polymer can be used in various applications. Examples thereof include an adhesive (of hot melt type or the like), a tacky adhesive, a sealing material, a coating material, a plastic compatibilizer, a plastic modifier, and various films and sheets. In addition to those, by utilizing the characteristic of excellent heat resistance, the polyamide polymer can be used in various hoses and tubes, wire sheath materials, optical fiber sheath materials, various films and sheets, and the like. Furthermore, the polyamide polymer can also be utilized as a toner binder for copying machines (for example, xerography). The polyamide polymer can be utilized as a thermoplastic elastomer in various forms for various applications, such as a vibration-proofing material, a soundproofing material, various gaskets and automobile pans.

<Resin Composition>

The resin composition of the present invention preferably contains at least one kind of the polyamide polymer described above, and at least one additive selected from the group consisting of a flame retardant, a moisture absorption inhibitor and a light stabilizer, and optionally further includes other additives.

(Flame Retardant)

The resin composition preferably contains at least one flame retardant. Thereby, a flame retardant effect of decreasing or suppressing the rate of combustion of the resin composition can be enhanced.

There are no particular limitations on the flame retardant, and any agent that is usually used may be used. Examples thereof include bromine-based flame retardants, chlorine-based flame retardants, phosphorus-containing flame retardants, silicon-containing flame retardants, nitrogen compound-based flame retardants, and inorganic flame retardants. Among these, a phosphorus-containing flame retardant or a silicon-containing flame retardant is preferable, because these flame retardants do not cause corrosion of processing machines and molds or deterioration of the working environment as a result of thermal decomposition at the time of compounding with the polyamide polymer or at the time of molding processing and subsequent generation of hydrogen halides, and have a low possibility of adversely affecting the environment as a result of volatilization of halogens or decomposition at the time of disposal by incineration and subsequent generation of harmful substances such as dioxins.

There are no particular limitations on the phosphorus-containing flame retardant, and any phosphorus-containing flame retardant that is usually used may be used. Examples thereof include organophosphorus-based compounds such as phosphoric acid esters, phosphoric acid condensation esters, and polyphosphates.

Specific examples of phosphoric acid esters include trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenyl phosphate, xylenyl diphenyl phosphate, diphenyl (2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenyl phosphine oxide, tricresyl phosphine oxide, diphenyl methanephosphonate, and diethyl phenylphosphonate.

Specific examples of phosphoric acid condensation esters include aromatic phosphoric acid condensation esters such as resorcinol polyphenyl phosphate, resorcinol poly(di-2,6-xylyl)phosphate, bisphenol A polycresyl phosphate, hydroquinone poly(2,6-xylyl)phosphate, and condensation products thereof.

Further examples include phosphoric acid, and polyphosphates formed from salts of polyphosphoric acid with any of the metals of Group 1 to Group 14 of the Periodic Table of Elements, ammonia, aliphatic amines and aromatic amines. Representative salts of polyphosphates include, as metal salts, lithium salt, sodium salt, calcium salt, barium salt, iron(II) salt, iron(III) salt, and aluminum salt: as aliphatic amine salts, methylamine salt, ethylamine salt, diethylamine salt, triethylamine salt, ethylenediamine salt, and piperazine salt; and as aromatic amine salts, pyridine salt, and triazine salt.

In addition to those described above, examples of phosphorus-containing flame retardants include halogen-containing phosphoric acid esters such as trischloroethyl phosphate, tris(dichloropropyl)phosphate, and tris(β-chloropropyl) phosphate; and phosphazene compounds and phosphoric acid ester amides, all having a structure in which phosphorus atoms and nitrogen atoms are linked by double bonds.

These phosphorus-containing flame retardants may be used singly or in combination of two or more kinds.

Examples of a silicon-containing flame retardant include organosilicon compounds having a two-dimensional or three-dimensional structure which includes, as a main constituent unit, a structural unit represented by Formula: $R_mSi_{(4-m)/2}$ (wherein m represents an integer from 1 to 3; and R represents a hydrogen atom, a substituted or unsubstituted aliphatic hydrocarbon group or aromatic hydrocarbon group), polydimethylsiloxane, and products obtained by substituting or modifying the methyl group in a side chain or at an end of a polydimethylsiloxane with a hydrogen atom, a substituted or unsubstituted aliphatic hydrocarbon group or substituted or modified aromatic hydrocarbon group such as silicone oil or modified silicone oil.

Examples of the substituted or unsubstituted aliphatic hydrocarbon group and aromatic hydrocarbon group include an alkyl group, a cycloalkyl group, a phenyl group, a benzyl group, an amino group, an epoxy group, a polyether group, a carboxyl group, a mercapto group, a chloroalkyl group, an alkyl higher alcohol ester group, an alcohol group, an aralkyl group, a vinyl group, and a trifluoromethyl group.

These silicon-containing flame retardants may be used singly or in combination of two or more kinds.

Furthermore, as flame retardants other than the phosphorus-containing flame retardants and silicon-containing flame retardants described above, for example, inorganic flame retardants such as magnesium hydroxide, aluminum hydroxide, antimony trioxide, antimony pentoxide, sodium antimonate, zinc hydroxystannate, zinc stannate, metastannic acid, tin oxide, tin oxide salts, zinc sulfate, zinc oxide, ferrous oxide, ferric oxide, stannous oxide, stannic oxide, zinc borate, ammonium borate, ammonium octamolybdenate, metal salts of tungstic acid, composite oxides of tungsten and metalloids, ammonium sulfamate, ammonium bromide, zirconium-based compounds, guanidine-based compounds, fluorine-based compounds, graphite, and swellable graphite may be used. These other flame retardants may be used singly, or two or more kinds may be used in combination.

When the resin composition contains a flame retardant, the content of the flame retardant is not particularly limited. For example, the content may be adjusted to usually about 50 parts by mass or less, and preferably about 2 to 30 parts by mass, relative to 100 parts by mass of the resin composition. When the content is adjusted to this range, desired flame retardancy may be obtained while transparency or mechanical properties such as elastic modulus are maintained satisfactorily.

(Moisture Absorption Inhibitor)

The resin composition preferably contains at least one moisture absorption inhibitor.

The moisture absorption inhibitor is not particularly limited as long as it is contained in the resin composition, and a substance (including a compound) capable of forming a hydrophobic layer at the interface between the resin composition and air. This hydrophobic layer brings about suppression of the absorption of water in air (moisture absorption). As such, since moisture absorption is suppressed, even if the resin is left to stand for a long time period in a state of being in contact with air, or the ambient humidity around the resin composition increases, deterioration of the resin or change in the dimension is effectively suppressed. In addition, the resin composition does not require that a hydrophobic "layer" be formed all the time at the interface between the resin composition and air. For example, the case where a hydrophobic phase that forms a layer is dispersed in the resin composition as a result of mixing with the resin composition, is also included.

The moisture absorption inhibitor may be any agent which can exhibit the moisture absorption inhibitory effect such as described above by means of a hydrophobic layer, and can enable a resin composition containing this moisture absorption inhibitor to exhibit its functions, for example, a function of suppressing the dimensional change and the like described above. There are no particular limitations on the specific composition, content of the inhibitor in a resin composition, the amount ratio with other additives, and the like.

Specific examples of the moisture absorption inhibitor include a hydrophobic substance and an amphiphilic substance. A hydrophobic substance can form a hydrophobic layer per se as a whole. Furthermore, in an amphiphilic substance, a hydrophobic group thereof can serve as a hydrophobic layer. The degree of hydrophobicity of the hydrophobic group of the amphiphilic substance and the hydrophobic substance is desirably to the extent that moisture absorption of the resin composition can be prevented.

Regarding the hydrophobic substance, for example, water-insoluble substances are suitably used. More specific examples thereof include hydrocarbons such as paraffinic compounds, olefinic compounds, cyclic saturated hydrocarbon-based compounds, and cyclic unsaturated hydrocarbon compounds; alcohol-based compounds, ether-based compounds, ester-based compounds, silicone-based compounds, fluorine-based compounds, and phosphoric acid ester-based compounds.

An amphiphilic substance is a substance composed of molecule containing a hydrophobic group and a hydrophilic group. The amphiphilic substance may be rephrased as surfactant. Specifically, examples of surfactants include ionic surfactants and nonionic surfactants. Examples of the ionic surfactants include anionic surfactants such as carboxylic acid salts, sulfonic acid salts, sulfuric acid ester salts, and phosphoric acid ester salts, cationic surfactants such as amine salt type surfactants and quaternary ammonium salt type surfactants, and amphoteric surfactants such as carboxylic acid salt type surfactants. Specific examples of the nonionic surfactants include ester type, ether type, and ester-ether type surfactants. In addition to those, specific examples of amphiphilic substances that are present in nature include phospholipids and glycolipids.

Specifically, the moisture absorption inhibitor is preferably at least one of ester-based compounds and polyester oligomers.

As a specific example of the polyester oligomers, there are no particular limitations as long as the polyester oligomer has a repeating structural unit having an ester bond and has a number average molecular weight of 500 to 5000, and the polyester oligomer preferably contains a divalent carboxylic acid, a dihydric alcohol, and a hydroxyl group-containing carboxylic acid as constituent components.

Examples of the divalent carboxylic acid include adipic acid, succinic acid, decanedicarboxylic acid, sebacic acid, phthalic acid, terephthalic acid, isophthalic acid, naphthalenedicarboxylic acid, and diphenyldicarboxylic acid. It is more preferable that the divalent carboxylic acid have high compatibility with polyamide derivatives, and specific preferable examples of the divalent carboxylic acid include adipic acid, succinic acid, phthalic acid, terephthalic acid, and isophthalic acid.

Furthermore, examples of the dihydric alcohol include ethylene glycol, propylene glycol, 1,3-propanediol, 1,3-butanediol, 1,4-butanediol. 1,6-hexanediol, diethylene glycol, polyethylene glycol, and polypropylene glycol. Similarly to the divalent carboxylic acid, it is more preferable that the dihydric alcohol have high compatibility with polyamide derivatives, and specific preferable examples of the dihydric alcohol include ethylene glycol, propylene glycol, 1,3-propanediol, and 1,4-butanediol.

Furthermore, preferable examples of the hydroxyl group-containing carboxylic acid include glycolic acid, lactic acid, 3-hydroxybutyric acid, 4-hydroxybutyric acid, 3-hydroxyvaleric acid, and 3-hydroxyhexanoic acid.

Furthermore, preferable examples also include polyester oligomers using a hydroxycarboxylic acid or a cyclic lactone as a raw materials, polycaprolactone and polylactic acid.

The number average molecular weight of the polyester oligomers is 500 to 5000, preferably 600 to 3500), and more preferably 700 to 2000. The measurement of the number average molecular weight can be carried out by using gel permeation chromatography (GPC). Specifically, the number average molecular weight can be determined by using N-methylpyrrolidone as a solvent, using a polystyrene gel, and using a converting molecular weight calibration curve that has been determined in advance from a constitution curve of standard monodisperse polystyrenes. Regarding the GPC apparatus, HLC-8220GPC (manufactured by Tosoh Corp.) may be used.

The chain ends of these polyester oligomers may be retained to have a COOH residue or an OH residue without being capped; however, from the viewpoints of stability and hygroscopicity of the resin composition, it is preferable that the chain ends have an OH residue or be capped, and it is more preferable that the chain ends be capped and do not contain a hydroxyl group and a carboxyl group.

Capping can be carried out by any arbitrary method, and in the case of a carboxyl group, ester capping is a preferable example, while in the case of a hydroxyl group, ester capping, ether capping and the like are preferable examples. Regarding the method of capping, first, a compound having a hydroxyl group and/or a carboxyl group is synthesized, and then the compound may be allowed to react with a capping agent, or a capping agent may be incorporated into the polymerization reaction. In the case of ester capping, examples of monocarboxylic acids that are used for capping include acetic acid, propionic acid, butanoic acid, 2-ethylhexanoic acid, benzoic acid, toluic acid, p-tert-butylbenzoic acid, and naphthoic acid. Examples of monoalcohols that are used for capping include methanol, ethanol, propanol, isopropanol, butanol, and isobutanol.

The polyester oligomers described above can be produced by known methods described in, for example, JP-A No. 61-276836, JP-A No. 2006-64803, and JP-A No. 2007-269850.

These polyester oligomers may be used singly, or two or more kinds may be used as mixtures.

Furthermore, specific examples of the ester-based compounds include ester-based compounds of polyhydric alcohols such as ethylene glycol, propylene glycol, glycerin, diglycerin, pentaerythritol and dipentaerythritol, and monocarboxylic acids such as acetic acid, benzoic acid, dehydroabietic acid, dihydroabietic acid and abietic acid; and ester-based compounds of polycarboxylic acids such as terephthalic acid, 1,35-trimellitic acid, citric acid and adipic acid, and monoalcohols such as methanol, ethanol, ethylene glycol monomethyl ester and phenol.

These ester-based compounds may be used singly, or two or more kinds may be used as mixtures.

The content of the moisture absorption inhibitor in the resin composition as a whole is appropriately set according to the kind of the moisture inhibitor, the area of the interface between the resin composition and the atmosphere, and the like, for example, in the case of a hydrophobic substance, the content is 0.01% to 50% by mass, and preferably 1% to 30% by mass, and in the case of an amphiphilic substance, the content is 0.01% to 20% by mass, and preferably 0.1% to 1.0% by mass.

(Light Stabilizer)

The resin composition preferably contains at least one light stabilizer. Examples of the light stabilizer include a HALS, an ultraviolet absorber, and a single oxygen quencher.

The HALS (hindered amine-based light stabilizer) may be a high molecular weight hindered amine-based light stabilizer, or may be a low molecular weight hindered amine-based light stabilizer. Also, both may be used in combination.

—High Molecular Weight Hindered Amine-Based Light Stabilizer—

Regarding the high molecular weight hindered amine-based light stabilizer, a compound having a molecular weight of greater than 1000 is used. Examples of such a light stabilizer include poly[6-(1,1,3,3-tetramethylbutyl)imino-1,3,5-triazine-2,4-diyl][(2,2,6,6-tetramethyl-4-piperid yl)imino}hexamethylene[(2,2,6,6-tetramethyl-4-piperidyl)imino], which is an oligomer type HALS, and a succinic acid dimethyl-1-(2-hydroxyethyl)-4-hydroxy-2,2,6,6-tetramethylpiperidine polycondensate. More specifically, products that are commercially available under the trade names of CHIMASSORB 944LD, TINUVIN 622LD (all manufactured by BASF Japan, Ltd.) and the like may be used.

These high molecular weight hindered amine-based light stabilizers are preferably incorporated in an amount of from 0.2 parts by mass to 10 parts by mass relative to 100 pans by mass of the resin composition. When the content of the high molecular weight hindered amine-based light stabilizer is 0.2 parts by mass or more, sufficient weather resistance, which is desired, can be obtained. Also, when the content is 10 parts by mass or less, a weather resistance enhancing effect induced by weight increase can be expected, and a decrease in mechanical strength or the occurrence of blooming can be suppressed.

—Low Molecular Weight Hindered Amine-Based Light Stabilizer—

Regarding the low molecular weight hindered amine-based light stabilizer, a compound having a molecular weight of 1000 or less, preferably 900 or less, and more preferably about from 600 to 900, is used.

Examples of such a light stabilizer include tris(2,2,6,6-tetramethyl-4-piperidyl)benzene-1,3,5-tricarboxylate, tris(2,2,6,6-tetramethyl-4-piperidyl)-2-acetoxypropane-1,2,3-tricarboxylate, tris(2,2,6,6-tetramethyl-4-piperidyl)-2-hydroxypropane-1,2,3-tricarboxylate, tris(2,2,6,6-tetramethyl-4-piperidyl)triazine-2,4,6-tricarboxylate, tris(2,2,6,6-tetramethyl-4-piperidyl)butane-1,2,3-tricarboxylate, tetrakis(2,2,6,6-tetramethyl-4-piperidyl)propane-1,1,2,3-tetracarboxylate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, and bis(1,2,2,6,6-pentamethyl-4-piperidyl) 2-(3,5-di-t-butyl-4-hydroxybenzyl)-2-n-butylmalonate. More specifically, products that are commercially available under the trade names of ADEKA STAB LA-57, ADEKA STAB LA-52 (all manufactured by Adeka Corp.), TINUVIN 144 (manufactured by BASF Japan, Ltd.), and the like may be used.

These low molecular weight hindered amine-based light stabilizers are preferably incorporated in an amount of from 0.2 parts by mass to 10 parts by mass relative to 100 parts by mass of the resin composition. When the content of the low molecular weight hindered amine-based light stabilizer is 0.2 parts by mass or more, sufficient weather resistance, which is desired, can be obtained. Furthermore, when the content is 10 parts by mass or less, a weather resistance enhancing effect induced by weight increase can be expected, and a decrease in mechanical strength or the occurrence of blooming can be suppressed.

—Ultraviolet Absorber—

Examples of the ultraviolet absorber include benzotriazole-based ultraviolet absorbers such as 2-(2'-hydroxy-3',5'-di-t-butylphenyl)benzotriazole, 2-(3,5-di-t-amyl-2-hydroxyphenyl)benzotriazole, 2-(2'-hydroxy-5'-methylphenyl)benzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3",4" 5",6"-tetrahydrophthalimidomethyl)-5'-methylphenyl]benzotriazole, 2,2'-methylenebis[4-(1,1,3,3-tetramethylbutyl)-6-(2H-benzotriazol-2-yl)phenol], 2-[2-hydroxy-3,5-bis(α,α-dimethylbenzyl)phenyl]-2H-benzotriazole, 2-(2-hydroxy-4-octyloxyphenyl)-2H-benzotriazole, and 2-(2H-benzotriazol-2-yl)-4-methyl-6-(3,4,5,6-tetrahydrophthalimidylmethyl)phenol; benzophenone-based ultraviolet absorbers such as 2-hydroxy-4-methoxybenzophenone, 2,4-dihydroxybenzophenone, 2,2'-dihydroxy-4-methoxybenzophenone, 2,2'-dihydroxy-4,4'-dimethoxybenzophenone, 2-hydroxy-4-n-octoxybenzophenone, 2,2',4,4'-tetrahydroxybenzophenone, 4-dodecyloxy-2-hydroxybenzophenone, 3,5-di-t-butyl-4-hydroxybenzoylbenzoic acid n-hexadecyl ester, 1,4-bis(4-benzoyl-3-hydroxyphenoxy)butane, and 1,6-bis(4-benzoyl-3-hydroxyphenoxy)hexane; and cyanoacrylate-based ultraviolet absorbers such as ethyl-2-cyano-3,3-diphenyl acrylate as representative. More specifically, products that are commercially available under the trade names of TINUVIN 320, TINUVIN 328, TINUVIN 234, TINUVIN 1577, TINUVIN 622 IRGANOX (all manufactured by BASF Japan, Ltd.), ADEKA STAB LA31 (manufactured by Adeka Corp.), SEESORB 102, SEESORB 103, SEESORB 501 (manufactured by Shipro Kasei Kaisha, Ltd.) may be used.

These ultraviolet absorbers are preferably incorporated in an amount of from 0.2 parts by mass to 10 parts by mass relative to 100 parts by mass of the resin composition. When the content of the ultraviolet absorber is 0.2 parts by mass or more, sufficient weather resistance, which is desired, can be obtained. Furthermore, when the content is 10 parts by mass or less, a weather resistance enhancing effect induced by weight increase can be expected, and a decrease in mechanical strength or the occurrence of blooming can be suppressed.

Examples of the single oxygen quencher include benzenesulfonic acid nickel salt, p-toluenesulfonic acid nickel salt, dimethyldithiocarbamic acid nickel salt, di-n-butyldithiocarbamic acid nickel salt, tetrabutylphosphonium bis(1,2-benzenedithiolato)nickelate(III), and tetrabutylphosphonium bis (4-methyl-1,2-benzenedithiolato)nickelate(III).

These single oxygen quenchers are preferably incorporated in an amount of from 0.2 parts by mass to 10 parts by mass relative to 100 parts by mass of the resin composition. When the content of the singlet oxygen quencher is 0.2 parts by mass or more, sufficient weather resistance, which is desired, can be obtained. Furthermore, when the content is 10 parts by mass or less, a weather resistance enhancing effect induced by weight increase can be expected, and a decrease in mechanical strength or the occurrence of blooming can be suppressed.

These light stabilizers may be used singly, or in combination of two or more kinds.

The resin composition may also contain other additives as necessary. The other additives may be appropriately selected from usually-used additives according to the purpose. Examples of the other additives include a plasticizer, a stabilizer, an impact resistance enhancer, a crystal nucleating agent, a lubricating agent, an antistatic agent, a surfactant, a pigment, a dye, a filler, an oxidation inhibitor (hindered phenol-based compounds, phosphorous acid ester-based compounds, and the like), a mold releasing agent (fatty acids, fatty acid metal salts, oxyfatty acids, fatty acid esters, partially saponified aliphatic esters, paraffin, low molecular weight polyolefins, fatty acid amides, alkylenebisfatty acid amides, aliphatic ketones, fatty acid lower alcohol esters, fatty acid polyhydric alcohol esters, fatty acid polyglycol esters, and modified silicones), a processing aid, an antifogging agent, a drip preventing agent, an antibacterial agent, and an antifungal agent. These may be used singly, or two or more kinds may be used in combination.

[Composite Material]

The polyamide polymer of the present invention may be mixed with various materials and used as composite materials, for the purpose of adjusting the properties to desired ranges.

Particularly important factors in the case of making a composite material from a polyamide polymer, are polymer alloying (mixing with different kinds of polymers) and incorporation of a filler, and thereby, impact resistance, heat resistance, durability, moldability and the like can be improved.

Regarding the polymers used for polymer alloying, two or more kinds of polyamide polymers having different polymer characteristics may be used, or a polyamide polymer and a polymer other than that may be used in combination.

Examples of the polymer other than the polyamide polymer of the present invention, which may be used for the polymer alloying, include the following 1) to 4).

1) Olefinic resins (homopolymers of α-olefins such as ethylene, propylene, 1-butene, 1-pentene, 1-hexene, and 4-methyl-1-pentene, or cycloolefins such as cyclopentene, cyclohexene, cyclooctene, cyclopentadiene, 1,3-cyclohexadiene, bicyclo[2.2.1]hept-2-ene, tricyclo[4.3.0.1$^{2.5}$]deca-3,7-diene, and tetracyclo[4.4.0.1$^{2.5}$.1$^{7,10}$]dodec-3-ene; copolymers of the aforementioned α-olefins, and copolymers of α-olefins and other monomers capable of copolymerizing with α-olefins, vinyl acetate, maleic acid, vinyl alcohol, methacrylic acid, methyl methacrylate, ethyl methacrylate, and the like).

2) Polyester-based resins (copolymers of a dicarboxylic acid monomer such as terephthalic acid, isophthalic acid, 2,6-naphthalenedicarboxylic acid, 1,4-naphthalenedicarboxylic acid, succinic acid, adipic acid or sebacic acid, and a diol or a polyhydric alcohol monomer such as ethylene glycol, propylene glycol, 1,4-butylene glycol, 1,4-cyclohexanedimethanol, diethylene glycol, triethylene glycol, polypropylene glycol, polyoxytetramethylene glycol, an alkylene oxide adduct of a bisphenol compound or a derivative, trimethylolpropane, glycerin or pentaerythritol; polycondensation products of lactic acid, β-hydroxybutyric acid, p-hydroxybenzoic acid, and a hydroxycarboxylic acid such as 2,6-hydroxynaphthoic acid; and the like).

3) Polyamide-based resins (polymers having acid amide bonds in the chain, which can be obtained by polycondensation of a lactam having a 3-membered or higher-membered ring, a polymerizable ω-amino acid, or a dibasic acid and a diamine and the like, and specifically, polymers of ∈-caprolactam, aminocaproic acid, enanthlactam, 7-aminoheptanoic acid, 11-aminoundecanoic acid, 9-aminononanoic acid, α-pyrrolidone, α-piperidone, and the like; polymers that can be obtained by polycondensing a diamine such as hexamethylenediamine, nonamethylenediamine, undecamethylenediamine, dodecamethylenediamine, or meta-xylenediamine, and a dicarboxylic acid such as terephthalic acid, isophthalic acid, adipic acid, sebacic acid, dodecanoic dibasic acid or glutaric acid, or copolymers thereof. Examples include nylon-4, nylon-6, nylon-7, nylon-8, nylon-11, nylon-12, nylon-6,6, nylon-6,10, nylon-6,11, nylon-6,12, nylon-6T, a nylon-6/nylon-6,6 copolymer, a nylon-6/nylon-12 copolymer, a nylon-6/nylon-6T copolymer, and a nylon-6I/nylon-6T copolymer).

4) Rubbers or elastomers (natural rubber, isoprene rubber, butadiene rubber, 1,2-polybutadiene rubber, styrene-butadiene rubber, chloroprene rubber, 2-tolyl rubber, butyl rubber, ethylene-propylene rubber, chlorosulfonated polyethylene, acrylic rubber, epichlorohydrin rubber, polysulfide rubber, silicone rubber, fluororubber, urethane rubber, and the like).

In addition to those, resins such as a polycarbonate-based resin, an acrylic resin, a urethane-based resin, polyvinyl alcohol, a vinyl chloride-based resin, a styrene-based resin, polyacrylonitrile, polyvinylidene chloride, a fluororesin, polyacetal, polysulfone, ABS, and polyether ether ketone may also be used.

Among the polymers used for the polymer alloying described above, from the viewpoint of not decreasing the biomass degree, polylactic acid, poly-β-hydroxybutyric acid, polybutylene succinate and the like are preferably used.

Polymer alloying is usually carried out by melt kneading, but in the case where phase separation occurs upon simple kneading, a uniform phase can be formed by using a compatibilizer, performing secondary block copolymerization or graft polymerization, or dispersing one of the polymers in a cluster form.

Furthermore, from the viewpoint of achieving polymer alloying without impairing the characteristics exhibited by the polyamide polymer of the present invention, the content ratio (on a mass basis) of the polyamide polymer of the present invention in a polymer alloy is preferably 20% to 100%, and more preferably 50% to 100%.

Furthermore, as for the polyamide polymer of the present invention, desired polymer properties can be achieved by incorporating various fillers. Particularly, incorporation of a filler is effective for improvements of heat resistance, durability and impact resistance.

Regarding the filler, any of an inorganic filler and an organic filler may be used.

Examples of useful inorganic fillers include fibrous inorganic fillers such as glass fiber, carbon fiber, graphite fiber, metal fiber, potassium titanate whisker, aluminum borate whisker, magnesium-based whiskers, silicon-based whiskers, wollastonite, sepiolite, slag fiber, xonotlite, ellestadite, gypsum fiber, silica fiber, silica-alumina fiber, zirconia fiber, boron nitride fiber, silicon nitride fiber and boron fiber; and plate-shaped or particulate inorganic fillers such as glass flakes, non-swellable mica, fullerene, carbon nanotubes, carbon black, graphite, metal foils, ceramic beads, talc, clay, mica, sericite, zeolite, bentonite, dolomite, kaolin, finely powdered silicic acid, feldspar powder, potassium titanate, Shirasu balloons, calcium carbonate, magnesium carbonate, barium sulfate, calcium oxide, aluminum oxide, titanium oxide, magnesium oxide, aluminum silicate, silicon oxide, aluminum hydroxide, magnesium hydroxide, gypsum, novaculite, dosonite, and white clay.

Furthermore, examples of useful organic fillers include synthetic fibers such as cellulose nanofibers, polyester fibers, nylon fibers, acrylic fibers, regenerated cellulose fibers, acetate fibers, and aramid fiber; natural fibers such as kenaf, ramie, cotton, jute, hemp, sisal, manila hemp, flax, linen, silk, and wool; fibrous organic fillers that can be obtained from microcrystalline cellulose, sugar cane, wood pulp, waste paper, used paper and the like; and particulate organic fillers such as organic pigments.

In many cases where the polyamide polymer of the present invention is applied as actual products, the polyamide polymer is preferably used as a composite material having a flame retardant incorporated therein. A flame retardant is a material which makes a polymer material difficult to burn, or prevents flames from spreading. As for the flame retardant, halogen-based (bromine and chlorine compounds) compounds or phosphorus-based compounds (aromatic phosphoric acid esters and the like) are primarily used.

However, since these flame retardants generate substances harmful to the human body or produce environmentally hazardous substances at the time of fire, improvement is required. From this point of view, aluminum hydroxide and magnesium hydroxide, which are recently attracting attention for being excellent from the viewpoints of a flame retardant effect and environmental safety, are also preferably used as flame retardants that are used together with the polyamide polymer of the present invention.

A material which is used in combination with a flame retardant to increase flame retardancy or form a carbide coating film on the resin surface, and thereby suppresses spreading of fire (flame retardant aid) is also useful as a composite material containing the polyamide polymer of the present invention. Specifically, antimony compounds and organic aromatic compounds (phenol derivatives and the like) are preferably used as an inorganic compounds.

The composite material preferably further contains at least one additive selected from the group consisting of a moisture absorption inhibitor and a light stabilizer. Furthermore, if necessary, the composite material may further contain other additives.

The moisture absorption inhibitor, light stabilizer, and other additives are as described above, and preferable embodiments are also the same.

The composite material of the present invention that can be obtained by mixing the materials described above can be molded (shaped) by various methods. Regarding the molding method, for example, extrusion molding and injection molding are used. There are no particular limitations on the applications of the molded products thus obtained, and examples include components for automobiles, electric appliances, electric and electronic equipment (OA- and media-related equipment, optical equipment, communication equipment, and the like), mechanical parts, materials for housing and construction, and various containers such as containers and bottles.

<Molded Product>

The molded product of the present invention is configured to include at least one kind of the polyamide polymer described above, and to include other additives as necessary. Regarding the other additives, for example, the additives that are added to the composite material described above may be appropriately incorporated according to the use. Among others, the molded product of the present invention preferably further contains at least one additive selected from the group consisting of a flame retardant, a moisture absorption inhibitor, and a light stabilizer.

Since the molded product contains the polyamide polymer, the molded product exhibits excellent heat resistance, and since the density is low, weight reduction can be achieved.

The shape of the molded product is not particularly limited, and is appropriately selected according to the purpose. Examples thereof include a sheet, a film, a fiber, a casing for electronic instruments, a sensor lens, an LED lamp, a fuse cover, and an IC card.

Also, the molded product may also be configured to include the composite material described above.

<Film>

The film of the present invention is configured to include at least one kind of the polyamide polymer described above and to optionally include other additives. Regarding the other additives, for example, the additives that are added to the composite material described above may be appropriately incorporated according to the use. Among them, the film preferably further contains at least one additive selected from the group consisting of a flame retardant, a moisture absorption inhibitor, and a light stabilizer.

By incorporating the polyamide polymer, a lightweight film having excellent heat resistance and high transparency can be constructed.

The thickness of the film may be appropriately determined according to the use, for example, the thickness may be adjusted to 4 μm to 1000 μm, and preferably about 25 μm to 500 μm.

The method for producing the film is not particularly limited, and may be appropriately selected from film forming methods that are usually used, according to the purpose. For example, a cast film forming method of dissolving the polyamide polymer in an organic solvent and applying the solution may be used.

<Fiber>

The fiber of the present invention is configured to include at least one kind of the polyamide polymer described above and to optionally include other additives. Regarding the other additives, for example, the additives that are added to the composite material described above may be appropriately incorporated according to the use. Among them, the fiber preferably further contains at least one additive selected from the group consisting of a flame retardant, a moisture absorption inhibitor, and a light stabilizer.

By incorporating the polyamide polymer, a lightweight fiber having excellent heat resistance can be constructed.

The thickness of a monofilament that constitutes the fiber is not particularly limited and may be appropriately selected according to the purpose. Furthermore, there are no particular limitations on the method for producing the fiber, and the method may be appropriately selected from methods for producing a fiber that are usually used, according to the purpose.

<Porous Film>

The porous film of the present invention is formed to include at least one kind of the polyamide polymer, and has at least one pore in the interior. When the porous film includes pores in the interior, adiabaticity, sound insulation, vibration resistance, low dielectric characteristics, separability, impact resistance, diffusivity and the like can be enhanced.

Furthermore, the pores carried by the porous film in the interior may be open pores or may be closed pores, and the pores are preferably closed pores. Here, a closed pore means a state in which plural pores present in the interior of the porous film are not in communication with each other, and the respective pores are compartmentalized by pore walls that contain the polyamide polymer. Furthermore, an open pore means a state in which at least two of the plural pores present in the interior of the porous film are in communication with each other, and open-holes are present in at least a portion of the pore walls that form the respective pores and contain the polyamide polymer.

The porous film may contain other additives, if necessary. Regarding the other additives, for example, the additives that are added to the composite material described above may be appropriately incorporated according to the use. Among them, the porous film preferably further contains at least one additive selected from the group consisting of a flame retardant, a moisture absorption inhibitor, and a light stabilizer.

Furthermore, the porous film may optionally contain inorganic particles in the film. Examples of the inorganic particles include particles of inorganic substances such as alumina, cadmium sulfide, and apatite; and composite particles of an inorganic particles-titanium oxide composite or the like.

The shape of the pores carried by the porous film in the interior is not particularly limited. When the cross-sectional shape is observed, it is preferable that a circular shape, an elliptical shape, or a shape close to those shapes be observed, and it is more preferable that a circular shape or a shape close thereto be observed.

The size of the pores carried in the interior of the porous film is not particularly limited, and may be appropriately selected according to the purpose. For example, the average pore diameter of the pores is preferably from 0.5 μm to 50 μm, the average pore diameter is more preferably from 0.5 μm to 30 μm, and the average pore diameter is even more preferably from 0.5 μm to 15 μm.

For example, when the porous film is applied to a diffusion plate, if the average pore diameter of the pores is 50 μm or less, the incident light can be prevented from penetrating into the interior of the porous film, and also, the number of times of diffused reflection at the pore interface can be prevented from decreasing. Thus, the diffuse reflectance tends to increase. Meanwhile, if the average pore diameter is smaller than the wavelength of visible light, the incident light is transmitted. Therefore, it is preferable that the average pore diameter be at least greater than or equal to the wavelength of visible light.

Here, the average pore diameter of the pores is measured by the bubble point method defined in ASTM-F-316-70.

The average thickness of the porous film is not particularly limited and may be appropriately selected according to the purpose. For example, when the porous film is applied to a diffusion plate, from the viewpoints of diffuse reflectance and shape retentivity, the average thickness is preferably 50 μm or greater, more preferably from 50 μm to 500 μm, and even more preferably from 100 μm to 200 μm.

Furthermore, the average thickness of the porous film is obtained by measuring the thickness of the porous film at three spots by using a digital linear gauge, DG-525H (manufactured by Ono Sokki Co., Ltd.), and calculating the arithmetic mean of the thicknesses.

The specific gravity of the porous film is not particularly limited and may be appropriately selected according to the purpose. For example, when the porous film is applied to a diffusion plate, from the viewpoint of diffuse reflectance, the specific gravity is preferably 0.7 or less, more preferably from 0.01 to 0.7, and even more preferably from 0.1 to 0.4.

When the specific gravity of the porous film is 0.7 or less, that is, the porosity becomes large, the diffuse reflectance is further enhanced. This is speculated to be because for example, if the porosity increases, light absorption in a resin portion where pores are not present, or light loss caused by light transmission or the like caused by transparentization of the porous film is suppressed.

Meanwhile, the specific gravity of the porous film is measured by using a precision specific gravity hydrometer, AUW120D (manufactured by Shimadzu Corp.) under ordinary conditions.

The porosity of the porous film is not particularly limited and may be appropriately selected according to the purpose. For example, the porosity is preferably 60% to 90%, and more preferably 65% to 83%.

Here, the porosity is calculated from the ratio of the apparent volume of the porous film and the volume of mercury intruded by mercury intrusion porosimetry (ASTM-D-2873-70).

The reflectance of the porous film is not particularly limited. Above all, an average reflectance at a wavelength of 300 nm to 800 nm is preferably 95% or higher, and more preferably 98% or higher. When the average reflectance is in the range described above, in the case of constructing a light reflection plate by using the porous film, a sufficient amount of light can be obtained.

Meanwhile, the reflectance was measured in a wavelength range of 300 nm to 800 nm by using a spectrophotometer (UV-3101C; manufactured by Shimadzu Corp.). Furthermore, a white plate obtained by hardening a fine powder of barium sulfate was used as the standard white plate.

The glossiness of the porous film is not particularly limited. Above all, when the glossiness is measured with an incident light of a wavelength of 400 nm to 800 nm at an incident angle of 60° or less, the glossiness is preferably 50 or greater, more preferably 60 or greater, even more preferably 70 or greater, and particularly preferably 80 or greater.

Meanwhile, the glossiness follows the definition described in JIS Standards Z8741. The glossiness can be obtained by measuring light which includes a wavelength of 400 nm to 800 nm under the conditions of an incident angle of 60 degrees (°) and a light reception angle of 60 degrees, by using a variable angle glossimeter, VG-1001DP (trade name, manufactured by Nippon Denshoku Industries Co., Ltd.).

The porous film has a coefficient of thermal shrinkage at 200° C. of preferably 0.3% or less, more preferably 0.2% or less, and most preferably 0.1% or less, in both of the two directions that are perpendicular to each other. When the coefficient of thermal shrinkage is in this range, for example, a white film for light reflection plate having high heat resistance can be produced.

Meanwhile, the coefficient of thermal shrinkage is calculated as described below. That is, a film sample (0.5 cm×2.0 cm strip) is produced, and the amount of dimensional change is measured in the case of heating the film sample for one hour at 200° C. by a tensile loading method of TMA (manufactured by Rigaku Corp., TMA8310) under the conditions of a tensile load of 100 mN. The coefficient of thermal shrinkage is calculated as the dimensional change ratio of the film, which is a value obtained by dividing the amount of dimensional change by the sample length before the test.

The porous film is preferably produced by a solution casting method. The porous film is usually formed according to a method of subjecting a polyamide polymer to phase separation from the solution, and such a method is preferably used also for the present invention. The details of such a method are described in, for example, Japanese Patent Publication (JP-B) No. 55-38366 and the like. The porous film is formed through, for example, phase separation (spinodal decomposition) or coacervation. Such a process may be formed in the course of volatilization of a single good solvent, or may be formed in the course of volatilization of a mixed solvent of good solvent/poor solvent. Furthermore, phase separation can be promoted when induced by a non-solvent in a polymer solution of a good solvent. In the inducing caused by a non-solvent, exposure to a non-solvent vapor, immersion in a non-solvent bath, or a combination of the two is used.

Here, a good solvent means a solvent which can sufficiently dissolve a polyamide polymer, and a poor solvent means a solvent which does not substantially dissolve a polyamide polymer but swells the polyamide polymer. A non-solvent means a solvent which does not substantially dissolve or swell a polymer.

In the present invention, the good solvent, poor solvent and non-solvent are relative definitions determined mainly by the dissolution action and swelling action with respect to a polyamide polymer. Therefore, it is generally inappropriate to indiscriminatingly correlate such definitions with specific examples of solvents. That is, the kinds of the good solvent, poor solvent and non-solvent may be different or interchangeable depending on the structure of the polyamide polymer used. However, these relationships are based on the chemical and physical properties of the polyamide polymer, and since any skilled person can easily select the polyamide polymer and the three kinds of solvents based on ordinary knowledge, it is not necessary to particularly raise an issue on these relationships in the present invention.

The method of dissolving and mixing of a polyamide polymer, a good solvent, a poor solvent and a non-solvent is not particularly limited. For example, any of a method of dissolving a polyamide polymer in a good solvent and then adding a poor solvent and a non-solvent thereto; a method of adding a polyamide polymer to a mixture of a good solvent and a portion of a poor solvent to dissolve the polymer, adding the remaining poor solvent to this solution, and further adding a non-solvent thereto; and the like may be used.

Furthermore, there are no limitations on the conditions such as the mixing ratio of the respective solvents, and the temperature at the time of mixing (however, there is a condition that the temperature is preferably higher than or equal to the boiling point of the solvents). Moreover, in certain cases, one of the poor solvent and the non-solvent is not used. That is, it may be desirable to combine a good solvent and a poor solvent or a non-solvent by using an inorganic salt or the like. However, when a prepared polyamide polymer solution is stable, the operations that follow become simple. Therefore, it is preferable to perform dissolving and mixing so as to obtain a stable solution. Here, a stable solution means a solution in which the polyamide polymer does not undergo gelation or phase separation in the solution. In order to make a stable solution, a technique of adjusting the amount of the good solvent in the solution larger than the respective amounts of other solvents, or a technique of adding the polyamide polymer to a mixture of the entirety of the good solvent and a portion of the poor solvent and dissolving the polymer may be employed.

Examples of the organic solvent used in the polyamide polymer solution include aromatic hydrocarbons such as xylene, naphthalene and toluene; phthalic acid esters such as dioctyl phthalate, dimethoxyoxyethyl phthalate, and dimethyl phthalate; phosphoric acid esters such as triphenyl phosphate and tricresyl phosphate; polyhydric alcohol esters such as glycerol triacetate, ethyl phthalyl ethyl glycolate, and methyl phthalyl ethyl glycolate; mineral oils such as lamp oil and kerosene; ketones such as methyl ethyl ketone, methyl isobutyl ketone, and cyclohexanone; halogenated hydrocarbons such as methylene chloride, chloroform, and 1,1-dichloroethane; esters such as methyl acetate and ethyl acetate; and nitrogen compounds such as N-methyl-2-pyrrolidone (NMP), N,N-dimethylformamide (DMF), and N,N-dimethylacetamide (DMAc).

These solvents may be used singly or as mixed solvents of two or more kinds of solvents. Furthermore, it is preferable to select an appropriate solvent based on the linking group or the degree of polymerization of the polyamide polymer used in the present invention.

The polyamide polymer concentration in the polyamide polymer solution may be appropriately selected based on the kind of the polyamide polymer or the kind of the solvent. In relation to the formation of a continuous porous film, it is preferable that the concentration of the polyamide polymer be high to a certain extent. For example, the polyamide polymer concentration is preferably approximately 15% by mass.

The polyamide polymer solution thus prepared is flow cast (stretched out) to a thickness of 50 μm to 500 μm on a support such as a glass plate, a plastic film or a metal plate by using an applicator. In the case where phase separation occurs in the course of volatilization of a good solvent or a mixed solvent of good solvent/poor solvent, if the film is detached from the support and dried after the volatilization of the solvent, a porous film is obtained.

When phase separation is promoted by induction of a non (poor)-solvent, after the polyamide polymer solution is applied, immediately or after a portion of the solvent is volatilized, or after the polyamide polymer solution is exposed to the vapor of the non (poor)-solvent for a certain time, each support is immersed in the non (poor)-solvent to induce phase separation, and thereby a porous film is formed.

Regarding the non (poor)-solvent, a solvent which has high solubility with the good solvent and is a poor solvent or non-solvent with respect to the polyamide polymer, is used. Specifically, in view of good handleability, low cost, safety and the like, alcohols such as methanol, ethanol and isopropanol, and water are preferable.

The temperature of the polyamide polymer solution at the time of flow casting is generally room temperature, depending on the solvent system used, flow casting may also be carried out at a high temperature of approximately 100° C., and then the polyamide polymer solution may be cooled in air or may be rapidly cooled by immersing the solution in a coagulating liquid cooled to room temperature or a low temperature lower than or equal to room temperature.

In the above descriptions, the method of using a good solvent and a non (poor)-solvent has been mainly described as the method for producing a porous film, but in the case where phase separation occurs in the course of volatilizing the good solvent, a porous film can also be formed only with a good solvent.

<Reflection Plate>

The reflection plate according to the present embodiment is configured to include at least the porous film which has closed pores having an average pore diameter of from 0.5 μm to 50 μm and to optionally include other constituent elements. When the reflection plate includes a porous film having closed pores having a particular average pore diameter as a reflective layer, an excellent diffuse reflectance can be achieved. The reflection plate is suitably used as, for example, a reflection plate of a liquid crystal display device.

EXAMPLES

Hereinafter, the present invention will be specifically described by way of Examples, but the present invention is not limited to these Examples. Unless particularly stated otherwise, the units "parts" and "percent (%)" are on a mass basis.

Synthesis Example 1

Synthesis of Dicarboxylic Acid Compound (1e)

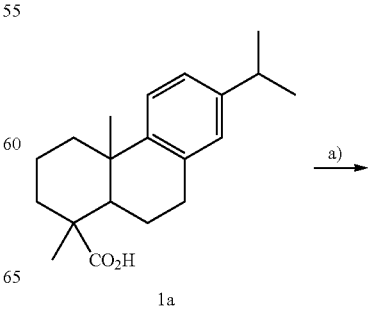

1a

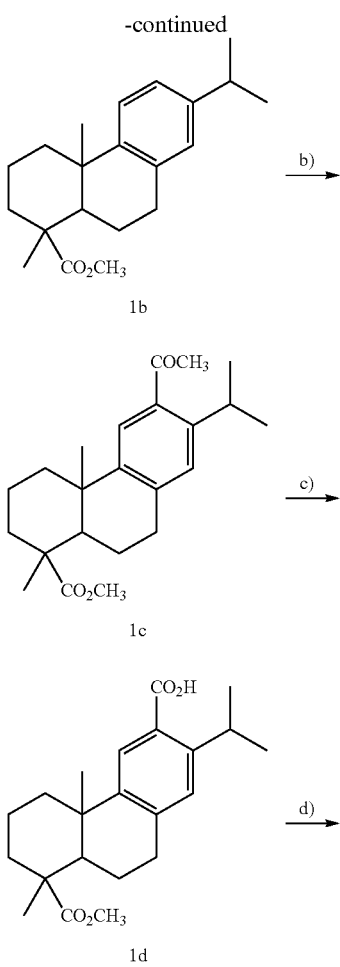

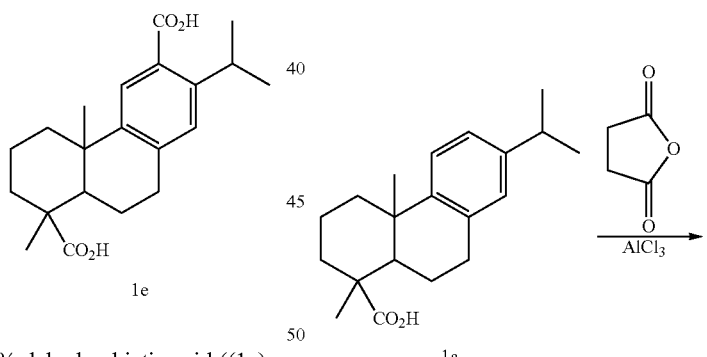

200 mL of ethyl acetate was added thereto, and an organic layer was extracted. The organic layer was washed with brine and dried over anhydrous magnesium chloride, and then the solvent was distilled off under reduced pressure. 50 mL of cold methanol was added to the residue, and white crystals of a compound (1c) thus precipitated out were collected by filtration. The yield was 32.8 g.

32.0 g of sodium hydroxide was dissolved in 100 mL of water, and 25.6 g of bromine was added dropwise thereto at 8° C. to 10° C. Furthermore, a liquid obtained by dissolving 17.8 g of (1c) in 100 mL of dimethoxyethane was added dropwise thereto at 10° C. to 12° C. The mixture was stirred for 2 hours at room temperature, subsequently the reaction liquid was poured into 6 N cold dilute hydrochloric acid to be made acidic, and white crystals thus precipitated out were collected by filtration. The crystals were recrystallized from methanol, and thus 14.9 g of crystals of a compound (1d) were obtained.

The $^1$H-NMR data of the compound (1d) are presented below.

1H-NMR (300 MHz, CDCl3) δ1.20~1.88 (m, 19H), 2.17~2.40 (dd, 2H), 2.91 (t, 2H), 3.66 (s, 3H), 3.87 (m, 1H), 7.07 (s, 1H), 7.86 (s, 1H)

8.0 g of sodium hydroxide was dissolved in 30 mL of water, and 20 mL of ethylene glycol and 7.16 g of (1d) were added thereto. The mixture was heated to reflex for 3 hours. After being cooled, the mixture was neutralized with 6 N hydrochloric acid, and white crystals of (1e) thus produced were filtered, washed with water and dried. Thus, 6.91 g of (1e) was obtained.

The $^1$H-NMR chart (solvent: CDCl$_3$) of the compound (1e) thus obtained is presented in FIG. 1.

Synthesis Example 2

Synthesis of Dicarboxylic Acid Compound (2a)

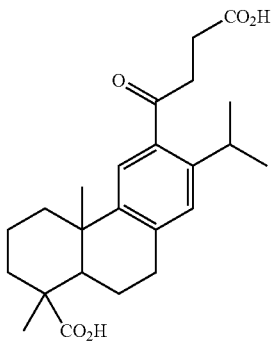

To a mixture of 30.0 g of 92% dehydroabietic acid ((1a), manufactured by Arakawa Chemical Industries, Ltd.) and 60 mL of methylene chloride, 13.4 g of oxalyl chloride was added dropwise at room temperature. After the mixture was stirred for 3 hours, the solvent was distilled off under reduced pressure, and 16.0 g of methanol was added dropwise thereto. The mixture was stirred for 3 hours at room temperature, subsequently excess methanol was distilled off under reduced pressure, and thus 31.4 g of white crystals of a compound (1 b) were obtained.

To a mixture of 31.4 g of (1b), 9.4 g of acetyl chloride and 80 mL of methylene chloride, 29.3 g of anhydrous aluminum chloride was gradually added in small amounts at 3° C. to 5° C. The mixture was stirred for 2 hours at 5° C. to 8° C., and then the reaction liquid was poured into 500 g of ice water.

A mixture of 75 g of 92% dehydroabietic acid ((1a), manufactured by Arakawa Chemical Industries. Ltd.), 37.5 g of succinic anhydride, and 500 mL of methylene chloride was stirred at room temperature, and thus the mixture was completely dissolved. Subsequently, under ice cooling, 150 g of aluminum chloride was gradually added thereto in small amounts at 20° C. to 25° C. The mixture was stirred for 3 hours at 20° C. to 23° C., subsequently the reaction liquid was poured into 2 L of ice water, and the reaction liquid was extracted with 1 L of ethyl acetate. The extract was sufficiently washed with brine and then dried over anhydrous magnesium sulfate, and ethyl acetate was distilled off under reduced pressure. 300 mL of methanol was added to the residue, and crystals thus precipitated out were collected by filtration. Thus, 69 g of white crystals of a dicarboxylic acid compound (2a) were obtained.

Synthesis Example 3

Synthesis of Dicarboxylic Acid Compound (3a)

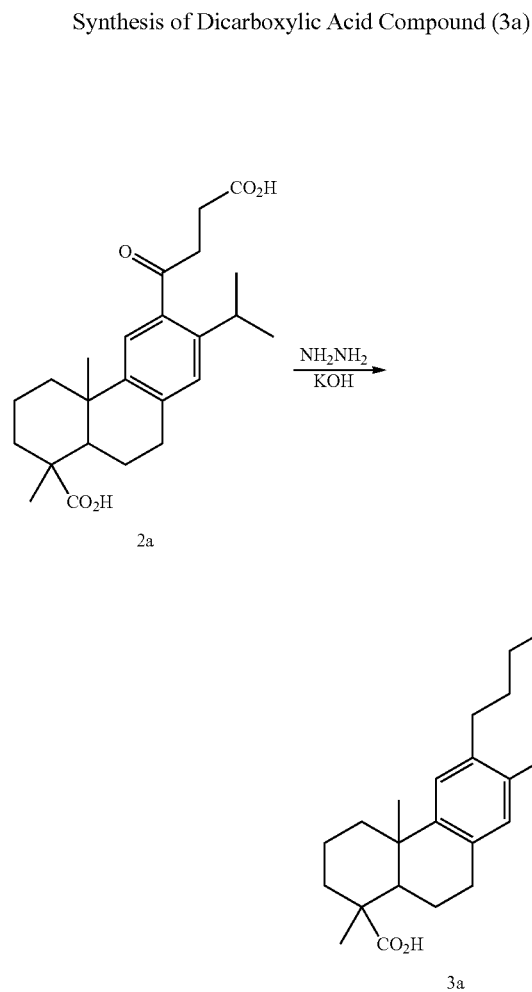

A mixture of 81.3 g of a dicarboxylic acid compound (2a), 34.8 mL of 90% hydrous hydrazine, 36.3 g of potassium hydroxide, and 270 mL of tetraethylene glycol was heated and stirred for 2 hours at 100° C., and then for 2 hours at 180° C. and then for 6 hours at 230° C. After being left to cool, the reaction liquid was poured into 1.5 L of cold dilute hydrochloric acid to neutralize the reaction liquid, and the mixture was extracted with ethyl acetate. The extract was sufficiently washed with water and then dried over anhydrous magnesium sulfate, and ethyl acetate was distilled off under reduced pressure. N-hexane was added to the colorless liquid of the residue to cause crystallization, and colorless crystals of a dicarboxylic acid compound (3a) were collected by filtration. The yield was 58.9 g.

Synthesis Example 4

Synthesis of Dicarboxylic Acid Compound (4a)

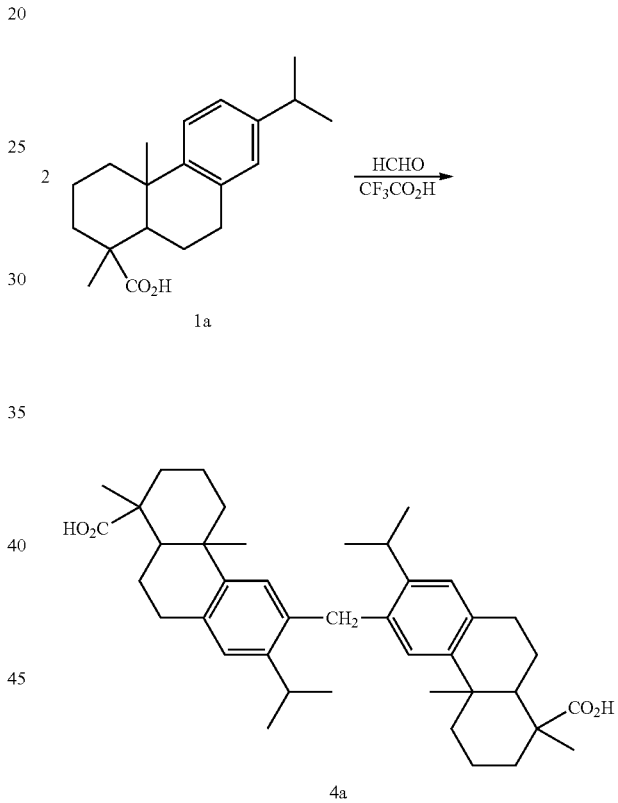

To a mixture of 120 g of 92% dehydroabietic acid ((1a), manufactured by Arakawa Chemical Industries, Ltd.), 20 mL of 36% formalin, and 200 mL of methylene chloride, 200 mL of trifluoroacetic acid was added dropwise thereto at 10° C. to 15° C. The mixture was stirred for 8 hours at 15° C. to 20° C., and then methylene chloride and trifluoroacetic acid were distilled off under reduced pressure. 2 L of water was added to the residue, and grayish white crystals were filtered and sufficiently washed with water. The crystals were dried, and then 1 L of hot n-hexane was added thereto. The mixture was stirred for one hour and was left to cool, and then white crystals of (4a) were collected by filtration. The yield was 118 g.

Synthesis Example 5

Synthesis of Dicarboxylic Acid Compound (5d)

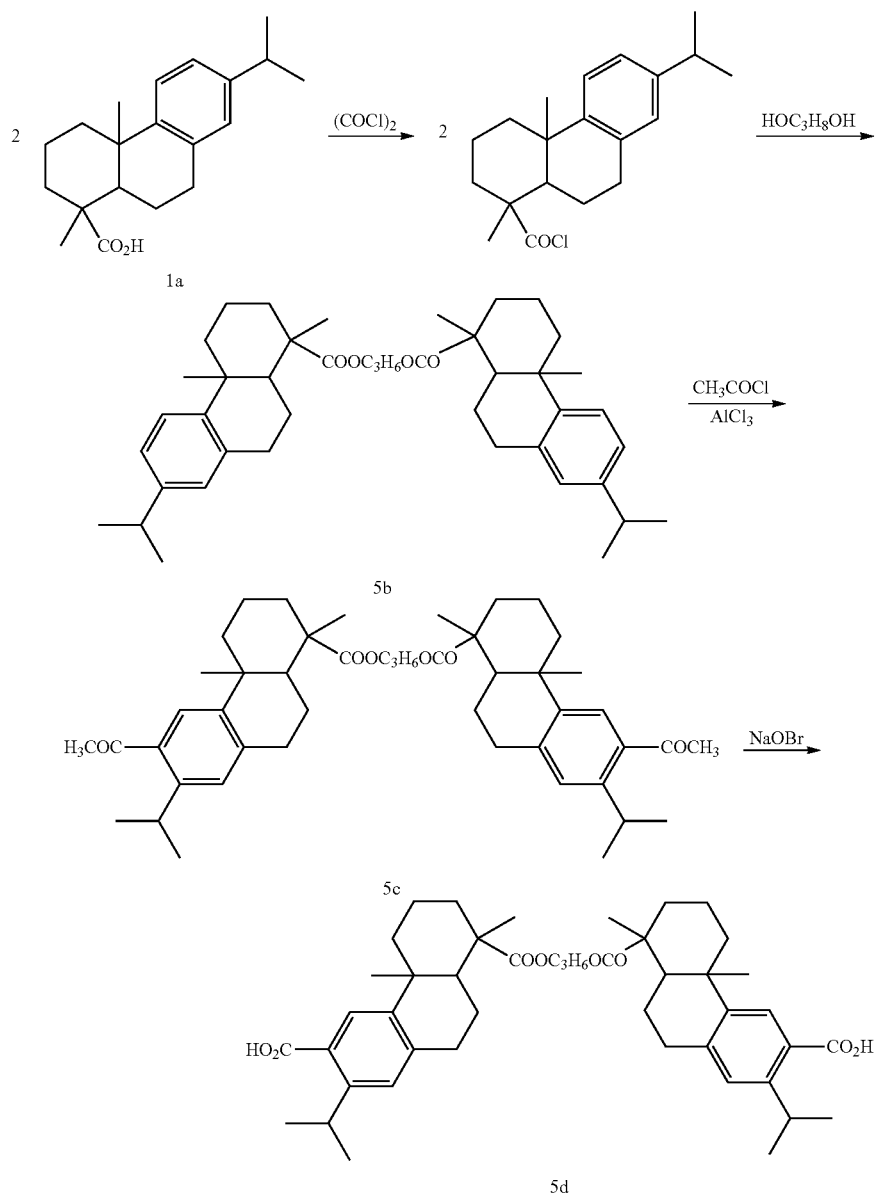

To a mixture of 60 g of 92% dehydroabietic acid ((1a), manufactured by Arakawa Chemical Industries, Ltd.) and 120 mL of methylene chloride, 26.8 g of oxalyl chloride was added dropwise at room temperature. The mixture was stirred for 3 hours, subsequently the solvent and excess oxalyl chloride were distilled off under reduced pressure, and 40 mL of methylene chloride and 7.6 g of 1,3-propanediol were added thereto. The mixture was stirred for 5 hours at 30° C. to 35° C., subsequently methylene chloride was distilled off under reduced pressure, and 50 mL of cold methanol was added to the residue. Thus, 55.8 g of white crystals of a compound (5b) were obtained.

12.2 g of acetic anhydride was added to a mixture of 32.1 g of the compound (5b) and 100 mL of methylene chloride at room temperature, and 44 g of anhydrous aluminum chloride was added thereto at 5° C. to 10° C. The mixture was stirred for 3 hours at 8° C. to 10° C., subsequently the reaction liquid was poured into ice water, and the reaction liquid was extracted with ethyl acetate. The extract was washed with brine and then dried over anhydrous magnesium sulfate, and ethyl acetate was distilled off under reduced pressure. The residue was recrystallized from methanol, and thus 32.9 g of white crystals of a compound (5c) were obtained.

25.6 g of sodium hydroxide was dissolved in 100 mL of cold water, and 20.5 g of bromine was added dropwise thereto at 8° C. to 10° C. Subsequently, a liquid prepared by dissolving 14.5 g of the compound (5c) in 100 mL of dimethoxyethane was added dropwise thereto at 8° C. to 10° C., and the mixture was stirred for one hour at 8° C. to 10° C. Subsequently, 100 mL of water was added thereto, and the mixture was stirred for 2 hours at 30° C. to 35° C. Under ice cooling, hydrochloric acid was added to the reaction liquid to acidify the reaction liquid, and the mixture was extracted with ethyl acetate. The extract was washed with brine and then dried over anhydrous magnesium sulfate, and ethyl acetate was distilled off under reduced pressure. 30 mL of ethyl acetate/n-hexane (1:1 mixed liquid) was added to the residue, and white crystals of a dicarboxylic acid compound (5d) thus precipitated out were collected by filtration. The yield was 9.5 g.

Example 1

Synthesis of Polyamide Polymer (PA-1)

A polyamide polymer (PA-1) was produced as described below.

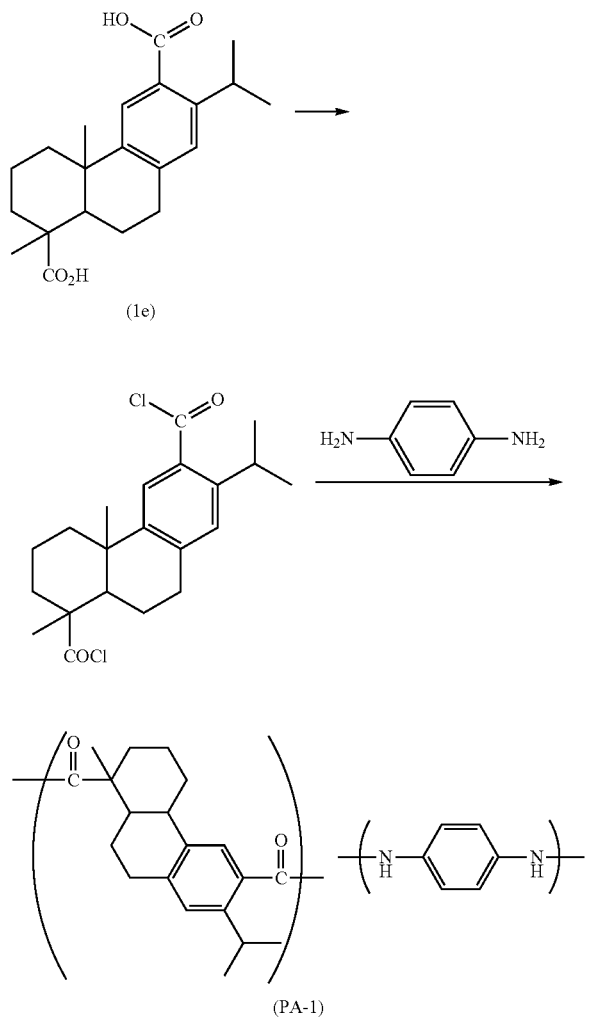

6.88 g of crystals of the dicarboxylic acid compound (1e) were dispersed in 80 mL, of methylene chloride, and 5.59 g of oxalyl chloride and 0.3 mL of dimethylformamide were added thereto. The mixture was heated to reflux for 5 hours. During this time, the crystals were completely dissolved. After being left to cool, the solvent was distilled off under reduced pressure, and 10 mL of ethyl acetate and 30 mL of n-hexane were added to the residue, and a white precipitate of acid chloride of the dicarboxylic acid compound (1e) was collected by filtration and dried under reduced pressure. The yield was 6.5 g.

1.08 g of p-phenylenediamine (DA-8) as a diamine compound was added to 30 mL of pyridine, and in a nitrogen atmosphere, the mixture was heated to 45° C. to dissolve the compound. This liquid was cooled to 15° C., and 3.81 g of the acid chloride of the dicarboxylic acid compound (1e) was gradually added thereto in small amounts. The reaction liquid gradually became viscous. The reaction liquid was stirred for 2 hours at room temperature, subsequently 100 mL of methanol was added to the reaction liquid, and PA-1 thus produced was separated by filtration and washed with methanol. This product was dried and then dissolved in 50 mL of dimethylformamide under heating, and the solution was gradually poured in small amounts into 500 mL of methanol to cause reprecipitation. After the precipitate was dried, 4.24 g of a white solid of PA-1 was obtained.

When the molecular weight of the polyamide polymer PA-1 was measured by GPC (solvent: NMP), it was found that Mw=111,000. Furthermore, as a thermal property of the polyamide polymer, the glass transition temperature Tg measured by DSC at a rate of temperature increase of 10° C./min was >300° C. Meanwhile, the Tg was measured by using a differential scanning calorimeter (manufactured by SII Nanotechnology, Inc., DSC6200) over a temperature range of 30° C. to 400° C., under the conditions of a rate of temperature increase of 10° C./min under a nitrogen gas stream.

Also, the $^1$H-NMR spectrum of PA-1 was measured. The $^1$H-NMR chart (solvent: DMSO-$d_6$) of PA-1 is presented in FIG. 2.

Figure 2:
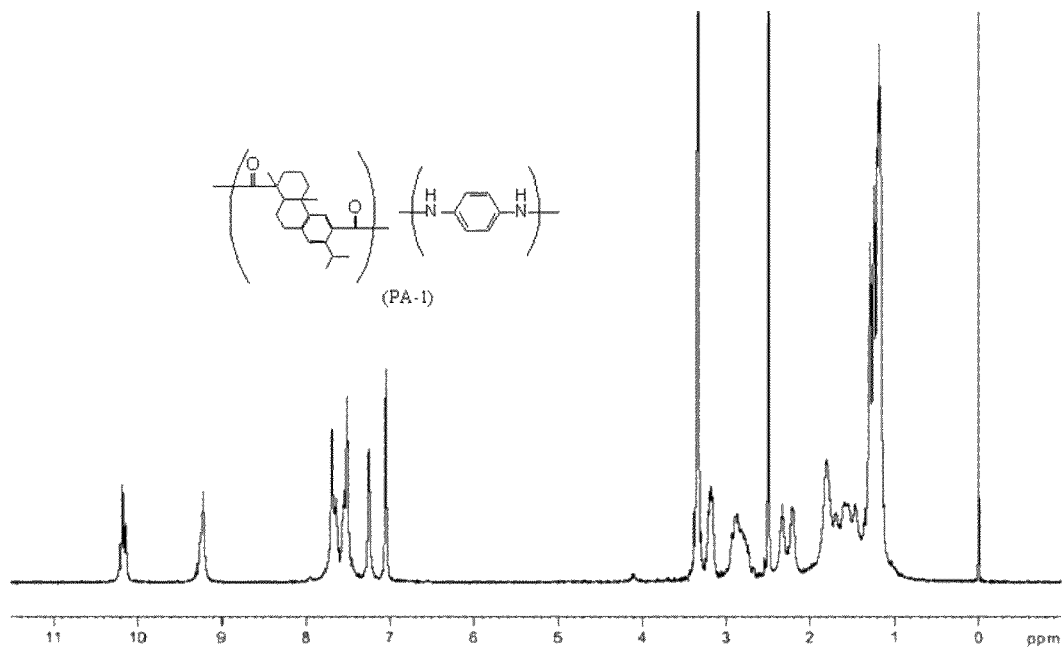
FIG. 2 is a diagram illustrating an example of the $^1$H-NMR spectrum of a polyamide polymer (PA-1) obtained in Example 1.

From FIG. 2, it was confirmed that PA-1 contained a structure derived from dehydroabietic acid and a structure derived from a diamine compound such as shown below.

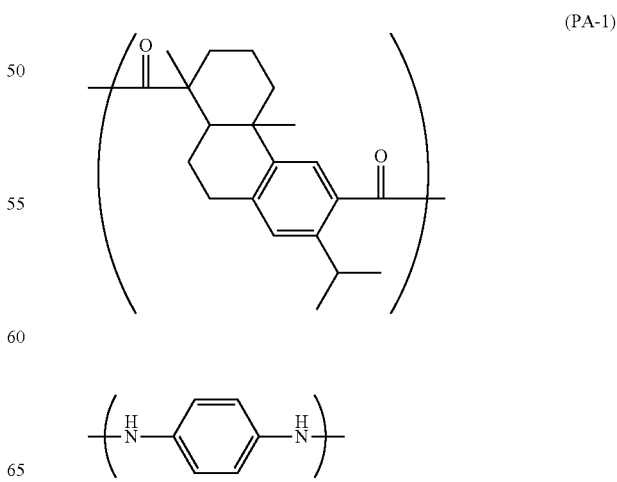

Example 2

Synthesis of Polyamide Polymer (PA-2)

A polyamide polymer (PA-2) was produced as described below.

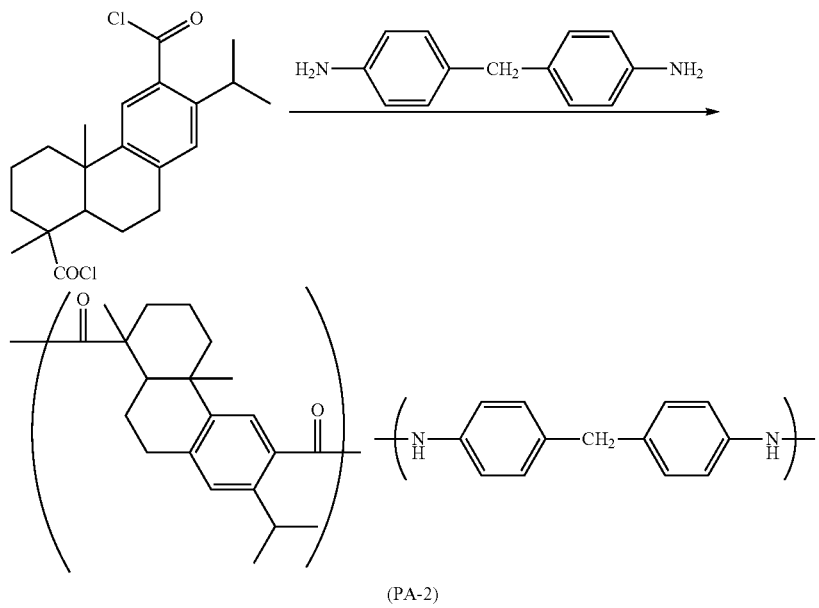

(PA-2)

1.98 g of a diamine compound, 4,4'-diaminodiphenyl-methane (DA-14), was added to 40 mL of pyridine and was dissolved therein by stirring at room temperature. Subsequently, in a nitrogen atmosphere, 3.81 g of acid chloride of the dicarboxylic acid compound (1e) was gradually added in small amounts at room temperature. The mixture was stirred for 2 hours at room temperature, subsequently 100 mL of methanol was added to the reaction liquid, and PA-2 thus produced was separated by filtration and washed with methanol. This product was dried and then was dissolved in 50 mL of dimethylformamide under heating, and the solution was gradually poured in small amounts into 500 mL of methanol to cause reprecipitation. The precipitate was washed with methanol and dried, and thus 4.9 g of a white solid of PA-2 was obtained. The molecular weight and the glass transition temperature were measured by the same methods as those used in Example 1, and the following results were obtained.

Mw=85,000, Tg=287° C.

Figure 3:
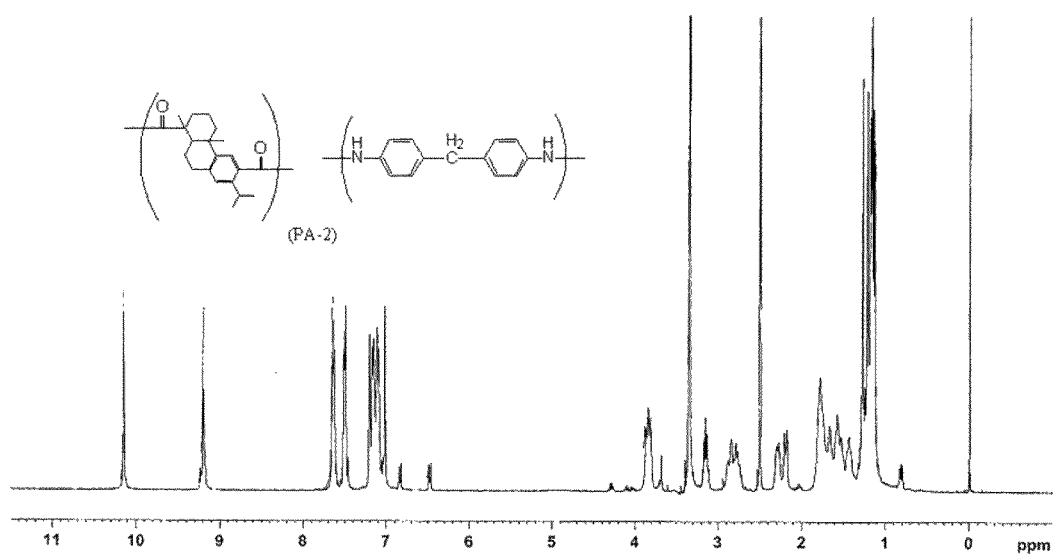
FIG. 3 is a diagram illustrating an example of the $^1$H-NMR spectrum of a polyamide polymer (PA-2) obtained in Example 2.

The $^1$H-NMR spectrum of PA-2 was measured. The $^1$H-NMR chart (solvent: DMSO-$d_6$) of PA-2 is presented in FIG. 3. From FIG. 3, it was confirmed that PA-2 contained a structure derived from dehydroabietic acid and a structure derived from a diamine compound such as shown below.

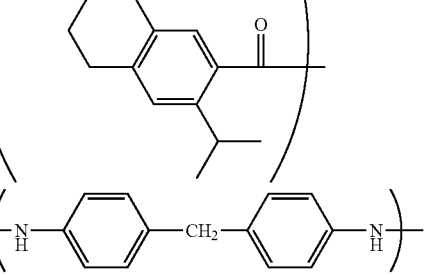

(PA-2)

Example 3

Synthesis of Polyamide Polymer (PA-3)

A polyamide polymer (PA-3) was produced as described below.

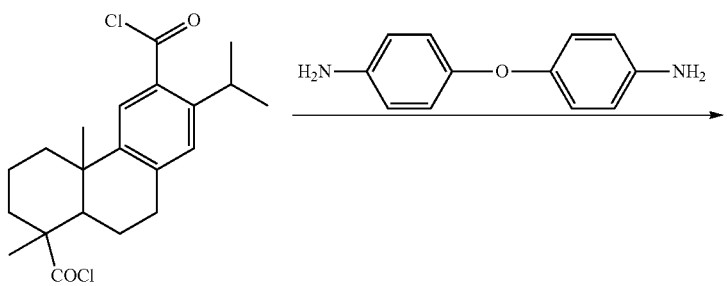

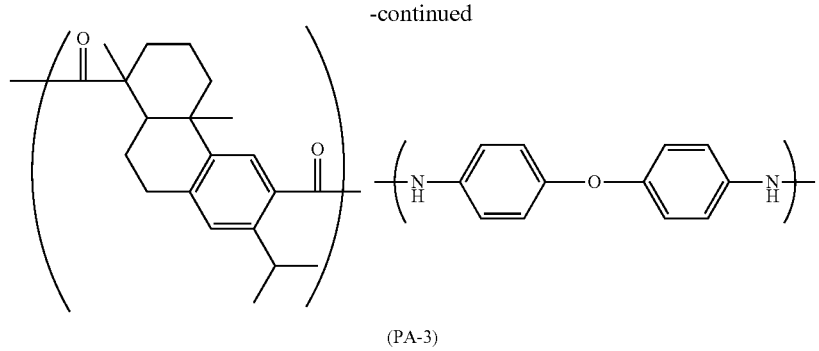

(PA-3)

2.0 g of a diamine compound, 4,4'-diaminodiphenyl ether (DA-13), was added to 40 mL of pyridine and was dissolved therein by stirring at room temperature. Subsequently, in a nitrogen atmosphere, 3.81 g of acid chloride of the dicarboxylic acid compound (1e) was gradually added in small amounts thereto at room temperature. The mixture was stirred for 2 hours at room temperature, subsequently 100 mL of methanol was added to the reaction liquid, and PA-3 thus produced was separated by filtration and washed with methanol. This product was dried and then was dissolved in 50 mL of dimethylformamide under heating, and the solution was gradually poured in small amounts into 500 mL of methanol to cause reprecipitation. The precipitate was washed with methanol and dried, and thus 5.0 g of a white solid of PA-3 was obtained. The molecular weight and the glass transition temperature were measured by the same methods as those used in Example 1, and the following results were obtained.

Mw=78,000, Tg=280° C.

Figure 4:
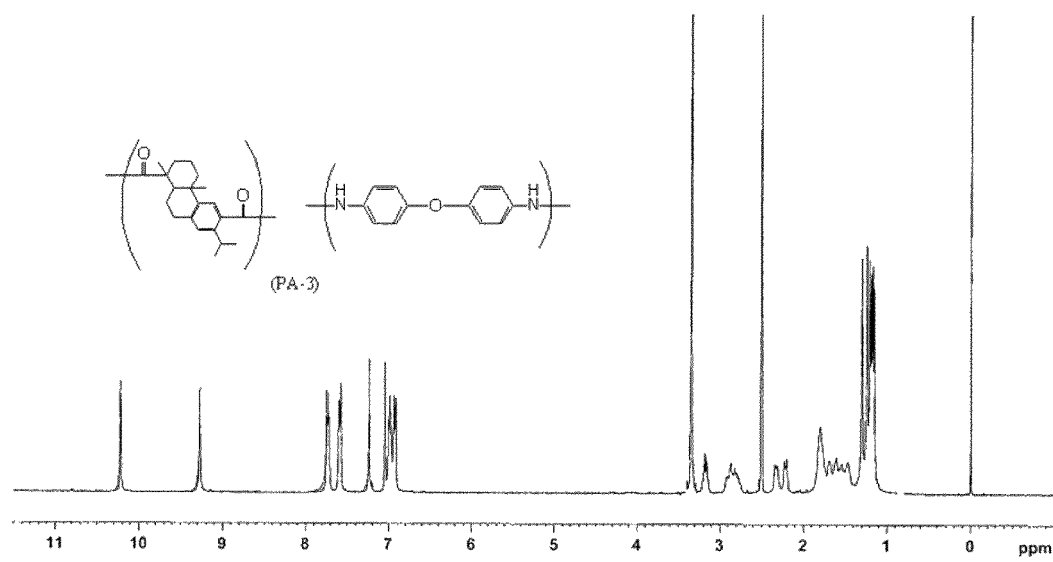
FIG. 4 is a diagram illustrating an example of the $^1$H-NMR spectrum of a polyamide polymer (PA-3) obtained in Example 3.

The $^1$H-NMR spectrum of PA-3 was measured. The $^1$H-NMR chart (solvent: DMSO-$d_6$) of PA-3 is presented in FIG. 4. From FIG. 4, it was confirmed that PA-3 contained a structure derived from dehydroabietic acid and a structure derived from a diamine compound such as shown below.

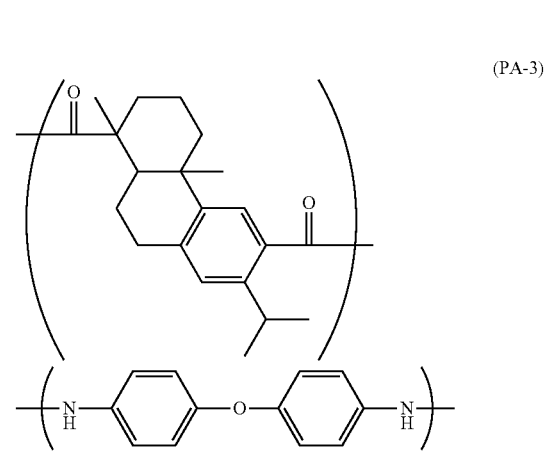

(PA-3)

Example 4

Synthesis of Polyamide Polymer (PA-4)

A polyamide polymer (PA-4) was produced as described below.

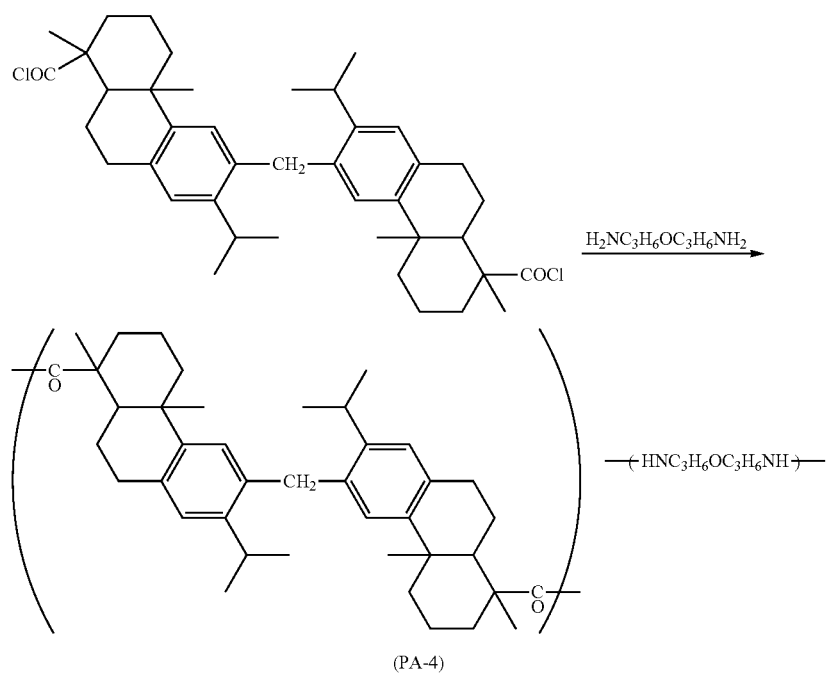

(PA-4)

12.3 g of crystals of the dicarboxylic acid compound (4a) were dispersed in 100 mL of methylene chloride, and 5.59 g of oxalyl chloride and 0.3 mL of dimethylformamide were added thereto. The mixture was heated to reflux for 5 hours. During this time period, the crystals were completely dissolved. The solution was left to cool, the solvent was distilled off under reduced pressure, and 10 mL of ethyl acetate and 30 mL of n-hexane were added to the residue. Acid chloride of the dicarboxylic acid compound (4a) was collected by filtration and was dried under reduced pressure. The yield was 10.9 g.

1.32 g of a diamine compound, bis-3-aminopropyl ether (DA-7), and 4.4 g of 4-dimethylaminopyridine were dissolved in 30 mL of pyridine, and in a nitrogen atmosphere, 6.50 g of the acid chloride of the dicarboxylic acid compound (4a) was gradually added thereto in small amounts. The mixture was stirred for 3 hours at room temperature, and then the reaction liquid was poured into cold dilute hydrochloric acid. A precipitate thus produced was separated by filtration and was sufficiently washed with water. This product was dried and then dissolved in 80 mL of N-methylpyrrolidone under heating, and the solution was gradually poured in small amounts into 500 mL of methanol to cause reprecipitation. The precipitate was collected by filtration, washed with methanol, and dried, and thus 5.9 g of a white solid of PA-4 was obtained. The molecular weight and the glass transition temperature were measured by the same methods as those used in Example 1, and the following results were obtained.

Mw=33,000, Tg=148° C.

Figure 5:
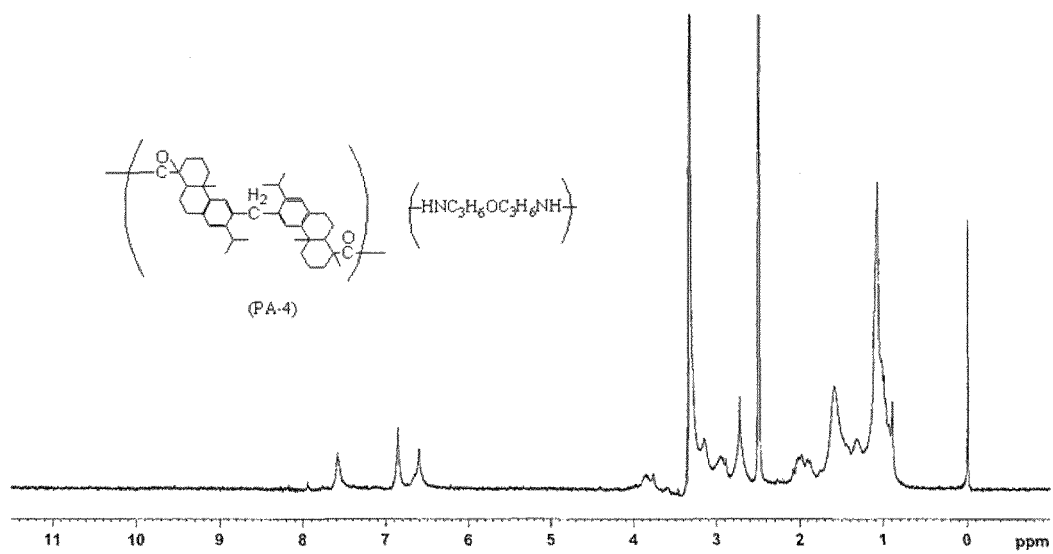
FIG. 5 is the $^1$H-NMR spectrum of a polyamide polymer (PA-4) obtained in Example 4.

The $^1$H-NMR spectrum of PA-4 was measured. The $^1$H-NMR chart (solvent: DMSO-d$_6$) of PA-4 is presented in FIG. 5. From FIG. 5, it was confirmed that PA-4 contained a structure derived from dehydroabietic acid and a structure derived from a diamine compound such as shown below.

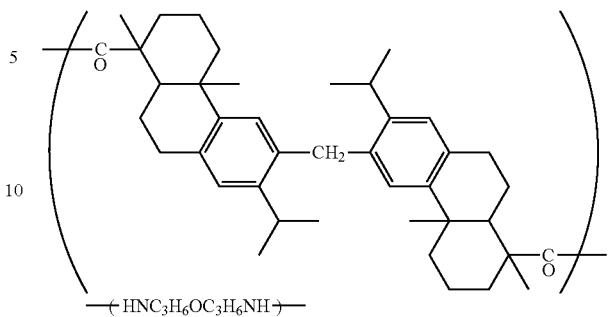

Example 5

Synthesis of Polyamide Polymer (PA-5)

A polyamide polymer (PA-5) was produced as described below.

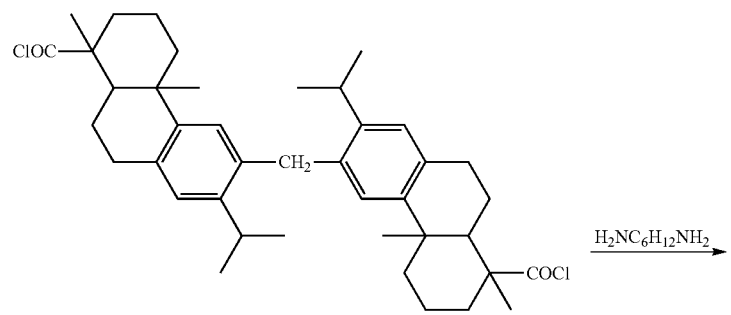

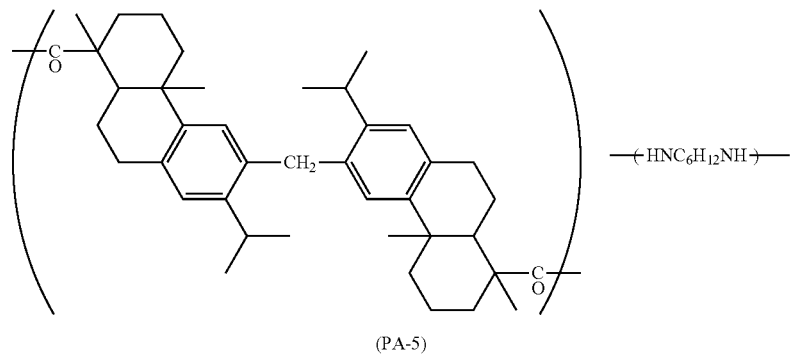

(PA-5)

1.16 g of a diamine compound, hexamethylenediamine (DA-1), and 4.4 g of 4-dimethylaminopyridine were dissolved in 30 mL of pyridine, and in a nitrogen atmosphere, 6.50 g of the acid chloride of the dicarboxylic acid compound (4a) was gradually added thereto in small amounts. The mixture was stirred for 3 hours at room temperature, and then the reaction liquid was poured into cold dilute hydrochloric acid. A precipitate thus produced was separated by filtration and was sufficiently washed with water. This product was dried and then dissolved in 80 mL of N-methylpyrrolidone under heating, and the solution was gradually poured in small amounts into 500 mL of methanol to cause reprecipitation. The precipitate was collected by filtration, washed with methanol, and dried, and thus 5.8 g of a white solid of PA-5 was obtained. The molecular weight and the glass transition temperature were measured by the same methods as those used in Example 1, and the following results were obtained.

Mw=36,200, Tg=177° C.

The $^1$H-NMR spectrum of PA-5 was measured, and it was confirmed that PA-5 contained a structure derived from dehydroabietic acid and a structure derived from a diamine compound such as shown below.

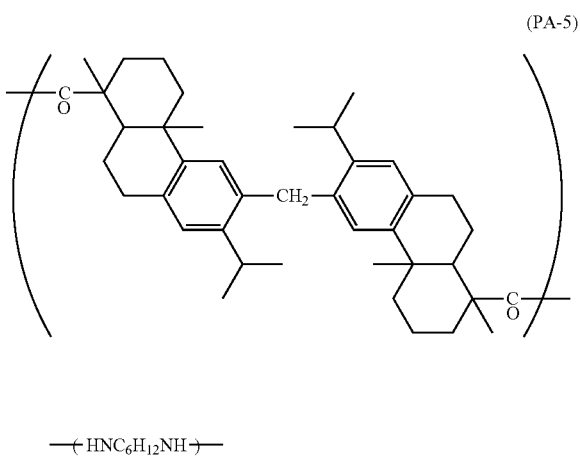

(PA-5)

Example 6

Synthesis of Polyamide Polymer (PA-6)

A polyamide polymer (PA-6) was produced as described below.

1.72 g of a diamine compound, decamethylenediamine (DA-3), and 4.4 g of 4-dimethylaminopyridine were dissolved in 30 mL of pyridine, and in a nitrogen atmosphere, 6.50 g of the acid chloride of the dicarboxylic acid compound (4a) was gradually added thereto in small amounts. The mixture was stirred for 3 hours at room temperature, and then the reaction liquid was poured into cold dilute hydrochloric acid. A precipitate thus produced was separated by filtration and was sufficiently washed with water. This product was dried and then dissolved in 60 mL of N-methylpyrrolidone under heating, and the solution was gradually poured in small amounts into 500 mL of methanol to cause reprecipitation. The precipitate was collected by filtration, washed with methanol, and dried, and thus 6.5 g of a white solid of PA-6 was obtained. The molecular weight and the glass transition temperature were measured by the same methods as those used in Example 1, and the following results were obtained.

Mw=38,300, Tg=130° C.

The $^1$H-NMR spectrum of PA-6 was measured, and it was confirmed that PA-6 contained a structure derived from dehydroabietic acid and a structure derived from a diamine compound such as shown below.

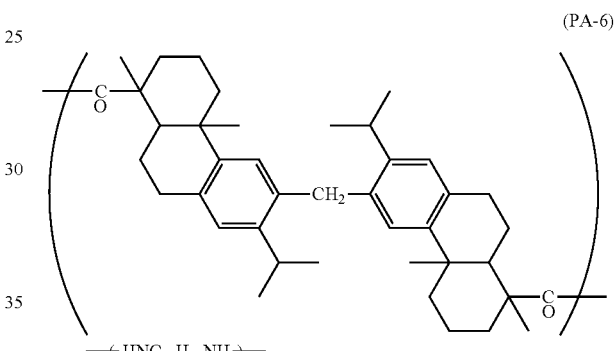

(PA-6)

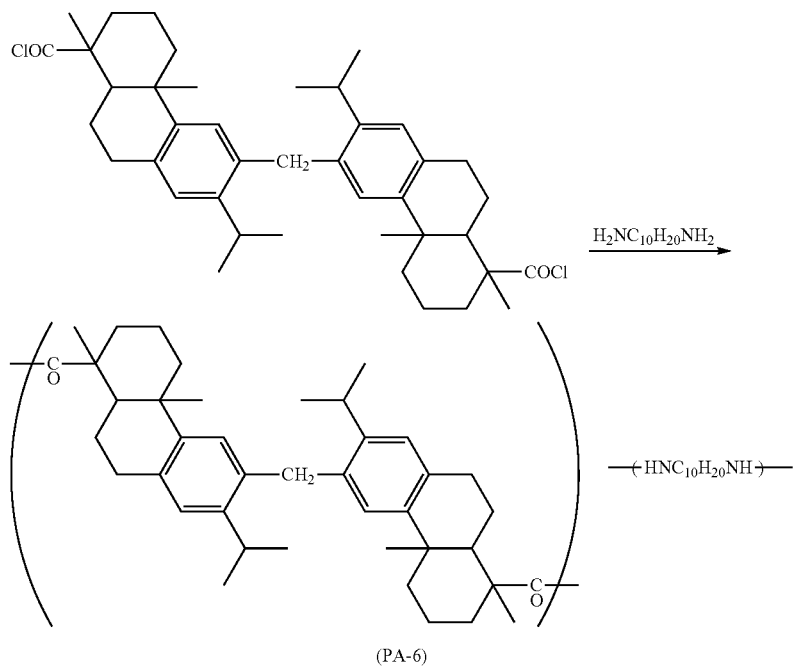

(PA-6)

Example 7

Synthesis of Polyamide Polymer (PA-7)

A polyamide polymer (PA-7) was produced as described below.

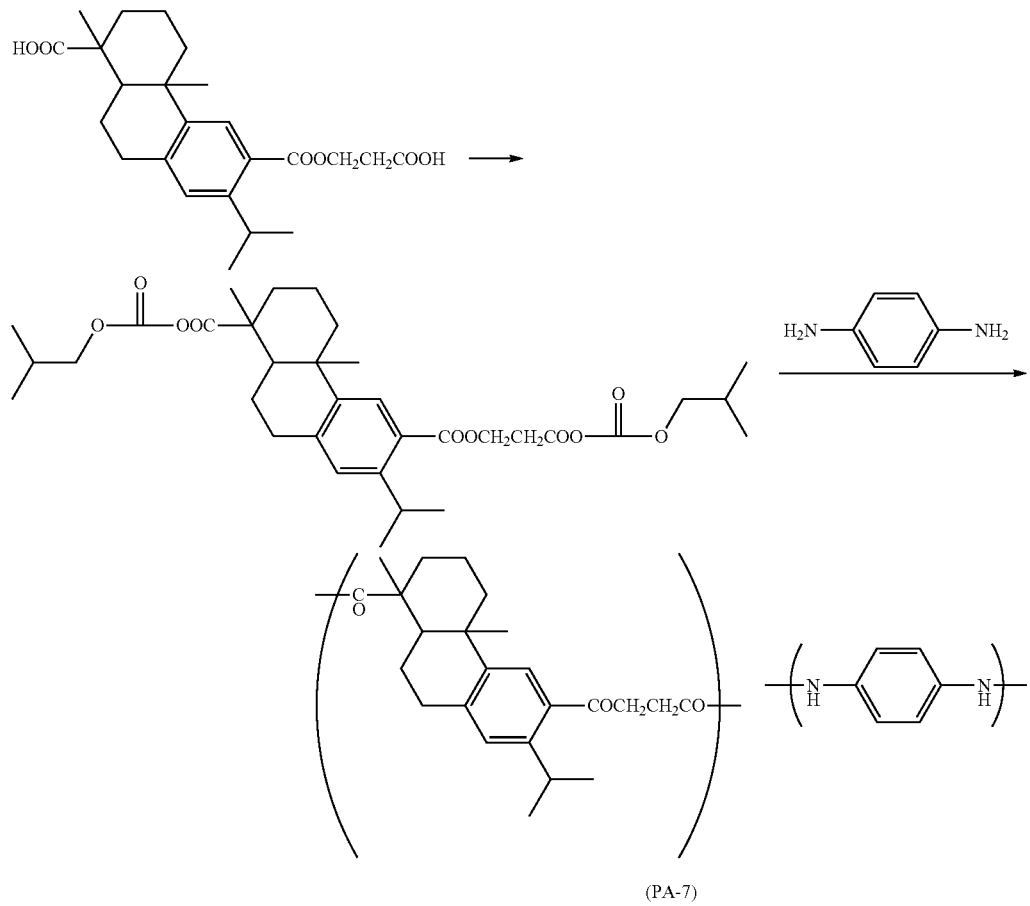

4.0 g of the dicarboxylic acid compound (2a) was dissolved in 40 mL of pyridine, and 3.0 g of isobutyl chlorocarbonate was added dropwise thereto at 10° C. to 15° C. The mixture was stirred for one hour at 15° C., and then this liquid was gradually added in small amounts to a liquid prepared by dissolving under heating 1.08 g of a diamine compound, p-phenylenediamine (DA-8), in 30 mL of pyridine, at room temperature. The mixture was stirred for 3 hours at room temperature, and then the reaction liquid was poured into cold dilute hydrochloric acid. A precipitate thus produced was separated by filtration and washed with water. This product was dried and then was dissolved in 40 mL of dimethylacetamide under heating, and the solution was gradually poured in small amounts into 400 mL of methanol to cause reprecipitation. The precipitate was collected by filtration, washed with methanol, and dried, and thus 5.9 g of a white solid of PA-7 was obtained.

The molecular weight and the glass transition temperature were measured by the same methods as those used in Example 1, and the following results were obtained.

Mw=31,400, Tg=238° C.

The $^1$H-NMR spectrum of PA-7 was measured, and it was confirmed that PA-7 contained a structure derived from dehydroabietic acid and a structure derived from a diamine compound such as shown below.

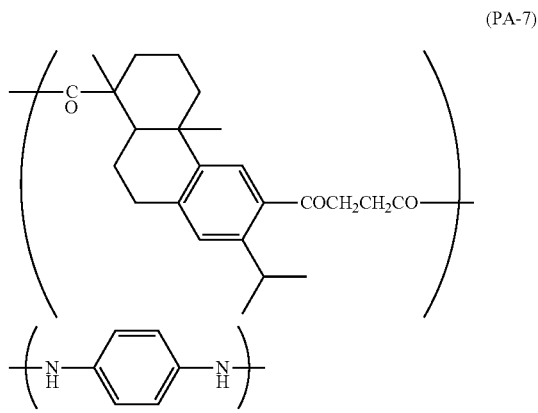

Example 8

Synthesis of Polyamide Polymer (PA-8)

A polyamide polymer (PA-8) was produced as described below.

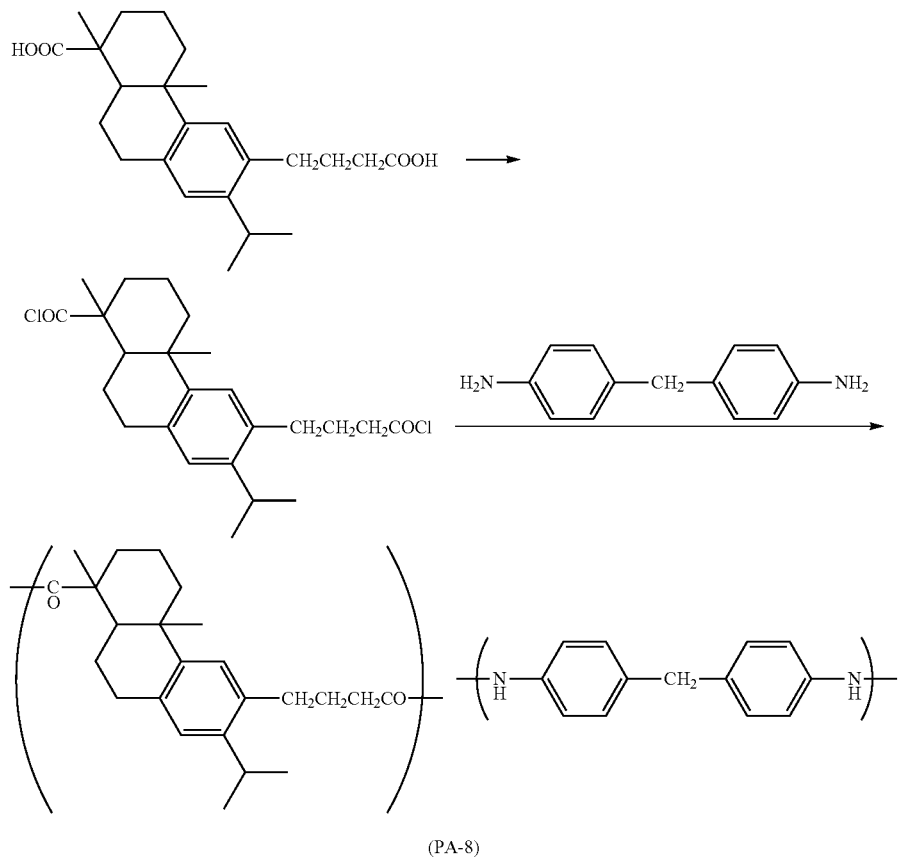

(PA-8)

3.86 g of the dicarboxylic acid compound (3a) was dissolved in 20 mL of methylene chloride, 2.68 g of oxalyl chloride was added thereto, and the mixture was stirred for 3 hours at room temperature. The solvent and excess oxalyl chloride were distilled off under reduced pressure, and 5 mL of methylene chloride was used to obtain a solution of acid chloride.

1.98 g of a diamine compound, 4,4'-diaminodiphenyl-methane (DA-14), was added to 40 mL of pyridine, and the mixture was stirred to dissolve at room temperature. Subsequently in a nitrogen atmosphere, the acid chloride solution was added dropwise thereto at room temperature. The mixture was stirred for 2 hours at room temperature, subsequently 100 mL of methanol was added to the reaction liquid, and a precipitate of PA-8 thus produced was separated by filtration and washed with methanol. This product was dried and then was dissolved in 30 mL of dimethylformamide under heating. The solution was gradually poured in small amounts into 300 mL of methanol to cause reprecipitation. The precipitate was washed with methanol and dried, and thus 3.2 g of a white solid of PA-8 was obtained. The molecular weight and the glass transition temperature were measured by the same methods as those used in Example 1, and the following results were obtained.

Mw=36,000, Tg=216° C.

The $^1$H-NMR spectrum of PA-8 was measured, and it was confirmed that PA-8 contained a structure derived from dehydroabietic acid and a structure derived from a diamine compound such as shown below.

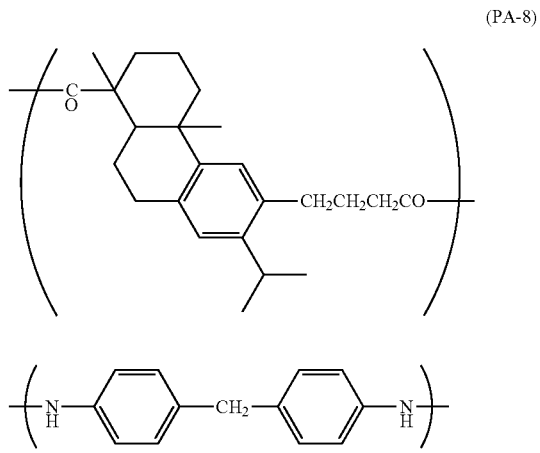

(PA-8)

Example 9

Synthesis of Polyamide Polymer (PA-9)

A polyamide polymer (PA-9) was produced as described below.

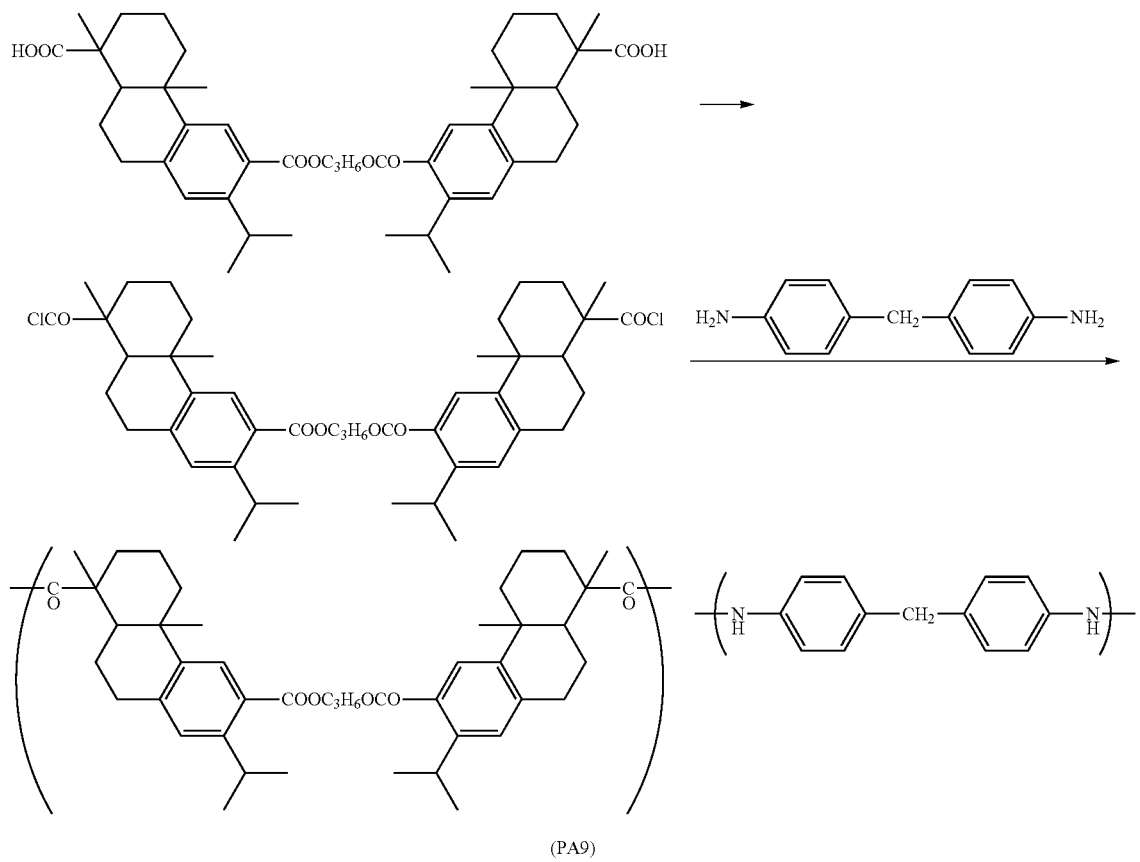

7.29 g of the dicarboxylic acid compound (5d) was dissolved in 50 mL of methylene chloride, 2.68 g of oxalyl chloride was added thereto, and the mixture was stirred for 3 hours at room temperature. The solvent and excess oxalyl chloride were distilled off under reduced pressure, and 10 mL of methylene chloride was used to obtain a solution of acid chloride.

1.98 g of a diamine compound, 4,4'-diaminodiphenyl-methane (DA-14), was added to 40 mL of pyridine, and the mixture was stirred to dissolve at room temperature. Subsequently, in a nitrogen atmosphere, the acid chloride solution of the dicarboxylic acid compound (5d) was added dropwise thereto at room temperature. The mixture was stirred for 3 hours at room temperature, subsequently 100 mL of methanol was added to the reaction liquid, and a white precipitate of PA-9 thus produced was separated by filtration and washed with methanol. This product was dried and then was dissolved in 40 mL of N-methylpyrrolidone under heating. The solution was gradually poured in small amounts into 400 mL of methanol to cause reprecipitation. The precipitate was washed with methanol and dried, and thus 7.9 g of a white solid of PA-9 was obtained. The molecular weight and the glass transition temperature were measured by the same methods as those used in Example 1, and the following results were obtained.

Mw=72,000, Tg=241° C.

The $^1$H-NMR spectrum of PA-9 was measured, and it was confirmed that PA-9 contained a structure derived from dehydroabietic acid and a structure derived from a diamine compound such as shown below.

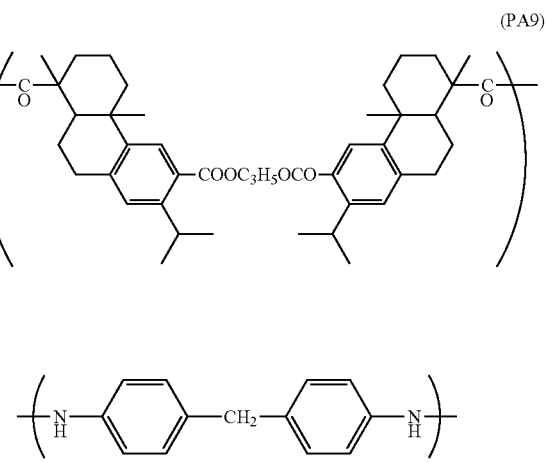

Example 10

Synthesis of Polyamide Polymer (PA-10)

A polyamide polymer (PA-10) was produced as described below.

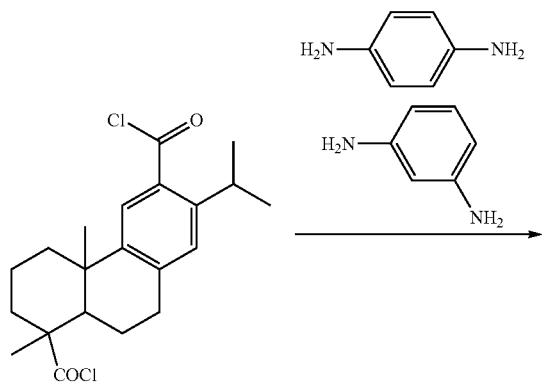

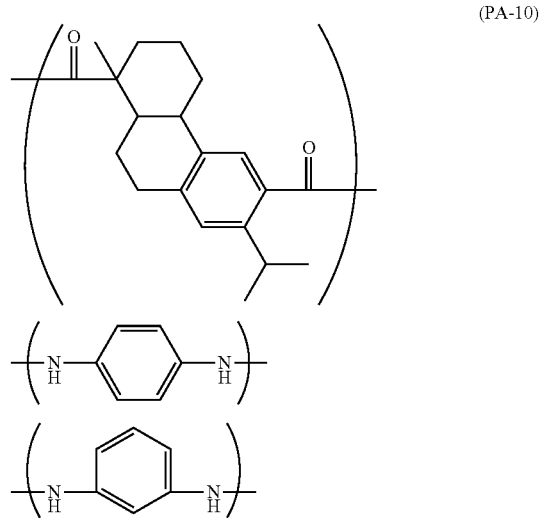

(PA-10)

0.54 g of a diamine compound, p-phenylenediamine (DA-8), and 0.54 g of a diamine compound, m-phenylenediamine (DA-9), were added to 30 mL of pyridine, and in a nitrogen atmosphere, the mixture was heated to 45° C. to dissolve. This liquid was cooled to 15° C., and 3.81 g of acid chloride of the dicarboxylic acid compound (1 e) was gradually added thereto in small amounts. The mixture was stirred for 2 hours at room temperature, subsequently 100 mL of methanol was added to the reaction liquid, and PA-10 thus produced was separated by filtration and washed with methanol. This product was dried and then dissolved in 40 mL of dimethylformamide under heating, and the solution was gradually poured in small amounts into 400 mL of methanol to cause reprecipitation. The precipitate was filtered, washed with methanol, and dried, and thus 4.18 g of a white solid of PA-10 was obtained. The molecular weight and the glass transition temperature were measured by the same methods as those used in Example 1, and the following results were obtained.

Mw=202,000, Tg=>300° C.

The $^1$H-NMR spectrum of PA-10 was measured, and it was confirmed that PA-10 contained a structure derived from dehydroabietic acid and a structure derived from two kinds of diamine compounds such as shown below.

Example 11

Synthesis of Polyamide Polymer (PA-11)

A polyamide polymer (PA-11) was produced as described below.

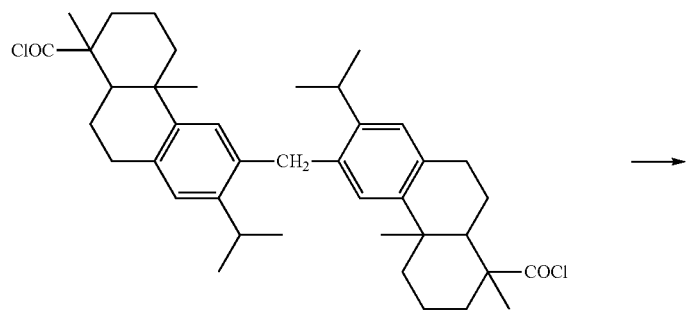

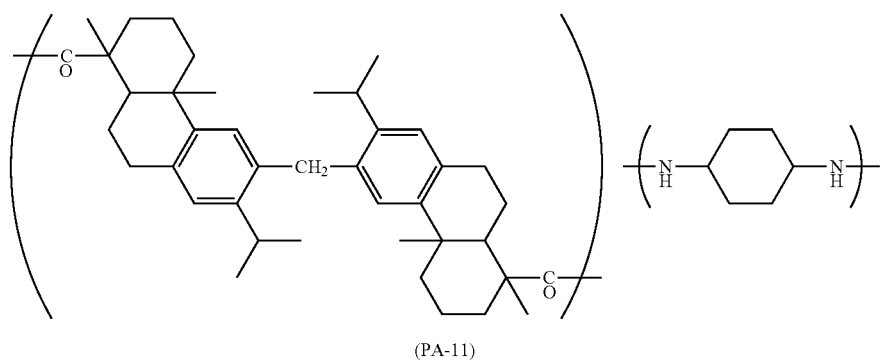

(PA-11)

1.14 g of a diamine compound, 1,4-cyclohexanediamine (DA-11), and 4.4 g of 4-dimethylaminopyridine were dissolved in 30 mL of pyridine, and in a nitrogen atmosphere, 6.50 g of acid chloride of the dicarboxylic acid compound (4a) was gradually added thereto in small amounts. The mixture was stirred for 3 hours at room temperature, subsequently the reaction liquid was poured into cold dilute hydrochloric acid, and a precipitate thus produced was separated by filtration and sufficiently washed with water. This product was dried and then dissolved in 60 mL, of N-methylpyrrolidone under heating, and the solution was gradually poured in small amounts into 600 mL of methanol to cause reprecipitation. The precipitate was collected by filtration, washed with methanol, and dried, and thus 6.1 g of a white solid of PA-6 was obtained. The molecular weight and the glass transition temperature were measured by the same methods as those used in Example 1, and the following results were obtained.

Mw=29,300, Tg=215° C.

The $^1$H-NMR spectrum of PA-11 was measured, and it was confirmed that PA-11 contained a structure derived from dehydroabietic acid and a structure derived from a diamine compound such as shown below.

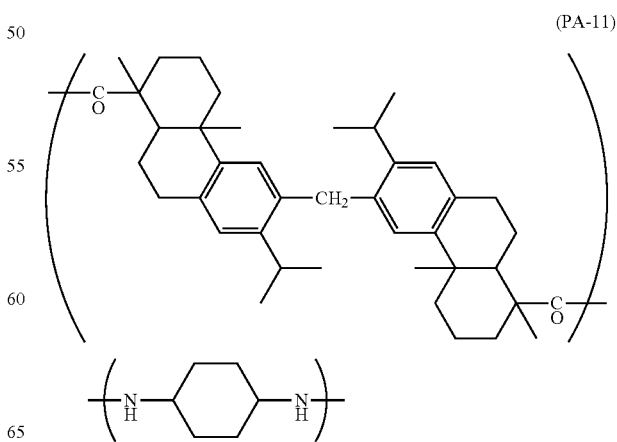

(PA-11)

Example 12

Synthesis of Polyamide Polymer (PA-12)

A polyamide polymer (PA-12) was produced as described below.

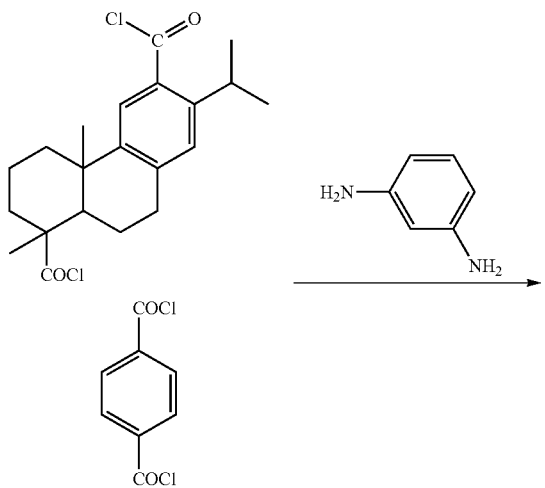

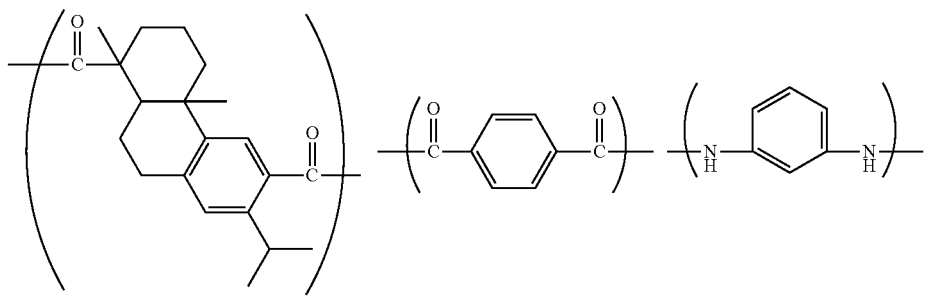

(PA-12)

1.08 g of a diamine compound, m-phenylenediamine (DA-9), was added to 30 mL of pyridine, and in a nitrogen atmosphere, the mixture was heated to 45° C. to dissolve. This liquid was cooled to 15° C., and a mixture of 1.91 g of acid chloride of the dicarboxylic acid compound (1e) and 1.02 g of terephthalic acid chloride was gradually added thereto in small amounts.

The mixture was stirred for 2 hours at room temperature, subsequently 100 mL of methanol was added to the reaction liquid, and PA-12 thus produced was separated by filtration and washed with methanol. This product was dried and then dissolved in 40 mL of dimethylformamide under heating. The solution was gradually poured in small amounts into 400 mL of methanol to cause reprecipitation. The precipitate was filtered, washed with methanol, and dried, and thus 3.12 g of a white solid of PA-12 was obtained. The molecular weight and the glass transition temperature were measured by the same methods as those used in Example 1, and the following results were obtained.

Mw=119,000, Tg=286° C.

The $^1$H-NMR spectrum of PA-12 was measured, and it was confirmed that PA-12 contained a structure derived from dehydroabietic acid and a structure derived from a diamine compound such as shown below.

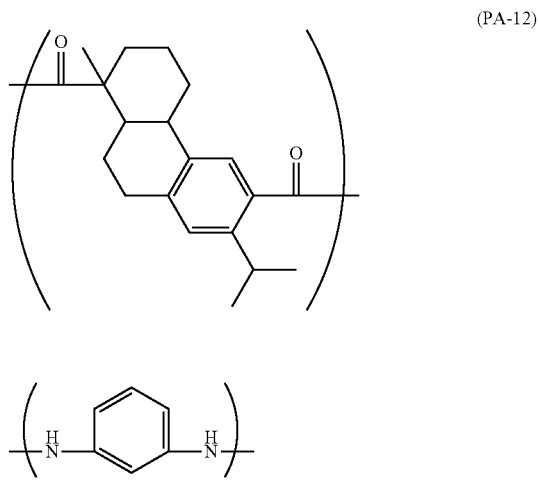

(PA-12)

Example 13

Synthesis of Polyamide Polymer (PA-13)

A polyamide polymer (PA-13) was produced as described below.

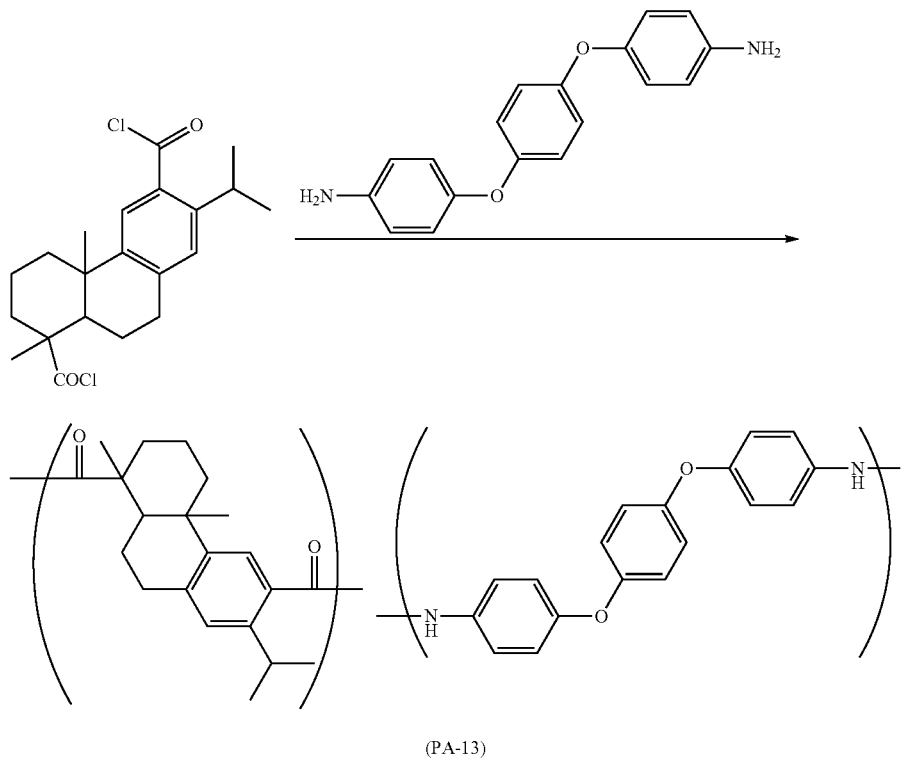

(PA-13)

2.92 g of a diamine compound, 4,4'-(p-phenylenedioxy)dianiline (DA-22), was added to 30 mL of pyridine, and in a nitrogen atmosphere, the mixture was heated to 45° C. to dissolve. This liquid was cooled to 15° C. and 3.81 g of acid chloride of the dicarboxylic acid compound (1e) was gradually added thereto in small amounts. The mixture was stirred for 2 hours at room temperature, subsequently 100 mL of methanol was added to the reaction liquid, and PA-13 thus produced was separated by filtration and washed with methanol. This product was dried and then dissolved in 40 mL of dimethylformamide under heating, and the solution was gradually poured in small amounts into 400 mL of methanol to cause reprecipitation. The precipitate was filtered, washed with methanol, and dried, and thus 4.56 g of a white solid of PA-13 was obtained.

The molecular weight and the glass transition temperature were measured by the same methods as those used in Example 1, and the following results were obtained.

Mw=80,000, Tg=254° C.

The $^1$H-NMR spectrum of PA-13 was measured, and it was confirmed that PA-13 contained a structure derived from dehydroabietic acid and a structure derived from a diamine compound such as shown below.

<Comparative Example 1> to <Comparative Example 4>

The product names and glass transition temperatures, Tg, of the polymers used in Comparative Examples are presented below. The Tg was determined by the same measurement method as that used in Examples.

(Polyamide-6)

UBE NYLON 1013B manufactured by Ube Industries, Ltd. (Tg=48° C.)

(Polyamide-66)

UBE NYLON 2015B manufactured by Ube Industries, Ltd. (Tg=50° C.)

(Polyamide-11)

RILSAN B BMF 0 manufactured by Arkema Group (Tg=39° C.)

(Polyamide-12)

VESTAMID L2140 manufactured by Daicel-Evonik, Ltd. (Tg=47° C.)

TABLE 1

|  | Polyamide polymer | Weight average molecular weight (Mw) | Glass transition temperature (° C.) |
|---|---|---|---|
| Example 1 | PA-1 | 111,000 | >300 |
| Example 2 | PA-2 | 85,000 | 287 |
| Example 3 | PA-3 | 8,000 | 280 |
| Example 4 | PA-4 | 33,000 | 148 |
| Example 5 | PA-5 | 36,200 | 177 |
| Example 6 | PA-6 | 38,300 | 130 |
| Example 7 | PA-7 | 31,400 | 238 |
| Example 8 | PA-8 | 36,000 | 216 |
| Example 9 | PA-9 | 72,000 | 241 |
| Example 10 | PA-10 | 202,000 | >300 |
| Example 11 | PA-11 | 29,300 | 215 |
| Example 12 | PA-12 | 119,000 | 286 |
| Example 13 | PA-13 | 80,000 | 254 |
| Comparative Example 1 | Polyamide-6 | — | 48 |
| Comparative Example 2 | Polyamide-66 | — | 50 |
| Comparative Example 3 | Polyamide-11 | — | 39 |
| Comparative Example 4 | Polyamide-12 | — | 47 |

As can be seen from Table 1, it is understood that the polyamide polymers of the present invention have high glass transition temperatures. Meanwhile, when Tg is 100° C. or higher, it can be said that the polymer has excellent heat resistance.

This implies that a material obtained from the polyamide polymer of the present invention has high heat resistance.

Example 14

Production of Film

The polyamide polymer PA-1 was dissolved in N-methylpyrrolidone (NMP) at a concentration of 10% by mass, and this was filtered under pressure through a filter paper (manufactured by Toyo Roshi Co., Ltd., #63) having a nominal filtration accuracy of 0.01 mm to prepare a dope. The dope thus prepared was flow cast on a glass substrate by using a doctor blade. After flow casting, the dope d glass substrate was heated and dried for 2 hours at 110° C., and was vacuum dried at 200° C. and 1 Tort for 5 hours. Thus, a film F-1 was produced.

Examples 15 to 19

Films F-2 to F-6 were respectively produced in the same manner as in Example 14, except that polyamide polymers PA-2, PA-3, PA-10. PA-12, and PA-13 were respectively used instead of the polyamide polymer PA-1 used in Example 14.

<Film Evaluation>

For the films obtained as described above, the glass transition temperature, density, total light transmittance, and film thickness were evaluated by the following evaluation methods. The evaluation results are presented in Table 2.

Furthermore, as a Reference Example, an aramid film (MICTRON manufactured by Toray Co., Ltd.; hereinafter, "RF-1"), which is a commercially available heat resistant aromatic polyamide film, was evaluated as described above.

(Glass Transition Temperature (Tg))

A strip-shaped test specimen having a size of 5 mm×22 mm was cut out from each of the films thus obtained, this was submitted to a dynamic viscoelasticity analyzer, RHEOGEL-E4000 (manufactured by UBM Co., Ltd.), and the tangent loss (tan δ) in a temperature range of 25° C. to 350° C. was measured in a tensile mode. The temperature at which the tangent loss (tan δ) exhibited the maximum value was designated as the glass transition temperature (Tg).

(Density Measurement)

For each of the films thus obtained, the density was measured by using a precision density meter, AUW120D (manufactured by Shimadzu Corp.).

(Total Light Transmittance Measurement)

The total light transmittance of each of the films thus obtained was measured by using a haze meter (Model 1001DP, manufactured by Nippon Denshoku Industries Co., Ltd.). Measurement was made at three sites, and the arithmetic mean of the values was determined.

(Film Thickness Measurement)

The film thickness of each of the films thus obtained was measured with a digital linear gauge, DG-525H (manufactured by Ono Sokki Co. Ltd.). Measurement was made at three sites, and the arithmetic mean of the values was determined.

(Biomass Degree)

The biomass degree was calculated according to the following formula.

Biomass degree (%)=Mass originating from plants in the constituent components of the polymer/total mass of the constituent components of the polymer (Formula)

TABLE 2

|  | Film | Polyamide polymer | Glass transition temperature (° C.) | Density (g/cm³) | Total light transmittance (%) | Film thickness (μm) | Biomass degree (%) |
|---|---|---|---|---|---|---|---|
| Example 14 | F-1 | PA-1 | >350 | 1.15 | 90 | 50 | 67 |
| Example 15 | F-2 | PA-2 | 323 | 1.14 | 88 | 50 | 55 |
| Example 16 | F-3 | PA-3 | 316 | 1.12 | 86 | 50 | 55 |
| Example 17 | F-4 | PA-10 | 335 | 1.14 | 78 | 50 | 67 |
| Example 18 | F-5 | PA-12 | 326 | 1.14 | 88 | 50 | 67 |

TABLE 2-continued

|  | Film | Polyamide polymer | Glass transition temperature (° C.) | Density (g/cm³) | Total light transmittance (%) | Film thickness (μm) | Biomass degree (%) |
|---|---|---|---|---|---|---|---|
| Example 19 | F-6 | PA-13 | 283 | 1.15 | 85 | 50 | 47 |
| Reference Example | RF-1 | — | 307 | 1.49 | 67 | 50 | 0 |

As can be seen from Table 2, it is understood that the films containing the polyamide polymers of the present invention have excellent heat resistance. Furthermore, it is understood that the films have very low densities and also have high total light transmittances.

That is, it is understood that by using the polyamide polymer of the present invention, a film which has high heat resistance and is lightweight and highly transparent can be provided.

Example 20

Production of Additive-Containing Film F-7

The polyamide polymer PA-1 (89.5 parts by mass), PX-200 (10 parts by mass), IRGANOX 1010 (0.4 parts by mass), and ADEKA STAB PEP36 (0.1 parts by mass) were dissolved in N-methylpyrrolidone (NMP) to a concentration of 10% by mass, and this was filtered under pressure through a filter paper (manufactured by Toyo Roshi Co., Ltd., #63) having a nominal filtration accuracy of 0.01 mm to prepare a dope.

The dope thus prepared was flow cast on a glass substrate by using a doctor blade. After flow casting, the dope d glass substrate was dried under heating at 110° C. for 2 hours, and subsequently vacuum dried at 200° C. and 1 Torr for 5 hours. Thus, a film containing additives, F-7, was produced.

Examples 21 to 26

Production of Additive-Containing Films F-8 to F-13

Films containing additives, F-8 to F-13, were respectively produced in the same manner as in Example 20, except that the kinds and contents of the polyamide polymer and the additives used in Example 2 were changed as indicated in Table 3.

<Evaluation of Additive-Containing Films>

For the films obtained as described above, the water absorption rate, flame retardancy, light stability, and film thickness were respectively evaluated by the following evaluation methods. The evaluation results are presented in Table 3.

(Water Absorption Rate Test)

The water absorption rate was measured as described below. The films F-7 to F-13 obtained in Examples 20 to 26, and the films F-1 and F-2 obtained in Examples 14 and 15 were immersed in water at 23° C. for 24 hours, subsequently water droplets on the surfaces were thoroughly wiped, and the mass of each of the films was quickly measured. The water absorption rate was calculated by the formula described below.

Water absorption rate (%)=(Mass of film after immersion in water−mass of film before immersion in water)mass of film before immersion in water (Flame Retardancy Test)

As an index of flame retardancy, a thin material vertical burning test (ASTM D4804) was carried out. A film test specimen (200±5×50±1×t mm) was rolled into a cylindrical shape and vertically set on a clamp, and the film test specimen was brought into contact with a 20-mm flame for 3 seconds twice. Thus, VTM-0, VTM-1, VTM-2, and Not were judged on the basis of their burning behavior.

(Light Stability Test)

As an index of light stability, the breaking strength retention ratio for before and after irradiation with a xenon lamp for 10× hours at room temperature was calculated. The breaking strength was measured by humidifying a test specimen at 25° C. and 60% RH for 2 hours or longer, and then performing a tensile test using a TENSILON universal test machine (manufactured by Orientec Co.) under the conditions of a distance between chucks of 30 mm, a temperature of 25° C., and a tensile rate of 3 mm/min. Measurement was made with three specimens for each film, and the arithmetic mean of the breaking strength thus measured was determined. Also, the breaking strength retention ratio was calculated by the following formula.

Breaking strength retention ratio (%)=Breaking strength after irradiation with xenon lamp/breaking strength before irradiation with xenon lamp Furthermore, the degree of coloration at that time was evaluated by visual inspection.

(Film Thickness Measurement)

The film thickness of each of the films thus obtained was measured with a digital linear gauge, DG-525H (manufactured by Ono Sokki Co., Ltd.). Measurement was made at three sites, and the arithmetic mean of the values was determined.

TABLE 3

|  | Example 14 | Example 20 | Example 21 | Example 22 | Example 23 | Example 15 | Example 24 | Example 25 | Example 26 |
|---|---|---|---|---|---|---|---|---|---|
| Film | F-1 | F-7 | F-8 | F-9 | F-10 | F-2 | F-11 | F-12 | F-13 |
| PA-1 | 100 | 89.5 | 89.5 | 84.5 | 98.5 | — | — | — | — |
| PA-2 | — | — | — | — | — | 100 | 79.5 | 84.5 | 98.5 |
| PX-200 | — | 10 | — | — | — | — | — | — | — |
| TPP | — | — | 10 | — | — | — | — | — | — |
| PX-202 | — | — | — | — | — | — | 20 | — | — |
| Pentaerythritol tetrabenzoate | — | — | — | 15 | — | — | — | — | — |

TABLE 3-continued

| | Example 14 | Example 20 | Example 21 | Example 22 | Example 23 | Example 15 | Example 24 | Example25 | Example 26 |
|---|---|---|---|---|---|---|---|---|---|
| Polyester Oligomer A | — | — | — | — | — | — | — | 15 | — |
| Tinuvin 328 | — | — | — | — | 0.5 | — | — | — | — |
| Tinuvin 1577 | — | — | — | — | — | — | — | — | 0.5 |
| CHIMASSORB 944 | — | — | — | — | 0.5 | — | — | — | — |
| Tinuvin 622 | — | — | — | — | — | — | — | — | 0.5 |
| Irgnox 1010 | — | 0.4 | 0.4 | 0.4 | 0.4 | — | 0.4 | 0.4 | 0.4 |
| ADEKA STAB PEP36 | — | 0.1 | 0.1 | 0.1 | 0.1 | — | 0.1 | 0.1 | 0.1 |
| Water absorption rate | 6.4 | 5.4 | 5.6 | 2.1 | 6.2 | 3.5 | 2.5 | 1.7 | 3.2 |
| Flame retardancy | VTM-not | VTM-2 | VTM-2 | VTM-not | VTM-not | VTM-not | VTM-2 | VTM-not | VTM-not |
| Light stability (breaking strength retention ratio %) | 41 | 52 | 48 | 55 | 82 | 47 | 43 | 52 | 79 |
| Light stability (coloration) | Present | Present | Present | Present | Absent | Present | Present | Present | Absent |
| Film thickness (μm) | 50 | 50 | 50 | 50 | 50 | 50 | 50 | 50 | 50 |

Meanwhile, the abbreviations in Table 3 are as follows. TPP, PX-200, and PX-202 are flame retardants, pentaerythritol tetrabenzoate and Polyester Oligomer A are moisture absorption inhibitors; TINUVIN 328, TINUVIN 1577, CHIMASSORB 944, and TINUVIN 622 are light stabilizers; and IRGANOX 1010 and ADEKA STAB PEP36 are oxidation inhibitors. These agents respectively have the following structures.

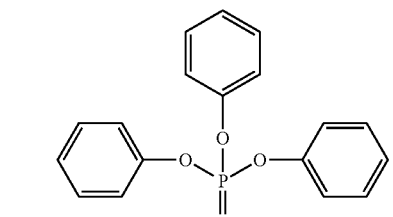

TPP

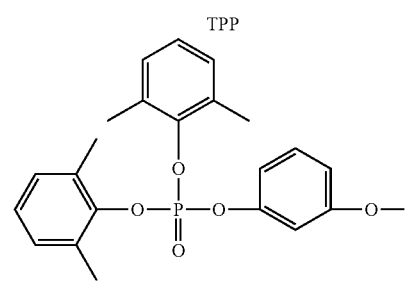

PX-200

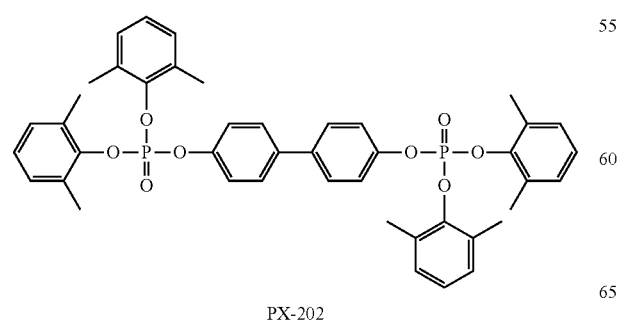

PX-202

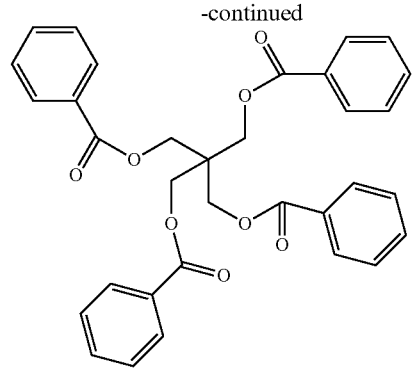

Pentaerythritol tetrabenzoate

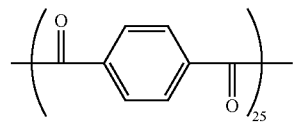

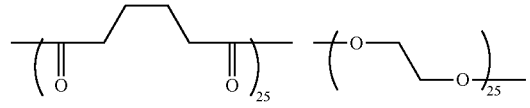

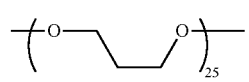

Polyester Oligomer A
(Mn = 1000)

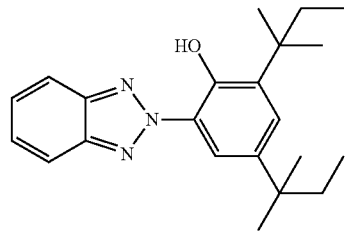

Tinuvin 328

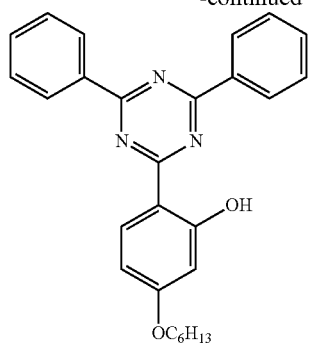

Tinuvin 1577

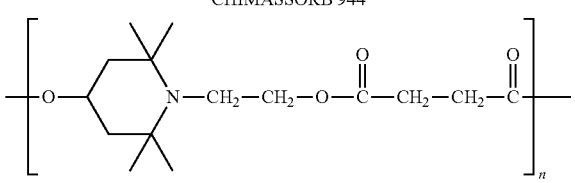

CHIMASSORB 944

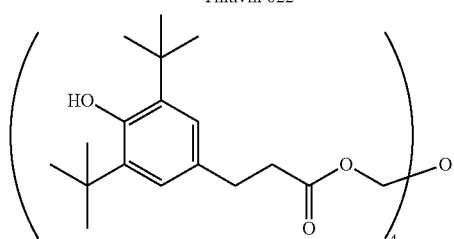

Tinuvin 622

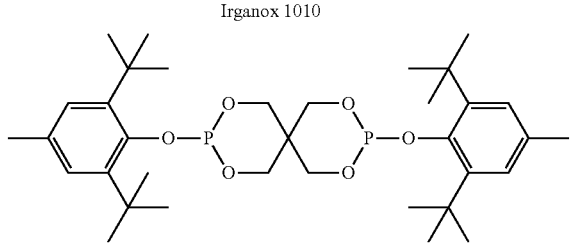

Irganox 1010

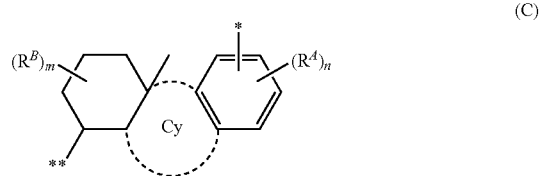

ADEKA-STAB PEP36

As can be seen from Table 3, a resin composition containing the polyamide polymer of the present invention acquires enhanced flame retardancy when a flame retardant is added thereto. Furthermore, when a light stabilizer is added, a decrease in breaking strength caused by light irradiation is suppressed. Also, when a polyester oligomer is added as a moisture absorption inhibitor, the water absorption rate can be decreased. Thereby, it is understood that a resin composition containing the polyamide polymer of the present invention can have the properties adjusted to desired properties when additives are added thereto.

Example 27

Production of Porous Film

PA-1 was dissolved in N,N'-dimethylformamide at a concentration of 10% by mass, and this was filtered under pressure through a filter paper (manufactured by Toyo Roshi Co., Ltd., #63) having a nominal filtration accuracy of 0.01 mm to prepare a dope. The dope thus prepared was flow cast on a glass substrate by using a doctor blade. The doped glass substrate was dried at room temperature, and then the dope was vacuum dried at 170° C. and 1 Torr for 5 hours. Thereby, a porous film FA-11 was produced.

<Evaluation of Porous Film>

Measurement of the glass transition temperature (Tg) and the density was carried out by the same methods as described above. The glass transition temperature was 325° C. Furthermore, the density was 0.2 g/cm$^3$.

Furthermore, a cross-section was cut, and the pore diameter was measured. The average pore diameter was about 10 μm.

Figure 6:
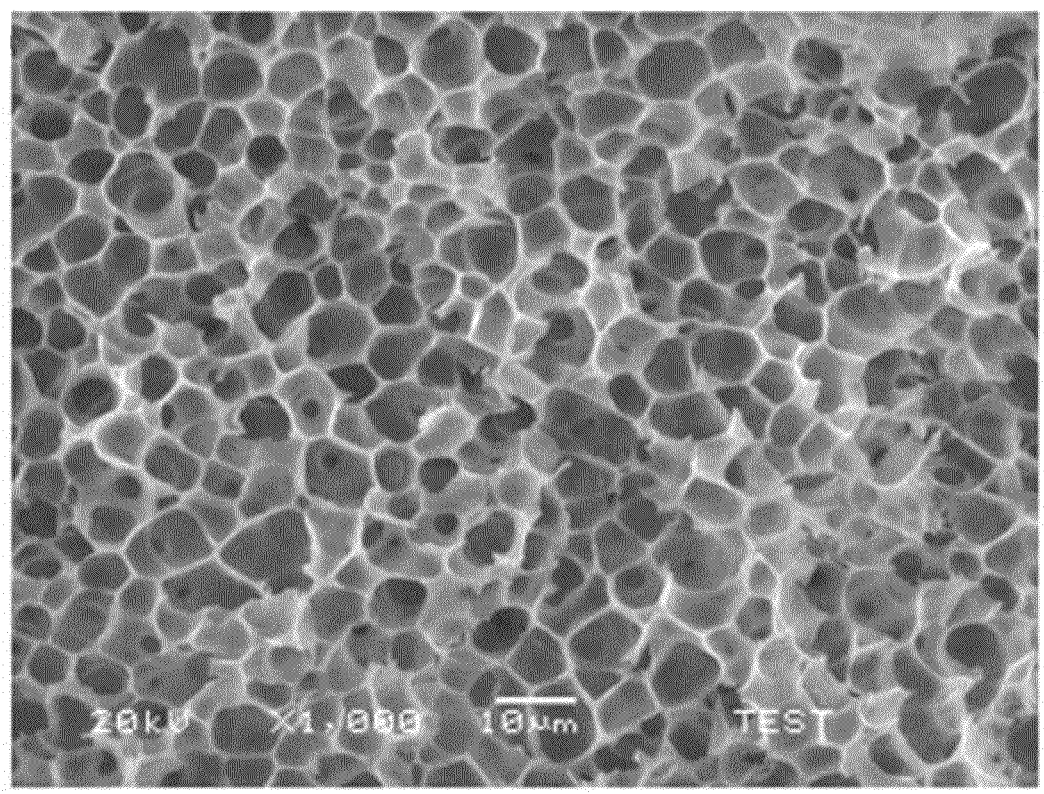
FIG. 6 is a diagram illustrating an example of a cross-sectional photograph of a film formed from the polyamide polymer according to the present invention.

A cross-sectional photograph by scanning electron microscopy of the FA-11 thus obtained is presented in FIG. 6. It is understood from FIG. 6 that the cross-section of the porous film has a large number of closed pores having a circle shape or a shape close to a circle.

From the above results, it is understood that a porous film having high heat resistance can be produced by a simple method by using the polyamide polymer of the present invention.

The entire disclosures of Japanese Patent Application Nos. 2010-288948, 2011-115143, and 2011-166019 are incorporated herein by reference.

All publications, patent applications, and technical standards mentioned in this specification are herein incorporated by reference to the same extent as if each individual publication, patent application, or technical standard was specifically and individually indicated to be incorporated by reference.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplate. It is intended that the scope of the invention be defined by the following claims and their equivalents.

The invention claimed is:

1. A polyamide polymer, comprising a partial structure represented by the following Formula (C), the partial structure constituting a portion of a main chain:

$$\text{(C)}$$

wherein, in Formula (C), $R^A$ and $R^B$ each independently represent a hydrogen atom or an alkyl group having 1 to 6 carbon atoms; n and m each independently represent an integer from 0 to 2; Cy represents an unsaturated 6-membered or 7-membered ring which contains a heteroatom; * and ** each represent a bonding hand, and * may be a bonding hand extending from $R^A$.

2. The polyamide polymer according to claim 1, comprising a repeating unit derived from a dicarboxylic acid compound containing the partial structure represented by Formula (C).

3. The polyamide polymer according to claim 1, further comprising a repeating unit derived from a diamine compound.

4. The polyamide polymer according to claim 2, wherein the repeating unit derived from a dicarboxylic acid compound is at least one selected from the group consisting of a repeating unit represented by the following General Formula (A10), a repeating unit represented by the following General Formula (A20), and a repeating unit represented by the following General Formula (A30):

lene group, an alkenylene group, an arylene group, an oxygen atom and a carbonyl group; $R^{11}$ represents a divalent linking group comprising at least one selected from the group consisting of an alkylene group and an arylene group; $R^A$ and $R^B$ each independently represent a hydrogen atom or an alkyl group having 1 to 6 carbon atoms; n and m each independently represent an integer from 0 to 2; Cy represents an unsaturated 6-membered or 7-membered ring which may contain a heteroatom; * and ** each represent a bonding hand, and * may be a bonding hand extending from $R^A$.

5. The polyamide polymer according to claim 2, wherein the repeating unit derived from a dicarboxylic acid compound is derived from at least one selected from the group consisting of a dicarboxylic acid compound represented by the following General Formula (A11), a dicarboxylic acid compound represented by the following General Formula (A21), and a dicarboxylic acid compound represented by the following General Formula (A31):

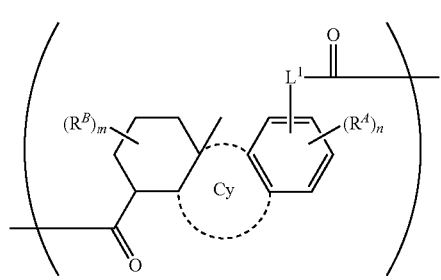

(A10)

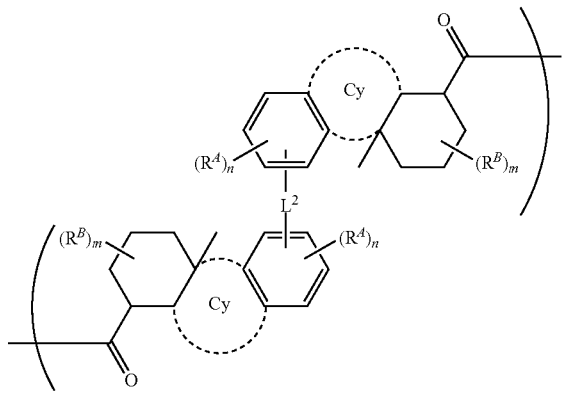

(A20)

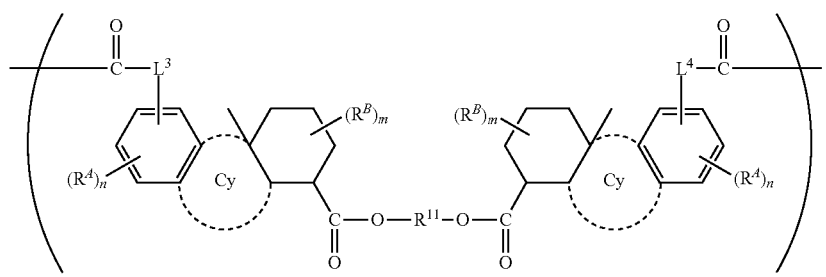

(A30)

wherein in Formulae (A10), (A20) and (A30), $L^1$ represents a single bond or a divalent linking group composed of at least one selected from the group consisting of an alkylene group, an alkenylene group, an arylene group, an oxygen atom and a carbonyl group; $L^2$ represents a single bond or a divalent linking group composed of at least one selected from the group consisting of an oxygen atom, a sulfur atom, a carbonyl group, a sulfonyl group, an alkylene group, an alkenylene group and an arylene group; $L^3$ and $L^4$ each independently represent a single bond or a divalent linking group composed of at least one selected from the group consisting of an alky-

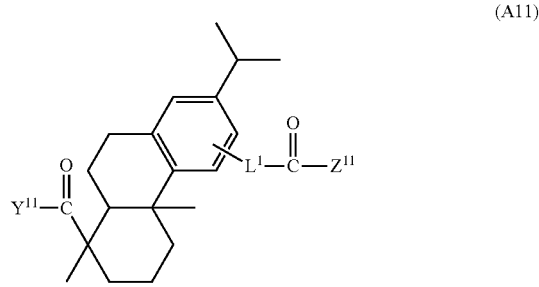

(A11)

-continued

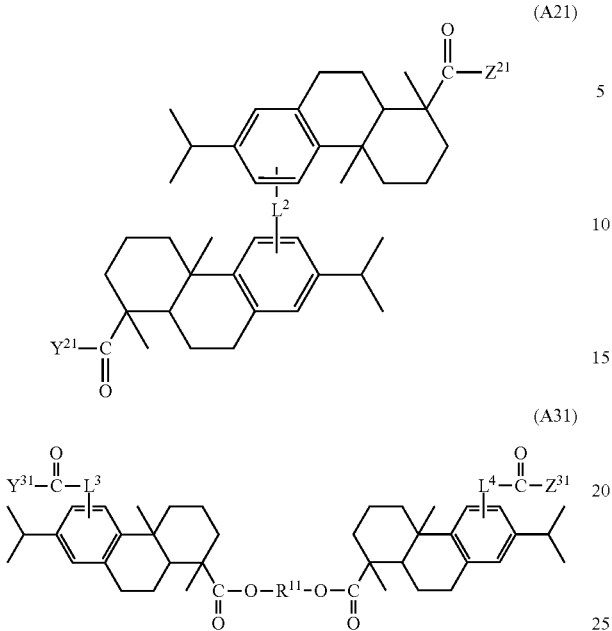

(A21)

(A31)

wherein in Formulae (A11), (A21) and (A31), $L^1$ represents a single bond or a divalent linking group composed of at least one selected from the group consisting of an alkylene group, an alkenylene group, an arylene group, an oxygen atom and a carbonyl group; $L^2$ represents a single bond or a divalent linking group composed of at least one selected from the group consisting of an oxygen atom, a sulfur atom, a carbonyl group, a sulfonyl group, an alkylene group, an alkenylene group and an arylene group; $L^3$ and $L^4$ each independently represent a single bond or a divalent linking group composed of at least one selected from the group consisting of an alkylene group, an alkenylene group, an arylene group, an oxygen atom and a carbonyl group; $R^{11}$ represents a divalent linking group comprising at least one selected from the group consisting of an alkylene group and an arylene group; and $Y^{11}$, $Y^{21}$, $Y^{31}$, $Z^{11}$, $Z^{21}$ and $Z^{31}$ each independently represent a leaving group.

6. The polyamide polymer according to claim 3, wherein the repeating unit derived from a diamine compound is derived from at least one selected from the group consisting of diamine compounds of the following Formulae (DA-1) to (DA-22):

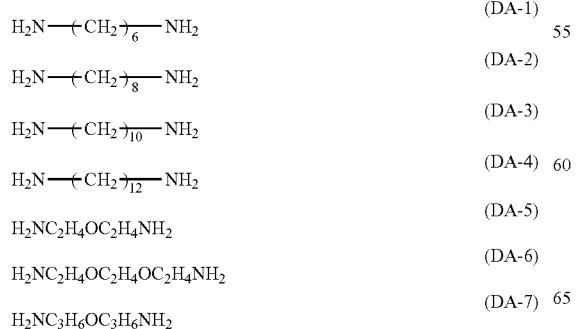

(DA-1)
(DA-2)
(DA-3)
(DA-4)
(DA-5)
(DA-6)
(DA-7)

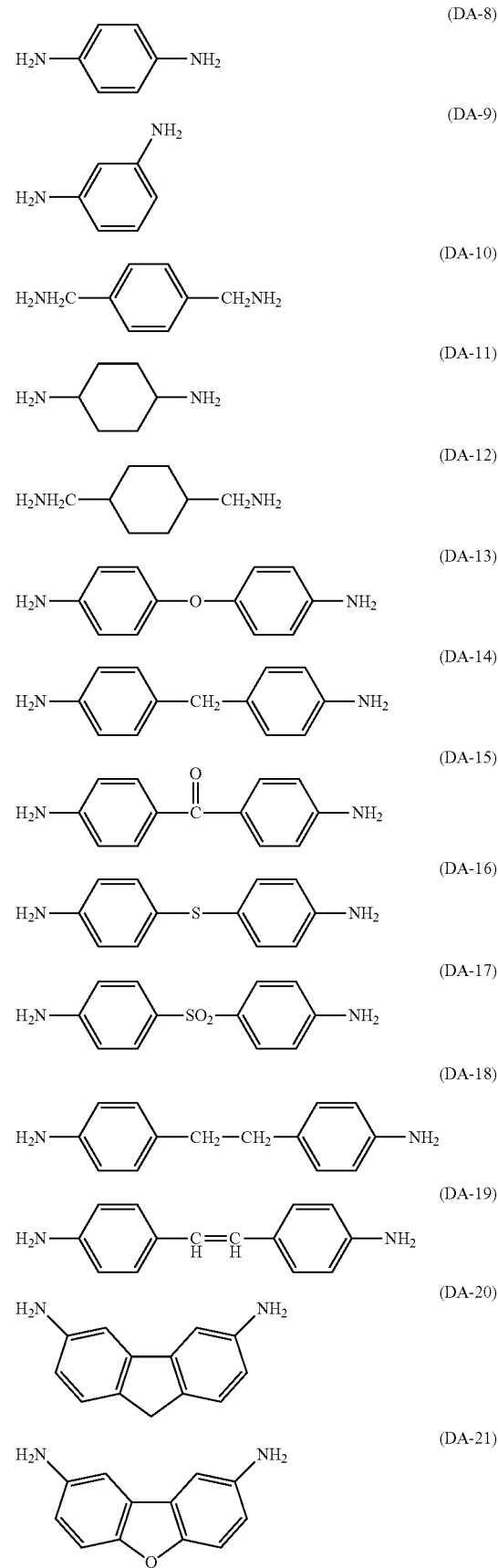

(DA-8)
(DA-9)
(DA-10)
(DA-11)
(DA-12)
(DA-13)
(DA-14)
(DA-15)
(DA-16)
(DA-17)
(DA-18)
(DA-19)
(DA-20)
(DA-21)

-continued (DA-22)

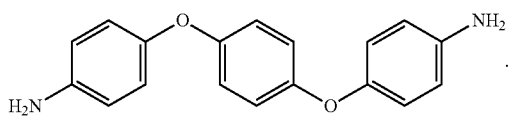

7. A resin composition, comprising the polyamide polymer according to claim 1, and at least one additive selected from the group consisting of a flame retardant, a moisture absorption inhibitor, and a light stabilizer.

8. A molded product, comprising the polyamide polymer according to claim 1.

9. A fiber, comprising the polyamide polymer according to claim 1.

10. A film, comprising the polyamide polymer according to claim 1.

11. A porous film, comprising the polyamide polymer according to claim 1, and having pores in the interior thereof.

12. The porous film according to claim 11, wherein the pores are closed pores having an average pore diameter of from 0.5 μm to 50 μm.

13. The porous film according to claim 11, which is produced by a solution casting method.

14. A method for producing a polyamide polymer, the method comprising polycondensing at least one selected from the group consisting of a compound represented by the following General Formula (A12), a compound represented by the following General Formula (A22), and a compound represented by the following General Formula (A32), with a diamine compound:

(A12)

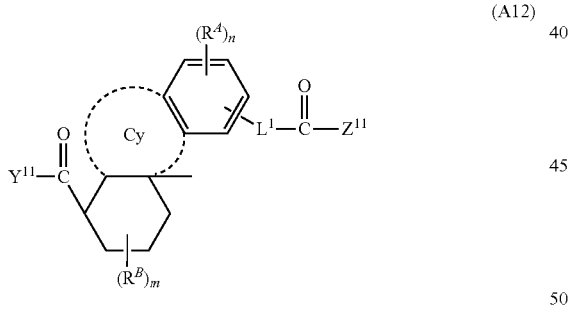

(A22)

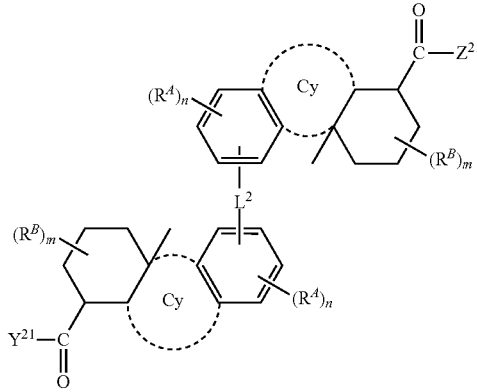

(A32)

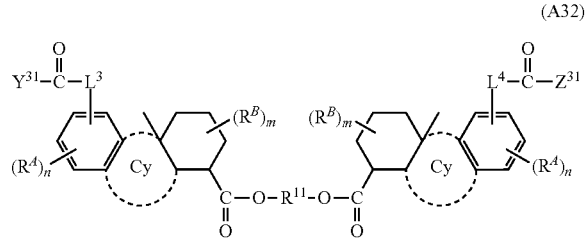

wherein in Formulae (A12), (A22), and (A32), $L^1$ represents a single bond or a divalent linking group composed of at least one selected from the group consisting of an alkylene group, an alkenylene group, an arylene group, an oxygen atom and a carbonyl group; $L^2$ represents a single bond or a divalent linking group composed of at least one selected from the group consisting of an oxygen atom, a sulfur atom, a carbonyl group, a sulfonyl group, an alkylene group, an alkenylene group and an arylene group; $L^3$ and $L^4$ each independently represent a single bond or a divalent linking group composed of at least one selected from the group consisting of an alkylene group, an alkenylene group, an arylene group, an oxygen atom and a carbonyl group; $R^{11}$ represents a divalent linking group comprising at least one selected from the group consisting of an alkylene group and an arylene group; $Y^{11}$, $Z^{11}$, $Y^{21}$, $Z^{21}$, $Y^{31}$ and $Z^{31}$ each independently represent a leaving group; $R^A$ and $R^B$ each independently represent a hydrogen atom or an alkyl group having 1 to 6 carbon atoms; n and m each independently represent an integer from 0 to 2; and Cy represents an unsaturated 6-membered or 7-membered ring which may contain a heteroatom.

\* \* \* \* \*